United States Patent
Kubota et al.

(10) Patent No.: US 6,984,966 B2
(45) Date of Patent: Jan. 10, 2006

(54) SWITCHING POWER SUPPLY

(75) Inventors: Kenichi Kubota, Saitama (JP); Kenichi Suzuki, Saitama (JP); Yutaka Sekine, Saitama (JP); Masaki Oshima, Saitama (JP); Haruo Watanabe, Saitama (JP); Hiroyuki Haga, Saitama (JP); Yoshihiko Kikuchi, Saitama (JP); Masanori Hayashi, Saitama (JP); Kenichi Zenta, Saitama (JP); Yukihiro Nozaki, Saitama (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/519,450

(22) PCT Filed: Feb. 19, 2004

(86) PCT No.: PCT/JP2004/001890

§ 371 (c)(1),
(2), (4) Date: Dec. 30, 2004

(87) PCT Pub. No.: WO2005/025041

PCT Pub. Date: Mar. 17, 2005

(65) Prior Publication Data

US 2005/0212498 A1    Sep. 29, 2005

(30) Foreign Application Priority Data

| Sep. 5, 2003 | (JP) | .......................... 2003-313441 |
| Dec. 22, 2003 | (JP) | .......................... 2003-423924 |
| Dec. 22, 2003 | (JP) | .......................... 2003-423925 |

(51) Int. Cl.
    *G05F 1/40* (2006.01)
(52) U.S. Cl. .................................................. 323/282
(58) Field of Classification Search ................ 323/282, 323/283, 284, 285, 351
See application file for complete search history.

(56) References Cited

U.S. PATENT DOCUMENTS

| 4,943,902 | A  | * | 7/1990 | Severinsky ................... 363/80 |
| 5,731,694 | A  | * | 3/1998 | Wilcox et al. ............... 323/287 |
| 5,731,731 | A  | * | 3/1998 | Wilcox et al. ............... 327/403 |
| 6,366,066 | B1 | * | 4/2002 | Wilcox ....................... 323/282 |
| 6,518,738 | B1 | * | 2/2003 | Wang .......................... 323/284 |
| 6,580,258 | B2 | * | 6/2003 | Wilcox et al. ............... 323/282 |
| 6,674,274 | B2 | * | 1/2004 | Hobrecht et al. ............ 323/285 |

(Continued)

FOREIGN PATENT DOCUMENTS

JP    58-196963 A    7/1985

(Continued)

*Primary Examiner*—Adolf Berhane
(74) *Attorney, Agent, or Firm*—Rader, Fishman & Grauer PLLC

(57) ABSTRACT

A switching power supply; wherein a voltage detector is provided at the output of a power supply circuit and connected to the negative input of an error amplifier to amplify the error between detected voltage and reference voltage, the output of said amplifier is connected to the negative input of a first comparator and to the negative input of a second comparator through split resistors, a filter circuit is connected between a control switch and synchronous switch and the output of said filter circuit is connected to a first comparator and a second comparator, wherein said configuration constitues a control means to control the amplitude of the triangular waveform obtained through said filter circuit to be between an input level of said first comparator and an input of said second comparator, whereby the stability of the switching power supply is ensured without lowering the frequency band of said amplified error signal and stable output ripple characteristics can be materialized.

9 Claims, 34 Drawing Sheets

U.S. PATENT DOCUMENTS

2004/0004470 A1  1/2004  Yoshida et al.

FOREIGN PATENT DOCUMENTS

| JP | 07-222437 A | 8/1995 |
| JP | 10-215567 A | 8/1998 |
| JP | 11-187649 A | 7/1999 |
| JP | 2001-25238 A | 1/2001 |
| JP | 2004-64994 A | 2/2004 |

* cited by examiner

Time

Time

US 6,984,966 B2

SWITCHING POWER SUPPLY

TECHNICAL FIELD

This invention relates to a switching power supply provided with a control means which improves the response speed against a sharp change of the load.

BACKGROUND ART

Existing switching power supplies are shown in FIG. 60 to FIG. 62. The switching power supply shown in FIG. 60 is provided with a voltage hysteresis control means. More particularly, the output of the power supply circuit is connected to the negative input of comparator 42 to amplify the error between detected voltage and reference voltage Vref. The output of comparator 42 is connected to the input of driver 47, the output of which is connected to the gate of control switch S1 and the gate of synchronous switch S2 (for example, refer to FIG. 3 in Section 7 of U.S. Pat. No. 6,147,478). A switching power supply shown in FIG. 61 is provided with a voltage mode PWM control means. More particularly, the output of said power supply circuit is connected to the negative input of error amplifier 41 to amplify the error between detected voltage and reference voltage Vref. The output of error amplifier 41 is connected to the positive input of comparator 42, the negative input of which is connected to oscillator 48, to send the triangular waveform signal from oscillator 48 to comparator 42. The output of comparator 42 is connected to the input of latch 45, the input of which is connected to oscillator 48, to send the rectangular waveform signal. Moreover, the output of latch 45 is connected to the input of driver 47, the output of which is connected to the gate of control switch S1 and the gate of synchronous switch S2 (for example, refer to FIG. 1 in Section 7 of U.S. Patent Publication No. 6147478).

A switching power supply shown in FIG. 62 is provided with a current mode PWM control means. More particularly, the negative input of error amplifier 41 is connected to the output of said switching power supply circuit to amplify the error between detected voltage and reference voltage Vref. The output of error amplifier 41 is connected to the negative input of comparator 42. The output inductor L1 is connected to current detection circuit 44, which is, in turn, connected to the positive input of comparator 42. The reset terminal of flip-flop circuit 46 is connected to comparator 42, and oscillator 48 is connected to the set terminal of flip-flop circuit 46, to send the clock signal from oscillator 48 to flip-flop circuit 46. The output of flip-flop circuit 46 is connected to the input of driver 47, the output of which is connected to the gate of control switch S1 and the gate of synchronous switch S2 (for example, refer to FIG. 2 in Sections 5 and 6 of U.S. Pat. No. 4,943,902).

A switching power supply provided with a voltage hysteresis control means uses output voltage directly to increase the inductor current by turing the switch on when output voltage drops below a specific level and reduce the inductor current by turning the switch off when output voltage becomes higher than the specific level. As output voltage is controlled by repetition of said operation, this mode provides a quick response speed. But, due to its poor operational stability, the switching power supply reacts very sensitively against the condition of the output capacitor and the load, limiting its application of usage.

Next, a switching power supply circuit provided with a voltage mode PWM control means determines the duty ratio from the fixed frequency triangular waveform signal and the amplified error signal. In this mode, operational stability is affected when the frequency difference between the fixed frequency triangular waveform signal and amplified error signal becomes close to zero. To solve the problem, the frequency band of the amplified error signal was reduced down to about 1/10 in respect to the fixed frequency triangular waveform signal.

The current mode PWM control means provides an amplified phase allowance for the amplified error signal by using the inductor current signal instead of the fixed frequency triangular waveform signal, but there remains the problem that it can not increase the frequency band of the amplified error signal significantly.

FIG. 63 shows an operational waveform diagram with a sharp increase of the load current in a switching power supply using the current mode PWM control means. FIG. 64 shows an operational waveform diagram with a sharp decrease of the load current in said switching power supply. Particularly, the upper part shows the output voltage waveform, the middle part shows the inductor current waveform, and the lower part shows the output and triangular waveform of error amplifier 41. As shown in these figures, a sharp increase of the load current reduces output voltage and, in turn, increases inductor current, while a sharp decrease of the load current increases the output voltage considerably and, in turn, decreases the inductor current. However, as more than few cycles are required to stabilize the output voltage, there was the problem that the response speed of the system delays to obtain stable power supply operation.

The present invention, which is made considering the aforesaid problems, provides a switching power supply which ensures the stability with no need of lowering the frequency band of the amplified error signal.

Also, the invention provides a new switching power supply which materializes stable output ripple characteristics.

Furthermore, the invention provides a new switching power supply which materializes stable oscillation frequency and output ripple characteristics.

DISCLOSURE OF INVENTION

In order to achieve the aforesaid objects, according to one of the embodiments relating to the invention, a switching power supply provided with a control switch, a synchronous switch and a series connection of an output inductor and a smoothing capacitor, wherein the input of an error amplifier is connected to the output of a power supply circuit to amplify the error between detected voltage and reference voltage, the output of said amplifier is connected an input of a first comparator and an input of a second comparator through split resistors, a filter circuit comprising resistors and a capacitor is connected in parallel to said synchronous switch, and the output of said filter circuit is connected to another input of said first comparator and another input of said second comparator, wherein a control means is configured to control the amplitude of the triangular waveform obtained through said filter circuit to be between an input level of said first comparator and an input level of said second comparator.

In accordance with the switching power supply of said configuration, a control means is provided to control the amplitude of triangular waveform signal obtained through said filter circuit to be between the input of said first comparator and the input of said second comparator, whereby the triangular waveform signal is generated by on/off operation of an output switch connected short of the filter circuit comprising a resistor and a capacitor. This is effective in respect that the phase difference between operating status of said output switch and amplified error signal can be fixed to ensure stable operation of the switching power circuit without necessity of lowering the frequency band of the error emplification signal.

Also, the current detection circuit is connected to the control switch and the filter circuit, whereby normal current and other current through the current detection circuit flow through the filter circuit. This is effective in respect that output impedance can be adjusted.

It is preferable that in said switching power supply, the said control means is configured by connecting the output of said error amplifier to an input of said second comparator through a voltage divider circuit which freely adjusts the division ratio, to control the amplitude of triangular waveform signal obtained through said filter circuit to be between an input level of said first comparator and an input level of said second comparator.

It is preferable that in said switching power supply, three or more resistors are connected in series to form a voltage divider variable part and a voltage divider fixed part, one end of said voltage divider variable part is connected between the output of said error amplifier and the input of said first comparator, the other end of said voltage divider variable part is connected to another input of said second comparator, and a switch is connected in parallel with at least one resistor provided at said voltage divider variable part, wherein the discontinuity of inductor current is detected to change the voltage division ratio freely.

In accordance with the invention, a circuit integrated into said switching power supply to automatically change the amplitude of triangular waveform by detecting the discountinuity of inductor current is effective in materializing stable output ripple characteristics.

It is preferable that in said switching power supply, said control means is provided with a current source which varies in proportion with I/O potential, said current source being connected between the middle point and the ground potential of said split resistor to generate output of a second signal, whereby the amplitude of said triangular waveform is controlled to be between said first signal and said second signal.

It is preferable that two or more said split resistors are connected in series, and a current source which varies in proportion to output voltage error is connected between the resistor cutoff point and the ground potential, to have the voltage division ratio change freely.

In accordance with the invention, a circuit integrated into said switching power supply to automatically change the amplitude of triangular waveform in proportion to the I/O potential is effective in materializing stable efficiency and output ripple characteristics.

It is preferable that said switching power supply, the amplified error signal obtained by amplifying the error between output voltage of the power supply circuit and reference voltage is compared with the triangular waveform obtained through said filter circuit and then a first comparison signal is sent to said control switch, said amplified error signal is divided and then compared with said second triangular waveform for generation of a second comparison signal, said second comparison signal is compared with the clock signal to generate said second comparison signal where there is a sharp change of the load, to change the output signal for said control switch from said clock signal to said second comparison signal to control said amplitude of the triangular waveform to be between said aamplified error signal and said voltage division signal wherein the timing of said control switch is fixed to ON by said clock signal.

It is preferable that said switching power supply, the timing of said control switch is fixed to ON by said clock signal even when there is a sharp increase of the load.

It is preferable that said switching power supply, said first comparison signal can be generated by comparing the amplified error signal obtained by amplifying the error between of output voltage of the power supply circuit and reference voltage with the triangular waveform obtained through said filter circuit, said first comparison signal is compared with the clock signal and then sent to said control switch, said amplified error signal is divided and then compared with said triangular waveform to gnerate said second comparison signal, wherein when there is a sharp change of the load, output signal for said control switch is changed from said clock signal to said first comparison signal to control the amplitude of said triangular waveform to be between said amplified error signal and said voltage division signal when there is a sharp change of the load, and the timing of said control switch is fied to OFF by said clock signal in the steady state.

It is preferable that said switching power supply, the timing of said control switch is fixed to OFF by said clock signal even when there is a sharp decrease of the load.

In accordance with the invention, the amplitude of triangular waveform obtained through the filter circuit is controlled to be between amplitudes of the amplified error signal obtained by amplifying the error between output voltage and reference voltage during a sharp change in the load and the voltage divider signal obtained by dividing the amplified error signal, and on or off timing of the control switch is fixed by the clock signal in the steady state, whereby the oscillation frequency is locked, and a signal with its phase displaced for multiphasing can be generated easily.

Also, in accordance with the invention, even without using the voltage divider signal, the oscillation frequency is locked and a signal with its phase displaced for multiphasing can be generated easily similarly with the case where voltage divider signal is used.

BEST EMBODIMENTS OF THE INVENTION

Figure 1:
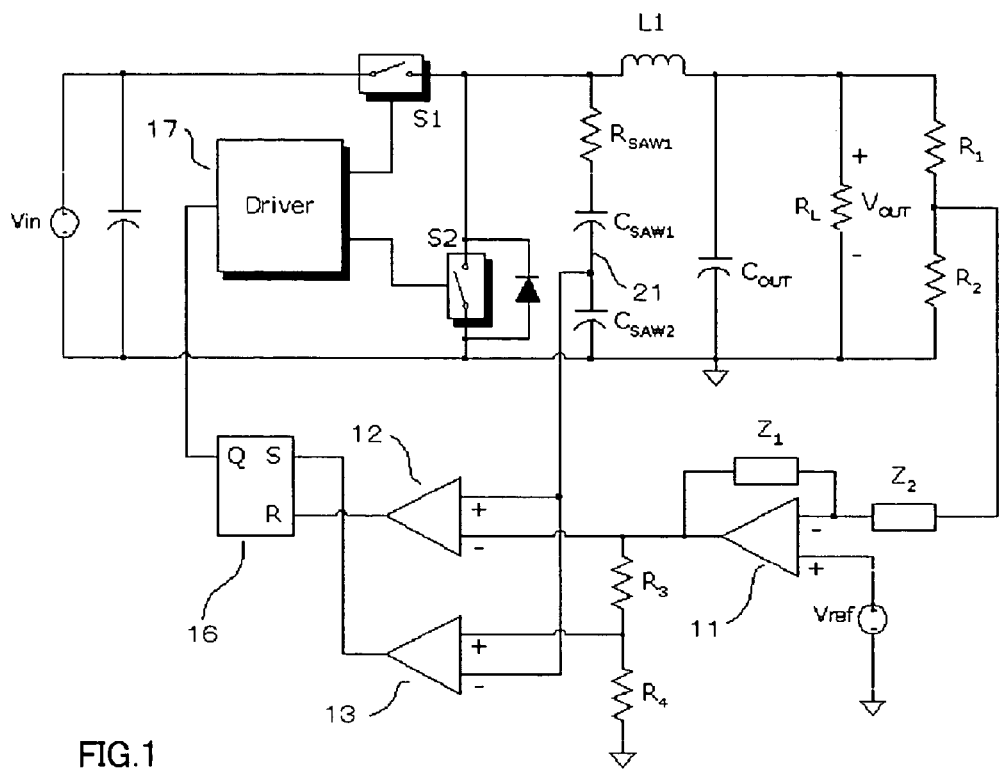
FIG. 1 shows a circuit diagram of the switching power supply relating to the first embodiment of the invention.

A switching power supply relating to the first embodiment of the invention is describeed below referring to the figures attached hereto. FIG. 1 shows a switching power supply relating to the said embodiment. C represents the capacitor, S the switching element, R the resistor, Z the impedance, 11 the error amplifier, 12 and 13 the comparators, 16 the flip flop circuit, 17 the driver, and 21 the filter circuit.

The switching power supply relating to this embodiment is provided with control switch S1, synchronous switch S2, output inductor L1, smoothing capacitor $C_{out}$, and a power supply circuit in which output inductor L1 and smoothing capacitor $C_{out}$ are connected in series. A control circuit is connected to the output of said power supply circuit, and its output is connected to control switch S1 and synchronous switch S2.

Voltage detection resistor $R_1$ and $R_2$ are provided at the output of said power supply circuit, and a connection between resistors $R_1$ and $R_2$ are connected to the negative input of error amplifier 11 to amplify the error between detected voltage and reference voltage. The output of error amplifier 11 is connected to the negative input of first comparator 12 and to the positive input of second comparator 13 through split resistors $R_3$ and $R_4$.

Filter circuit 21 comprising a series connection of resistor $R_{saw1}$ and capacitors $C_{saw1}$ and $C_{saw2}$ is connected in parallel to a series circuit comprising output inductor L1 and smoothing capacitor $C_{out}$. The output of filter circuit 21 is connected to the positive input of first comparator 12 and to the negative input of second comparator 13.

The output of first comparator 12 is connected to input on the reset side of flip flop circuit 16, and output of second comparator 13 is connected to the input on the set side of flip flop circuit 16, the output of which is connected to the input of driver 17, the output of which is connected to control switch S1 and synchronous switch S2. In this configuration, the amplitude of the triangular waveform obtained through filter circuit 21 is controlled to be between an input level of first comparator 12 and an input level of second comparator 13.

Figure 2:
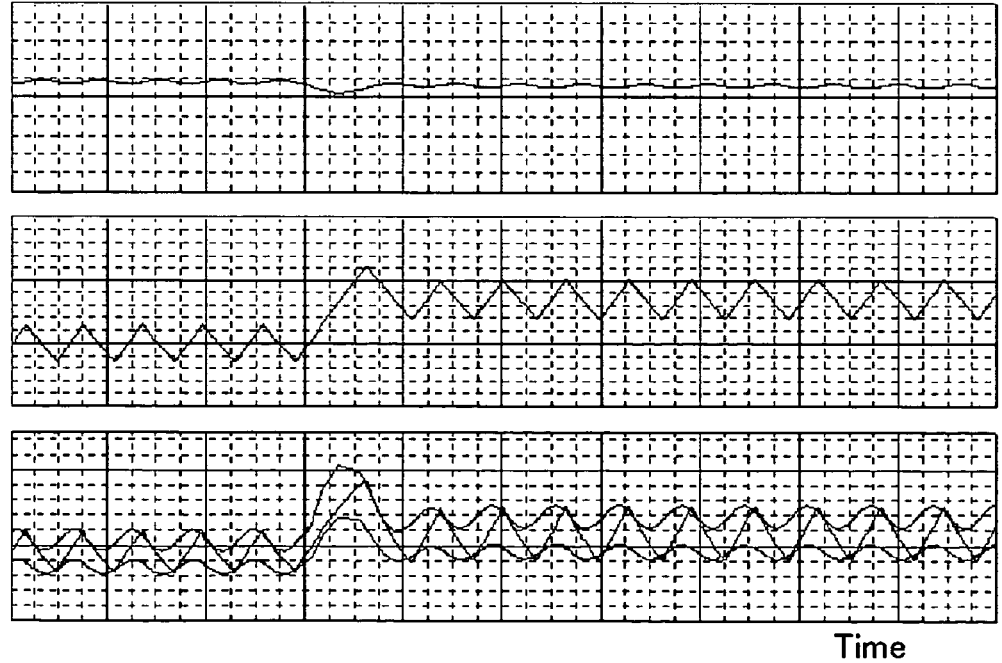
FIG. 2 shows an operational waveform diagram of the embodiment shown in FIG. 1.

The switching power supply of the said configuration operates as follows. First, Operation of the switching power supply with a sharp increase of the load current is described below. This operational waveform diagram is shown in FIG. 2. In FIG. 2, the upper part indicates the output voltage waveform, the middle part indicates the inductor current waveform, and the lower part indicates the output of error amplifier 11, and the output of error amplifier divided by resistors. In this configuration, the amplitude of the triangular waveform is controlled to be between the two signals generated through filter circuit 21. When there is a sharp increase of the load current, output voltage drops instantaneously and inductor current increases sharply as shown in FIG. 2.

Then, the triangular waveform obtained through filter circuit 21 connected in parallel to a series circuit comprising smoothing capacitor $C_{out}$ and output inductor L1 provided in the power supply circuit, and a signal generated through the error amplifier by amplifying the error between output voltage and reference voltage are used. The signal obtained through first comparator 12 is sent to the reset side of flip flop circuit 16. At the same time, the triangular waveform obtained through filter circuit 21 connected in parallel to a series circuit comprising smoothing capacitor $C_{out}$ and output inductor L1 in the power supply circuit and a signal obtained by resistance division through split resistors $R_3$ and $R_4$ of the signal obtained by amplifying the error between output voltage and reference voltage through error amplifier 11 are used. The signal obtained through second comparator 13 is sent to the set side of flip flop circuit 16. By sending the signal in this way, the amplitude of the triangular waveform is controlled to be between said two levels.

Since the triangular waveform is generated through filter circuit 21 by this control, the up slope of the triangular waveform indicates the period when current flowing through output inductor L1 increases, while the down slope of the triangular waveform indicates the period when the inductor current decreases. In this method, when the amplified error signal varies, frequency and duty ratio of the triangular waveform also change according to the extent of its transformation. By controlling the triangular waveform between the said two levels, the phase difference between waveforms of the amplied error signal and the triangular waveform is fixed at maximum 90 degrees. As the triangular waveform is generated by on/off operation of control switch S1 connected short of a series circuit comprising output inductor L1 and smoothing capacitor $C_{out}$, the phase difference between the operational state of control switch S1 and the amplified error signal is also fixed. This enables to secure the stability without reducing the frequency band of amplified error signal, signficantly improving the response rate of the switching power supply.

According to the output signal of the amplified error signal, frequency and phase of the triangular waveform change instantaneously (driving status of the two switches in the power supply is shown), and, in turn, the inductor current also changes, materializing high speed response while minimizing the drop of the output voltage.

Figure 3:
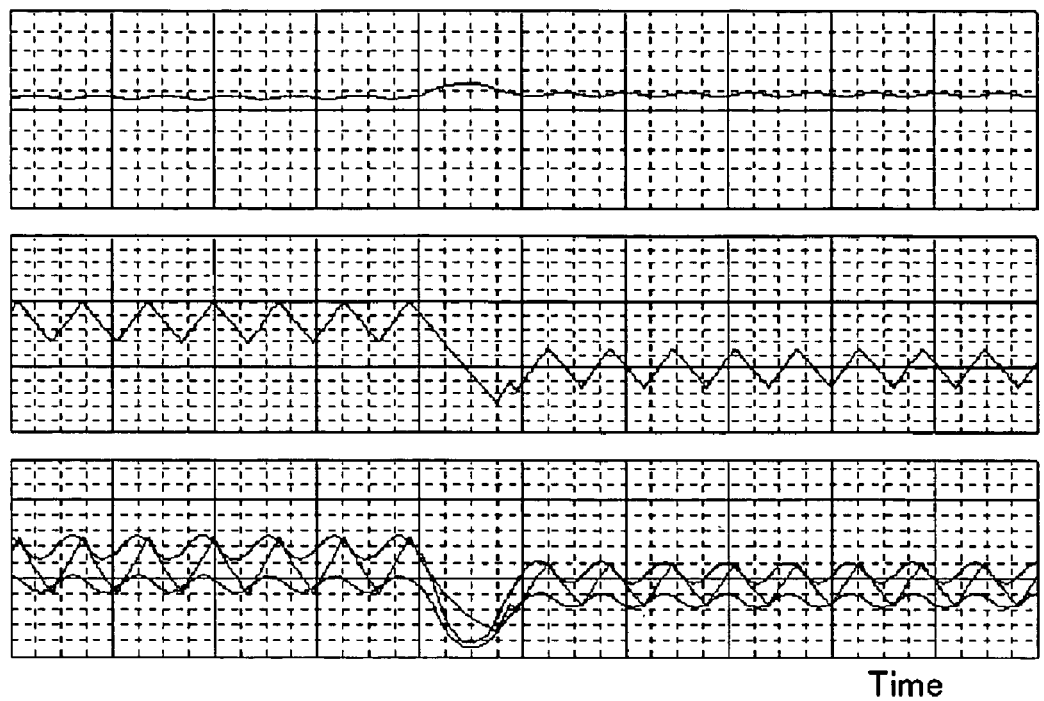
FIG. 3 shows the same operational waveform diagram.

Next, operation of the switching power supply with a sharp drop of the load current is described. This operational waveform diagram is shown in FIG. 3. In FIG. 3, the upper part indicates the output voltage waveform, the middle part indicates the inductor current waveform, and the lower part indicates the output of error amplifier 11, resistance division of the output of error amplifier 11 and the triangular waveform controlled to be between the two signal levels generated by filter circuit 21. When there is a shap drop of the load current, the output voltage leaps instantaneously and the inductor current drops sharply as shown in FIG. 3.

Then, since the amplitude of the triangular waveform is controlled to be between said two levels similarly with the case of sharp increase of the load, the down slope of the triangular waveform represents the period when the inductor current decreases, while the up slope of the the triangular waveform represents the period when tcurrent flowing through output inductor L1 increases. In this method, when the amplied error signal varies, frequency and duty ratio of the triangular waveform also change according to the extent of the transformation. By controlling the triangular waveform to be between the said two levels, the phase difference between waveforms of amplified error signal and the triangular waveform is fixed at maximum of 90 degrees. As the triangular waveform is generated by on/off operation of control switch S1 connected short of a series circuit comprising output inductor L1 and smoothing capacitor $C_{out}$, the phase difference between the operational state of control switch S1 and the amplified error signal is also fixed. This enables to secure the stability without reducing the frequency band of amplified error signal, signficantly improving the response rate of the switching mode power supply.

According to the output signal of the amplified error signal, frequency and phase of the triangular waveform change instantaneously (driving status of the two switches in the power supply is shown), and, in turn, the inductor current also changes, materializing high speed response while maximizing leap of the output voltage.

This embodiment of the switching power supply is provided with resistors $R_1$ and $R_2$ for voltage detection and a series circuit comprising output inductor L1 and smoothing capacitor $C_{out}$, which is connected in parallel to filter circuit 21 in which resistor $R_{saw1}$ and capacitors $C_{saw1}$ and $C_{saw2}$ are connected in series. This configuration keeps DC components of the amplified error output signal and the triangular waveform at approximately the same level.

Figure 4:
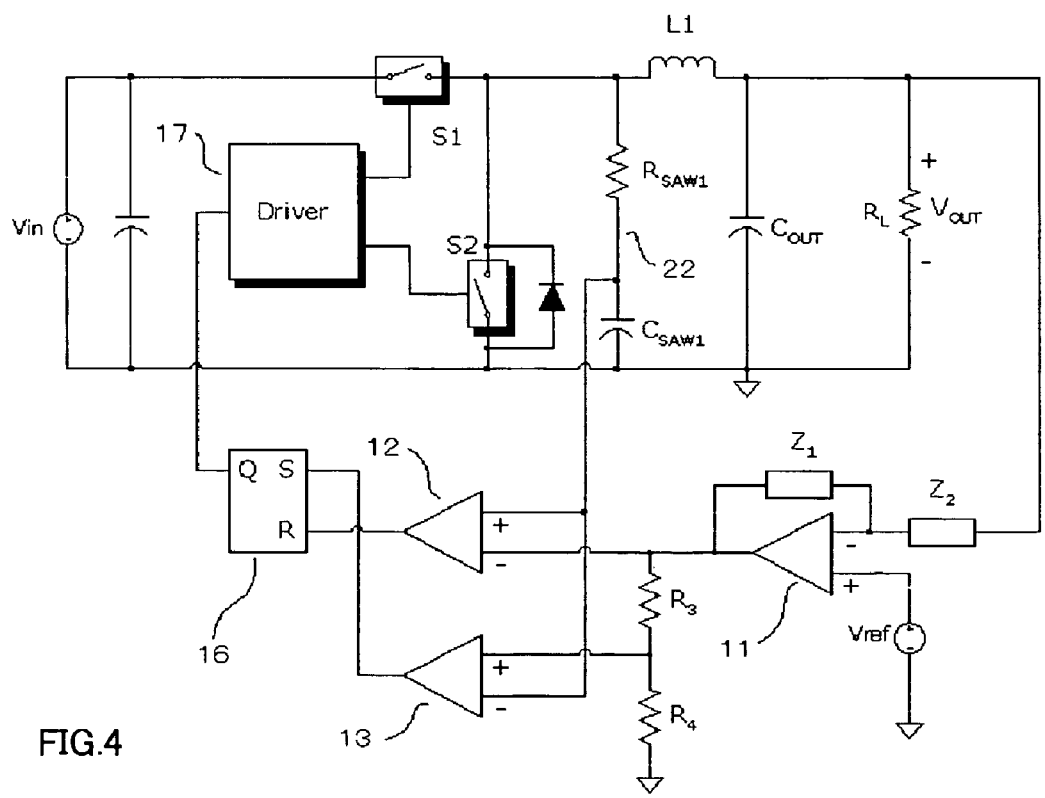
FIG. 4 shows a circuit diagram of the first transformation of the first embodiment.

FIG. 4 shows a switching power supply relating to the first transformation of this embodiment. This switching power supply is configured with the output of the power supply circuit connected to the negative input of error amplifier 11, which amplifies the the error between deteced voltage and reference voltage. The output of error amplifier 11 is connected to the negative input of first comparator 12 and to the positive input of second comparator 13 through split resistors $R_3$ and $R_4$.

Filter circuit 22 comprising serial connection of resistor $R_{saw1}$ and the capacitor $C_{saw1}$ is connected in parallel to a series circuit comprising output inductor L1 and smoothing capacitor $C_{out}$. The output of filter circuit 22 is connected to the positive input of first comparator 12 and to the negative input of second comparator 13.

The output of first comparator 12 is connected to the input on the reset side of flip flop circuit 16, and the output of second comparator 13 is connected to input on the set side of flip flop circuit 16. The output of flip flop circuit 16 is connected to the input of driver 17, output of which is connected to control switch S1 and synchronous switch S2. In this configuration, the amplitude of the triangular waveform obtained through filter circuit 22 is controlled to be between an input level of first comparator 12 and an input level of second comparator 13.

The switching power supply of the above configuration operates almost smilarly with an embodiment shown in FIG. 1, enabling to secure the stability without reducing the frequency band of amplified error signal and improving the response speed of the switching power supply. However, in this embodiment, a resistor for voltage detection is not provided at the output of the power supply circuit, and configuration of filter circuit 22 is different from filter circuit 21 of an embodiment shown in FIG. 1.

Figure 5:
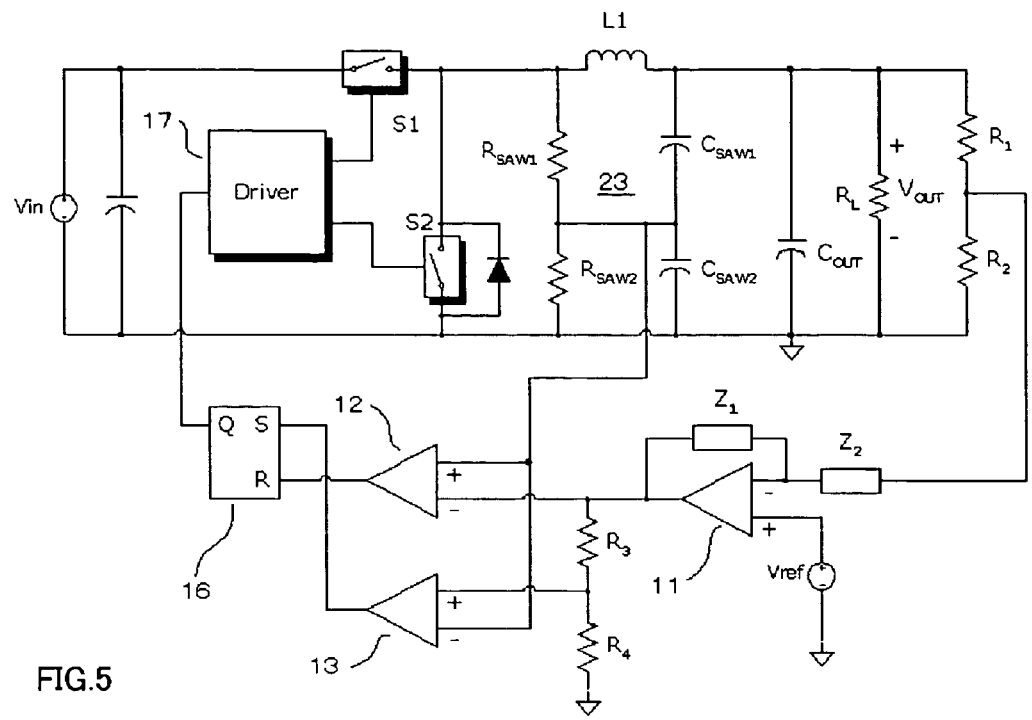
FIG. 5 shows a circuit diagram of the second transformation of the first embodiment.

FIG. 5 shows a switching power supply relating to the second transformation of this embodiment. This switching power supply is provided with resistors $R_1$ and $R_2$ for voltage detection on the output side of the power supply circuit, and the connection of said resistors $R_1$ and $R_2$ is connected to the negative input of error amplifier 11 to amplify the error between detected voltage and reference voltage. The output of error amplifier 11 is connected to the negative input of first comparator 12 and to the positive input of second comparator 13 through split resistors $R_3$ and $R_4$.

In the said transformation, filter circuit 23 is provided between input and output output inductor L1. Filter circuit 23 is configured as follows. The input of output inductor L1 is connected in series to resistors $R_{saw1}$ and $R_{saw2}$ in parallel with the synchronous switch S2, and the output of output inductor is connected in series to capacitors $C_{saw1}$ and $C_{saw2}$ in parallel with synchronous switch S2. A connection is provided each between resistors $R_{saw1}$ and $R_{saw2}$ connected in series and between capacitors $C_{saw1}$ and $C_{saw2}$ connected in series. Filter circuit 23 is configured by coupling the two connections. The said connections, which work as the output of filter circuit 23, are connected to the positive input of first comparator 12 and the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this confihuration, the amplitude of the triangular waveform obtained through filter circuit 25 is controlled to be between an input level of first comparator 12 and an input level of second comparator 13.

The switching power supply of said configuration operates almost similarly with an embodiment shown in FIG. 1, enabling to secure the stability without lowering frequency band of the amplified error amplifier signal and significantly improving the response speed of the switching power supply.

Figure 6:
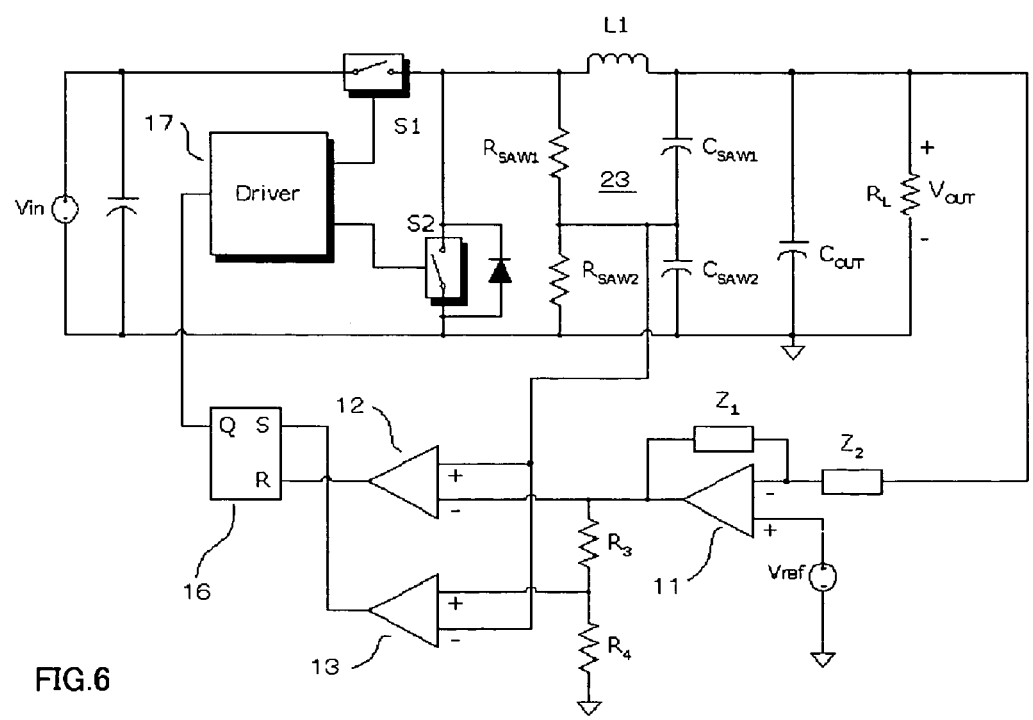
FIG. 6 shows a circuit diagram of the third transformation of the first embodiment.

FIG. 6 shows the third transformation of this embodiment having very similar configuration with a transformation shown in FIG. 5. The switching power supply is configured with output of the power supply circuit connected to the negative input of error amplifier 11, which amplifies the error between detected voltage and reference voltage. This switching power supply operates almost similarly with an embodiment shown in FIG. 4, enabling to secure the stability without lowering frequency band of the amplified error signal and siginificantly improving the response speed of the switching power supply.

Figure 7:
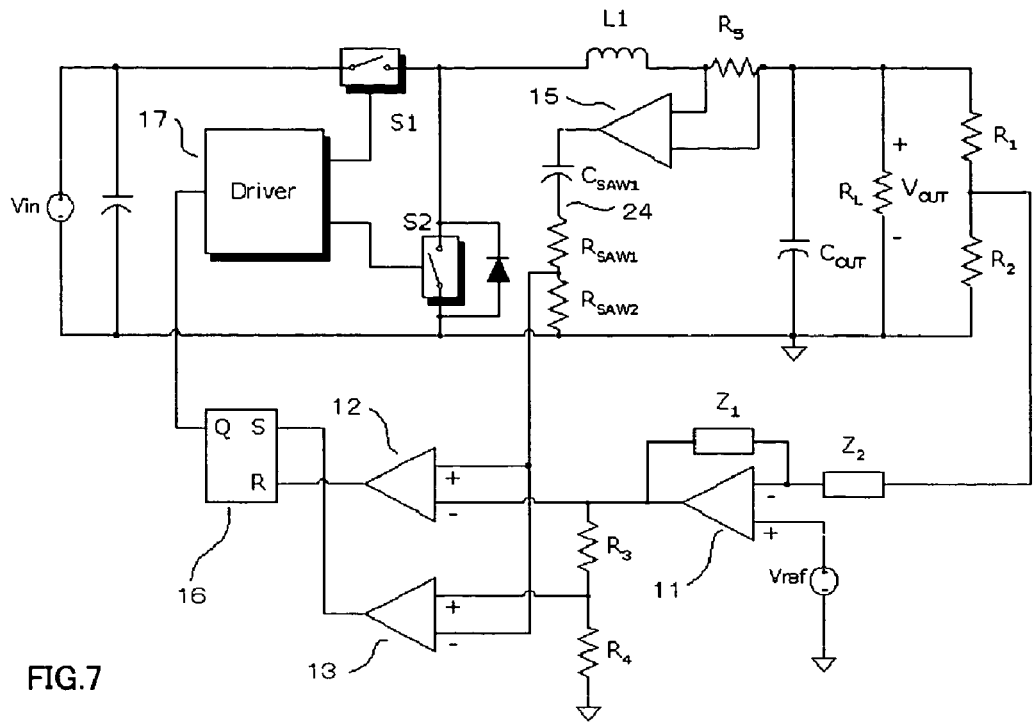
FIG. 7 shows a circuit diagram of the fourth transformation of the first embodiment.

FIG. 7 shows a switching power supply relating to the fourth transformation of this embodiment. The switching power supply is provided with resistors $R_1$ and $R_2$ for voltage detection purposes at the output of the power supply circuit, and a connection between resistors $R_1$ and $R_2$ is connected to the negative input of error amplifier 11, which amplifies the error between detected voltage and reference voltage. The output of error amplifier 11 is connected to the negative input of first comparator 12 and to the positive input of second comparator 13 through split resistors $R_3$ and $R_4$.

In this transformation, resistor $R_5$ for current detection is connected between output inductor L1 and smoothing capacitor $C_{out}$, with its input connected to the positive input of buffer amplifier 15 and its output connected to the negative input of buffer amplifier 15. The output of buffer amplifer 15 is connected to filter circuit 24 in which capacitor $C_{saw1}$ is connected in series to resistors $R_{saw1}$ and $R_{saw2}$. The output of filter circuit 24 is connected to the positive input of first comparator 12 and the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 24 is controlled to be between an input level of first comparator 12 and an input level of second comparator 13.

The switching power supply of said configuration operates almost similarly with an embodiment shown in FIG. 1, enabling to secure the stability without lowering the frequency band of the amplified error signal and siginificantly improving the response speed of the switching power supply. Also, this embodiment is provided with resistors $R_1$ and $R_2$ for voltage detection and filter circuit 24 in which capacitor $C_{saw1}$ is connected in series to resistors $R_{saw1}$ and $R_{saw2}$. This configuration enables pick up high-frequency components only.

Figure 8:
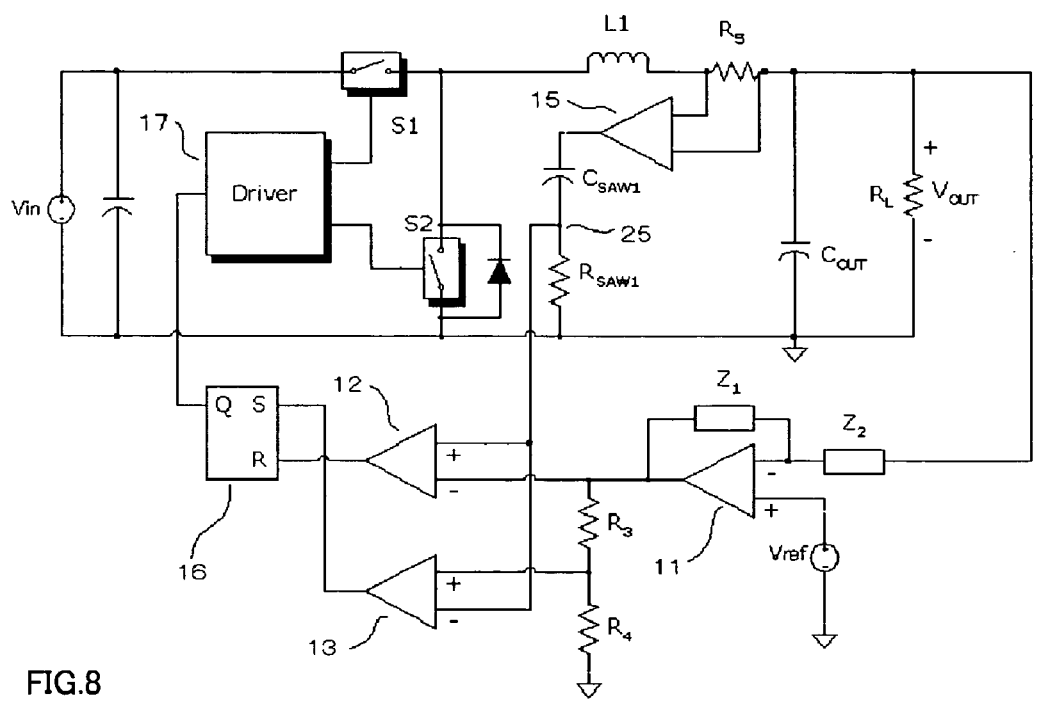
FIG. 8 shows a circuit diagram of the fifth transformation of the first embodiment.

FIG. 8 shows a switching power supply relating to the fifth transformation of this embodiment. The switching power supply is configured with output of the power supply circuit connected to the negative input of error amplifier 11, which amplifies the error between detectedi voltage and reference voltage. The output of error amplifier 11 is connected to the negative input of first comparator 12 and to the positive input of second comparator 13 through split resistors $R_3$ and $R_4$.

In this transformation, resistor $R_5$ for current detection is connected between output inductor L1 and smoothing capacitor $C_{out}$, with its input connected to the positive input of buffer amplifier 15 and its output is connected to the negative input of buffer amplifier 15. The output of buffer amplifier 15 is connected to filter circuit 25 in which capacitor $C_{saw1}$ and resistor $R_{saw1}$ are connected in series.

The output of filter circuit 25 is connected to the positive input of first comparator 12 and to the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 25 is controlled to be between an input level of first comparator 12 and an t input level of second comparator 13.

The switching power supply of said configuration operates almost similarly with a transformation shown in FIG. 4, enabling to secure the stability without lowering the frequency band of the amplified error signal and significantly improving the response speed of the switching power supply.

Figure 9:
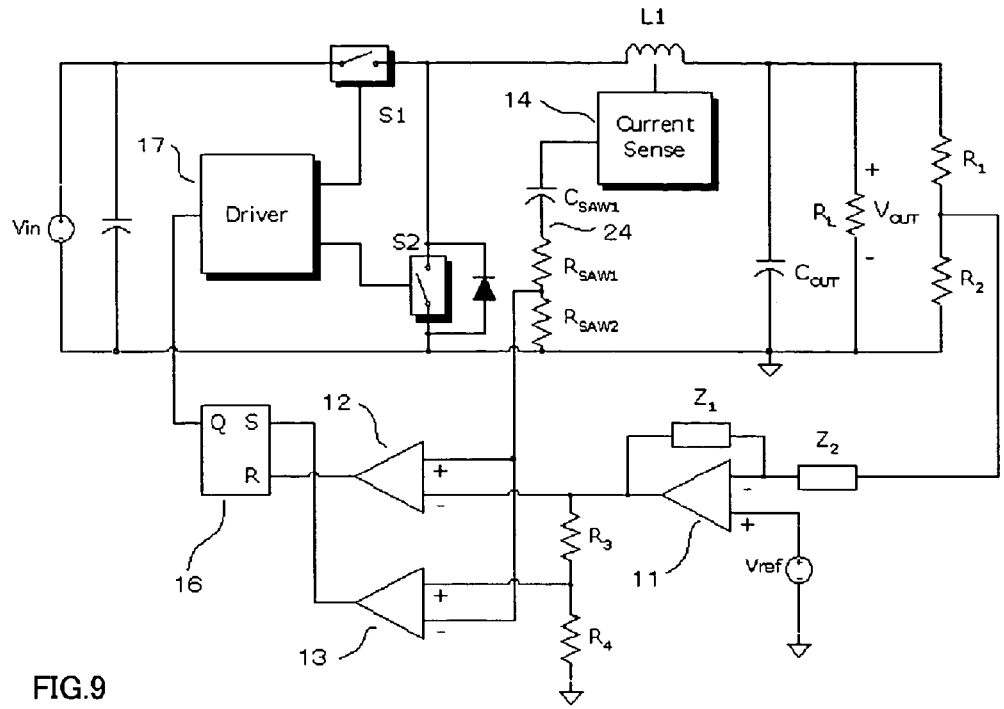
FIG. 9 shows a circuit diagram of the sixth transformation of the first embodiment.

In the sixth transformation shown in FIG. 9, current detection circuit 14 is connected to output inductor L1, the output of which is connected to filter circuit 24 in which capacitor $C_{saw1}$ is connected in series to resistors $R_{saw1}$ and $R_{saw2}$. Other configuration is very similar to the one of the fourth transformation shown in FIG. 7. In the eighth transformation shown in FIG. 10, output inductor L1 is connected to current detection circuit 14, the output of which is connected to filter circuit 25 in which capacitor $C_{saw1}$ and resistor $R_{saw1}$ are connected in series. Other configuration is almost same the fifth transformation shown in FIG. 8.

Figure 10:
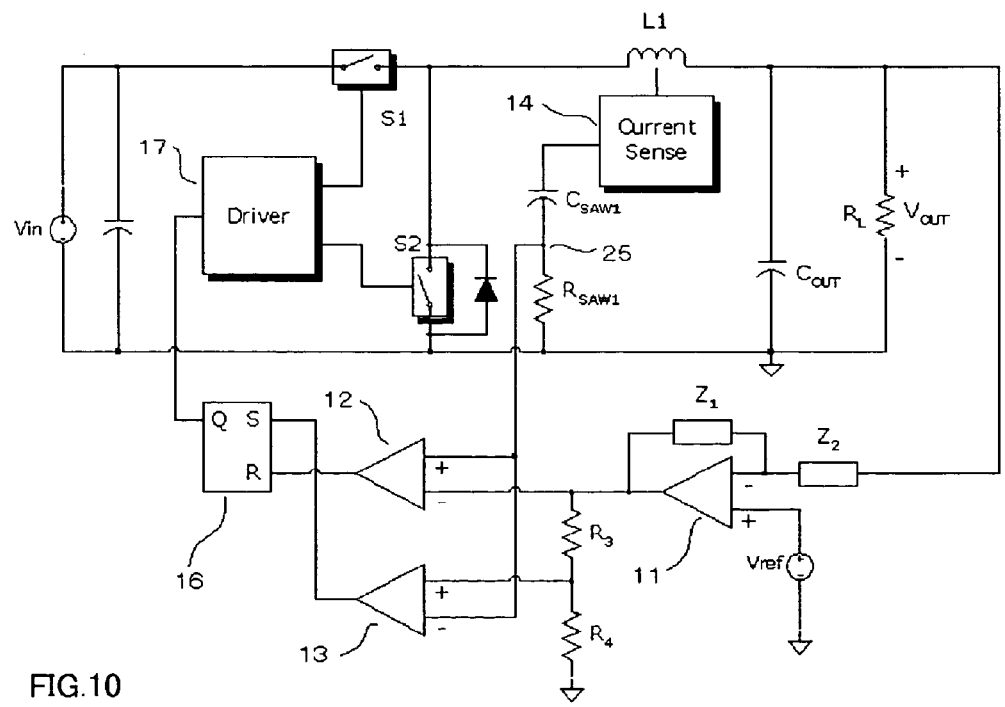
FIG. 10 shows a circuit diagram of the seventh transformation of the first embodiment.

The switching power supply of the sixth transformation with the configuration shown in FIG. 9 operates almost similarly with a switching power supply shown in FIG. 7, and a switching power supply of the seventh transformation shown in FIG. 10 operates almost similarly with a switching power supply shown in FIG. 8.

Figure 11:
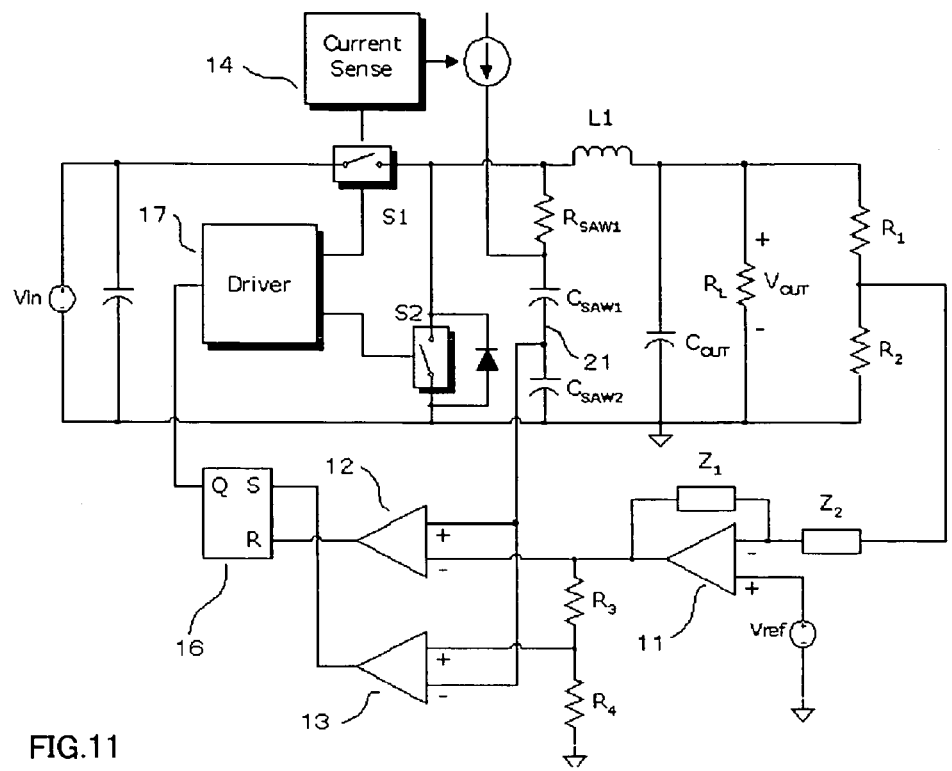
FIG. 11 shows a circuit diagram of the eighth transformation of the first embodiment.
Figure 12:
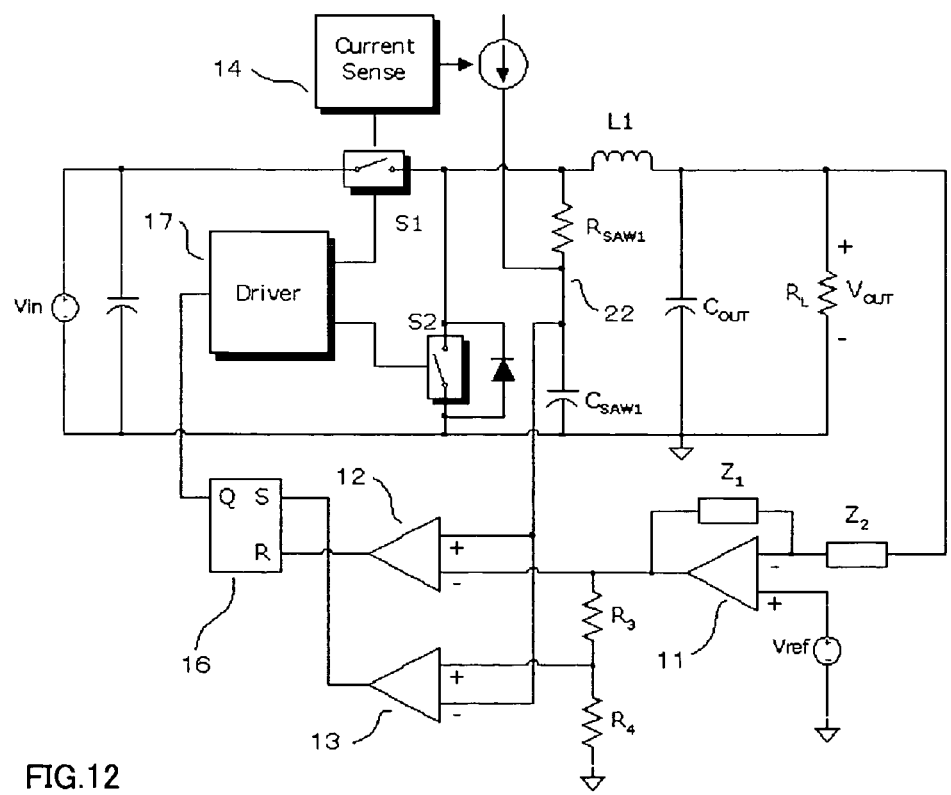
FIG. 12 shows a circuit diagram of the ninth transformation of the first embodiment.
Figure 13:
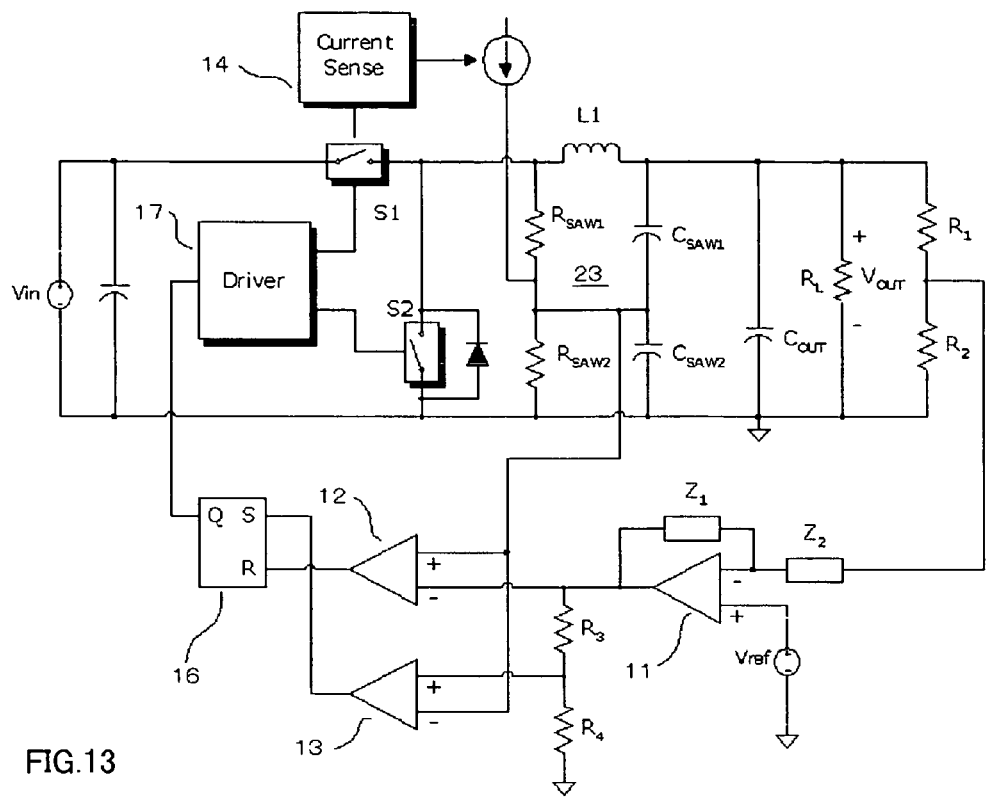
FIG. 13 shows a circuit diagram of the tenth transformation of the first embodiment.
Figure 14:
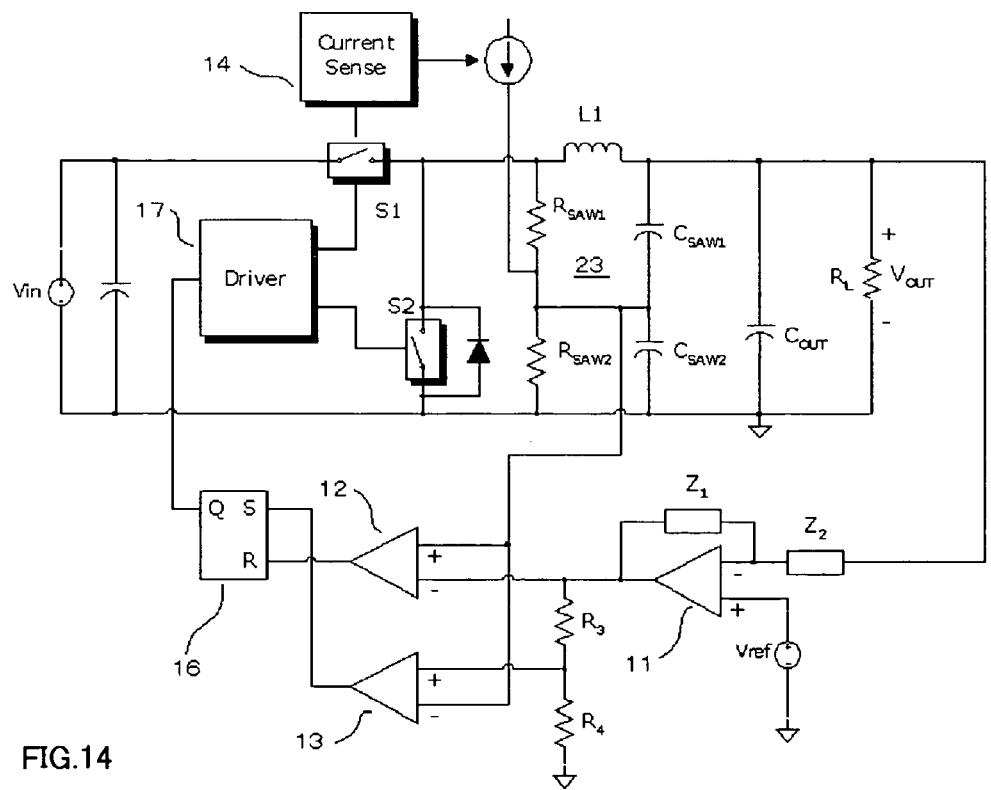
FIG. 14 shows a circuit diagram of the eleventh transformation of the first embodiment.

A transformation shown in FIG. 11 represents an embodiment shown in FIG. 1, a transformation shown in FIG. 12 represents a transformation shown in FIG. 4, a transformation shown in FIG. 13 represents a transformation shown in FIG. 5, and a transformation shown in FIG. 14 represents a transformation shown in FIG. 6. In these transformations, control switch S1 is connected to current detection circuit 14, output of which is connected to another terminal of resistor $R_{saw1}$ connected to the output terminal of output inductor L1.

Respective switching power supplies of said configuration shown in FIG. 11 and

FIG. 14 operate almost similarly with switching power supplies shown in FIG. 1, FIG. 4, FIG. 5 anf FIG. 6, but also adjust output impedance by adding current flow from current detection circuit in filter circuits 21, 22, 23 and 24.

Next, a switching power supply relating to the second embodiment of the invention is describeed. Those having been describeed on the first embodiment are omitted.

Figure 15:
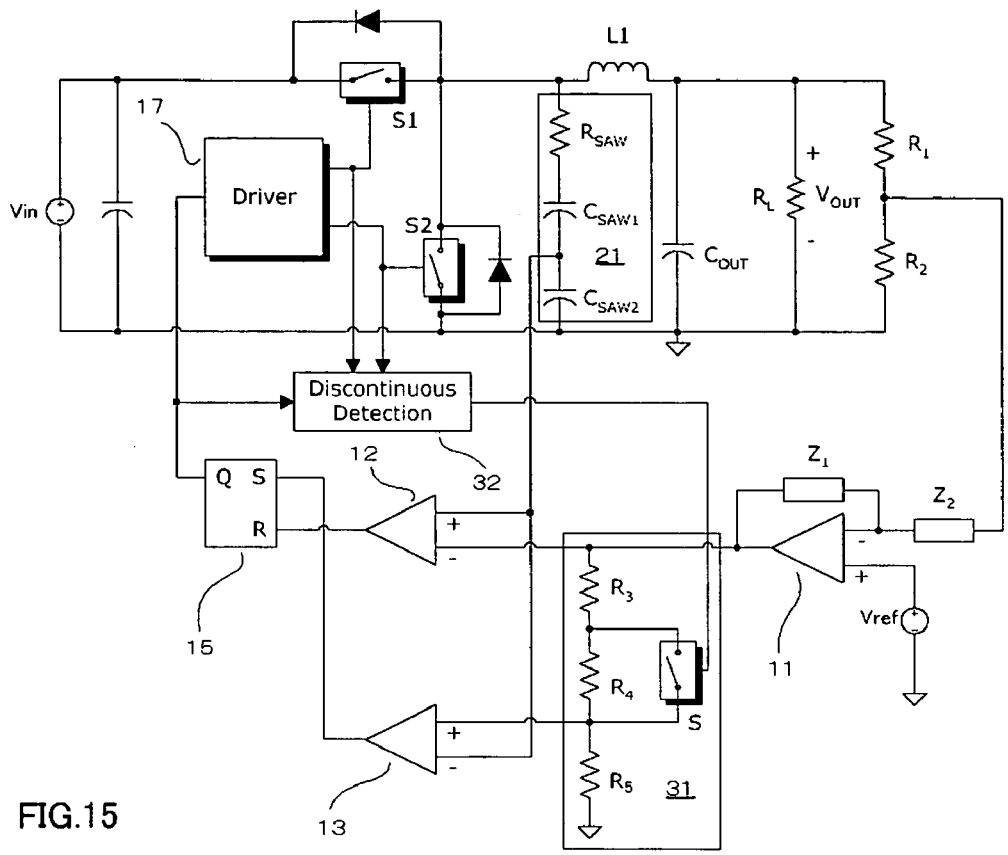
FIG. 15 shows a circuit diagram of the switching power supply relating to the second embodiment of the invention.

FIG. 15 shows a switching power supply relating to the said embodiment. C represents the capacitor, S the switching element, R the resistor, Z the impedance, 11 the error amplifier, 12 and 13 the comparators, 31 the voltage divider circuit, 16 the flip flop circuit, 32 the current discontinuity mode detection circuit, 17 the driver, and 21 the filter circuit.

The switching power supply relating to this embodimentis provided smilarly with the first embodiment, with control switch S1, synchronous switch S2, output inductor L1, capacitor $C_{out}$, and a power supply circuit in which output inductor L1 and smoothing capacitor $C_{out}$ are connected in series. The control circuit is connected to the output of the said power supply circuit and control switch S1 and synchronous switch S2.

Resistors $R_1$ and $R_2$ for voltage detection are provided at the output of the power supply circuit, and a connection between the resistors is connected to the negative input of error amplifier 11, which amplifies the error between detected voltage and reference voltage. Output of error amplifier 11 is connected to the negative input of first comparator 12 and voltage divider circuit 31. In this configuration, the amplitude of the triangular waveform is controlled to be between a first signal obtained by amplifying the error between output voltage and reference voltage and a second signal obtained by dividing the first signal through voltage division circuit 31.

In particular, voltage divider circuit 31 comprises a series connection of resistors $R_3$, $R_4$ and $R_5$, in which resistors $R_3$ and $R_4$ form voltage division variables, one end of resistor $R_3$ is connected between output of error amplifier 11 and the negative input of first comparator 12, and another end of resistor $R_4$ is connected to the positive input of second comparator 13. Resistor $R_5$ connected in series to resistor $R_4$ forms a voltage divider fixed part, and another end of resistor $R_5$ is grounded. Switch S is connected in parallel to both terminals of resistor $R_4$. Current discontinuity mode detection circuit 32 is connected to the control terminal of switch S and the input of driver 17, control switch S1 and the control terminal of synchronous switch S2, to freely change the voltage division ratio with switch S turned on when the current discontinuity mode is detected.

A series circuit comprising output inductor L1 and smoothing capacitor $C_{out}$ is connected in parallel to filter circuit 21 in which resistor $R_{saw1}$ is connected in series to capacitors $C_{saw1}$ and $C_{saw2}$. The output of filter circuit 21 is connected to the positive input of first comparator 12 and the negative input of second comparator 13.

The output of first comparator 12 is connected to input on the reset side of flip flop circuit 16, and output of second comparator 13 is connected to the input on the set side of flip flop circuit 16. The output of flip flop circuit 16 is connected to input of driver 17, the output of which is connected to control switch S1 and the control terminal of synchronous switch S2. In this configuration, the amplitude of the triangular waveform obtained through filter circuit 21 is controlled to be between an input level of first comparator 12 and an input level of second comparator 13.

The switching power supply of the said configuration operates as follows. Explanation about the current discontinuity mode is omitted as the switching power supply operates almost similarly with those having control means of prior art.

Figure 16:
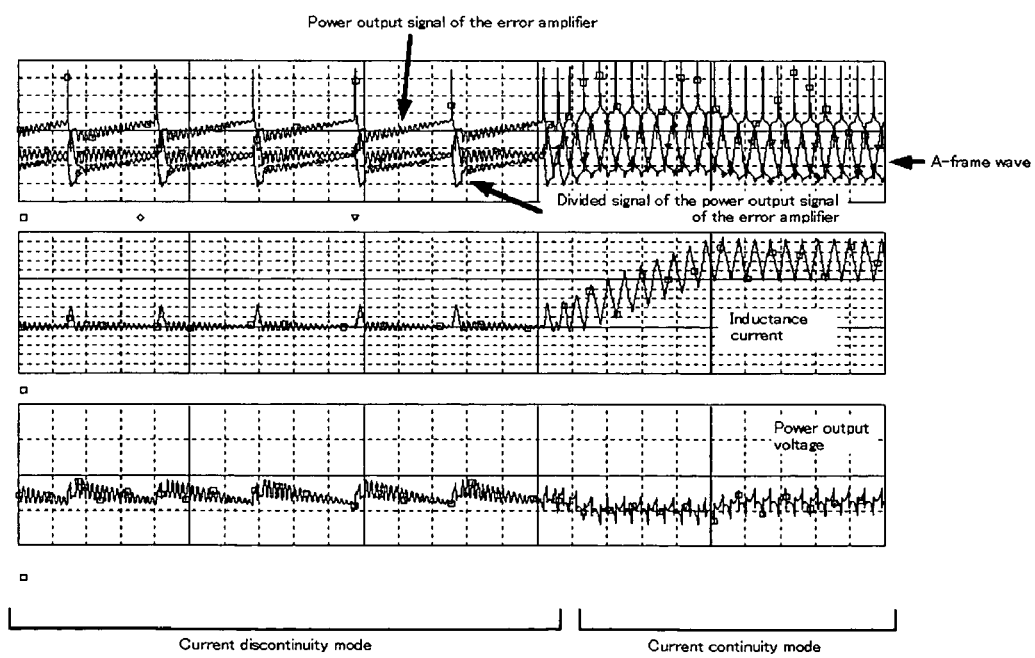
FIG. 16 shows an operational waveform diagram relating to of the embodiment shown in FIG. 15.

Operation of the switching power supply in the current discontinuity mode is describeed below. This operational waveform diagram is shown in FIG. 1.6. In FIG. 16, the lower part indicates the output voltage waveform, the middle part indicates the inductor current waveform and the upper part indicates the output of error amplifier 11, resistance division of the output of error amplifier 11 and the triangular waveform controlled to be between the two signal levels generated through filter circuit 21.

As shown in the middle of FIG. 16, when current is in the discontinuity mode, output voltage becomes unstable and detected by current discontinuity mode detection circuit 32. Current discontinuity mode detection circuit 32 sends the detected signal to switch S provided in voltage divider circuit 31. This turns switch S on, clamping resistor $R_4$ and causing a significant transformation of the voltage division ratio of voltage divider circuit 31 and subsequent transformation of the triangular waveform. This operation controls the increase in the ripple of the output voltage.

When the current discontinuity mode changes to the current continuity mode, current discontinuity mode detection circuit 32 detects the current continuity mode. Current discontinuity mode detection circui 32 sends the detected signal to switch S provided in voltage divider circuit 31. This operation turns switch S off, changing resistance of the voltage divider variable part of voltage divider circuit 31 to the normal value which is the sum of resistors $R_3$ and resistor $R_4$.

Figure 17:
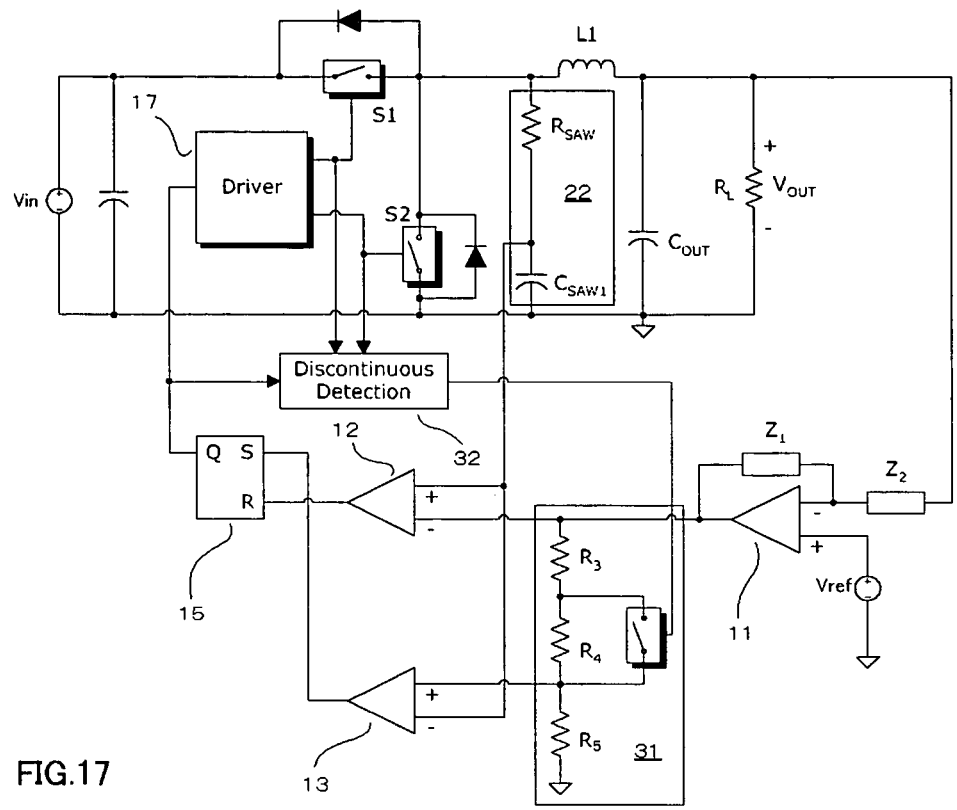
FIG. 17 shows a circuit diagram of the first transformation of the second embodiment.

FIG. 17 shows a switching power supply relating to the first transformation of this embodiment. The switching power supply is configured with output of the power supply circuit connected to the negative input of error amplifier 11, which amplifies the error between detected voltage and reference voltage. The output of error amplifier 11 is connected to the negative input of first comparator 12 and to the positive input of second comparator 13 through voltage divider circuit 31.

Filter circuit 22 comprising a series connection of resistor $R_{saw1}$ and capacitor $C_{saw1}$ is connected in parallel to a series circuit comprising output inductor L1 and smoothing capacitor $C_{out}$. The output of filter circuit 22 is connected to thepositive input of first comparator 12 and to the negative input of second comparator 13.

The output of first comparator 12 is connected to input on the reset side of the flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 22 is controlled to be between an input level of first comparator 12 and an input level of second comparator 13.

The switching power supply of said configuration operates almost similarly with an embodiment shown in FIG. 15, detecting the discontinuity of inductor current and materializing stable ripple characteristics through an integrated circuit which automatically changes the amplitude of the triangular waveform. However, the switching power supply of this embodiment is not provided with a resistor for voltage detection at the output side of the power supply circuit, and the configuration of filter circuit 22 is different from filter circuit 21 of an embodiment shown in FIG. 15.

Figure 18:
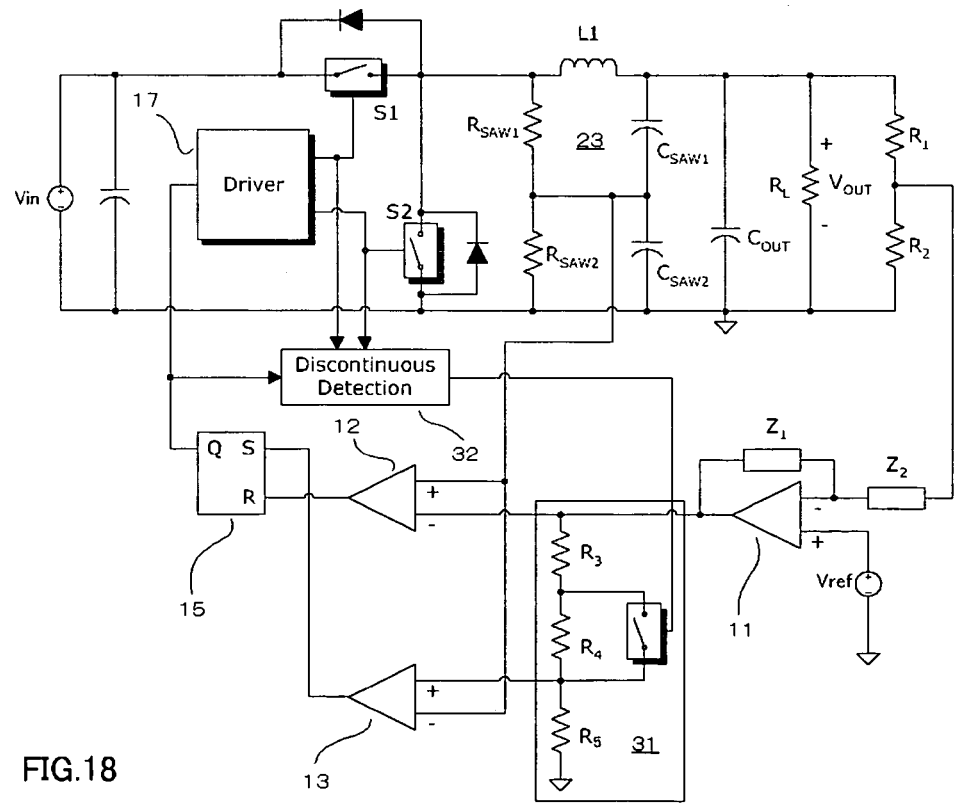
FIG. 18 shows a circuit diagram of the second transformation of the second embodiment.

FIG. 18 shows a switching power supply relating to the second transformation of this embodiment. The switching power supply is provided with resistors $R_1$ and $R_2$ for voltage detection at the output of the power supply circuit, and a connection between the resistors is connected to the negative input of error amplifier 11 which amplifies the error between detected voltage and reference voltage. The output of error amplifier 11 is connected to the negative input of first comparator 12 and to the positive input of second comparator 13 through voltage divider circuit 31.

In said transformation, filter circuit 23 is provided between input and output of output inductor L1. Filter circuit 23 comprises resistors $R_{saw1}$ and $R_{saw2}$ connected in parallel to synchronous swithch S2 and to the input of output inductor L1 and capacitors $C_{saw1}$ and $C_{saw2}$ connected in parallel to synchronous switch S2 and to the output of output inductor L1. A connection is provided each between resistors $R_{saw1}$ and $R_{saw2}$ connected in series and between capacitors $C_{saw1}$ and $C_{saw2}$ connected in parallel. Filter circuit 23 is formed by coupling those two connections. The said connections constitute the outputs of filter circuit 23, which are connected to the positive input of first comparator 12 and to the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 25 is controlled to be between an input level of first comparator 12 and an input level of second comparator 13.

The switching power supply of said configuration operates almost similarly with an embodiment shown in FIG. 15, detecting the discontinuity of the inductor current and materializing stable ripple characteristics through an integrated circuit which automatically changes the mplitude of the triangualr waveform.

Figure 19:
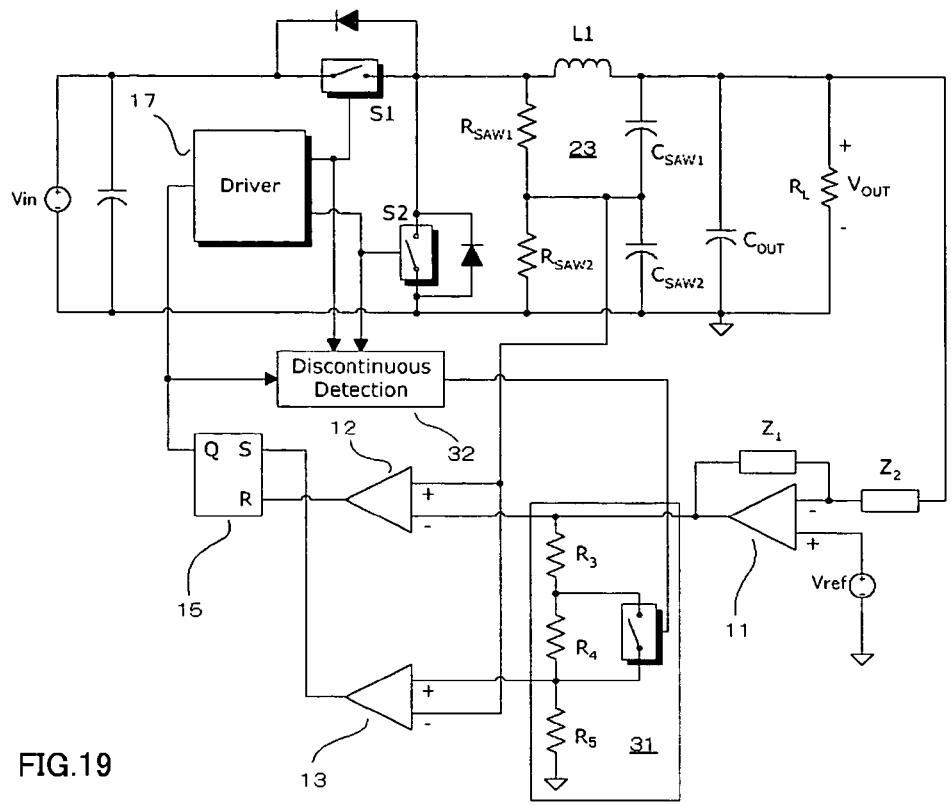
FIG. 19 shows a circuit diagram of the third transformation of the second embodiment.

FIG. 19 shows a switching power supply of the third transformation of this embodiment which has a configuration almost same as a transformation shown in FIG. 18. This switching power supply is configured with output of the power supply circuit connected to the negative input of error amplifier 11 which amplifies the error between detected voltage and reference voltage. The switching power supply operates almost similarly with the transformation shown in FIG. 17, detecting the discontinuity of inductor current and materializing stable ripple characteristics through an integrated circuit which automatically changes the amplitude of the triangular waveform.

Figure 20:
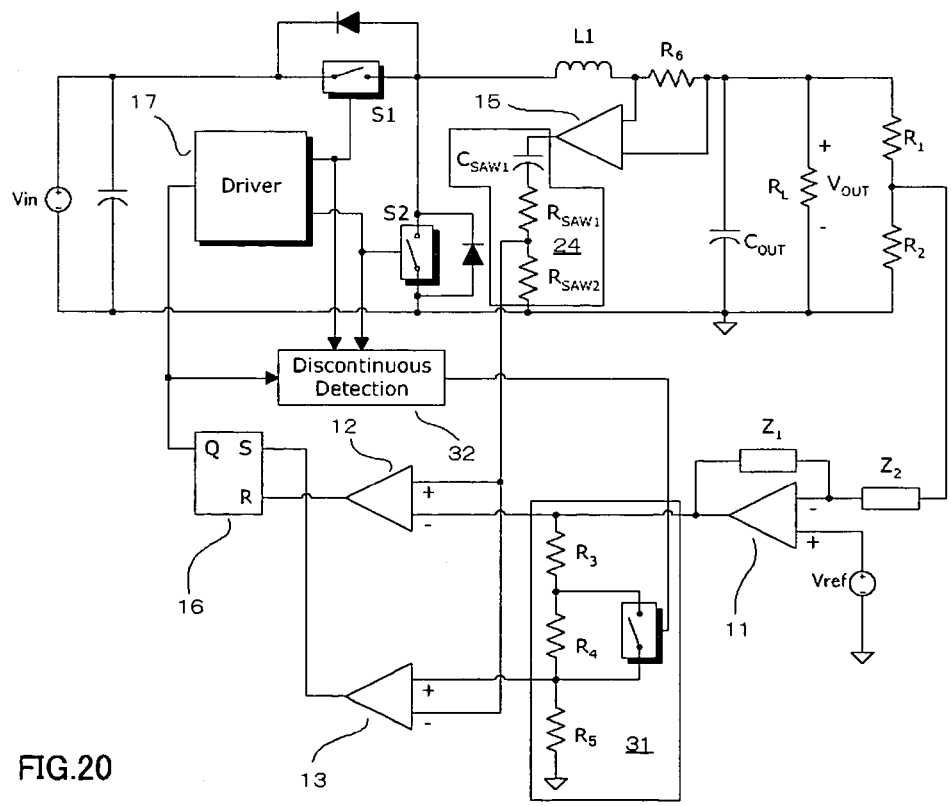
FIG. 20 shows a circuit diagram of the fourth transformation of the second embodiment.

FIG. 20 shows a switching power supply relating to the fourth transformation of this embodiment. The switching power supply is provided with resistors $R_1$ and $R_2$ for voltage detection at the output of the power supply circuit, and a connection between resistors $R_1$ and $R_2$ is connected to the negative input of error amplifier 11, which amplifies the error between detected voltage and reference voltage. The output of error amplifier 11 is connected to the negative input of first comparator 12 and to the positive input of second comparator 13 through voltage divider circuit circuit 31.

In this transformation, resistor $R_6$ for current detection is connected between output inductor L1 and smoothing capacitors $C_{out}$, with its input connected to the positive input of buffer amplifier 15, and and its output to the negative input of buffer amplifier 15. The output of buffer amplifier 15 is connected to filter circuit 24 in which capacitor $C_{saw1}$ is connected in series to resistors $R_{saw1}$ and $R_{saw2}$. The output of filter circuit 24 is connected to the positive input of first comparator 12 and to the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 24 is controlled to be between an input level of first comparator 12 and an input level of second comparator 13.

The switching power supply of said configuration operates almost similarly with an embodiment shown in FIG. 15, detecting the discontinuity of inductor current and materializing stable ripple characteristics through an integrated circuit which automatically changes the amplitude of the triangular waveform. Provided with resistors $R_1$ and $R_2$ for voltage detection and filter circuit 24 in which capacitor $C_{saw1}$ is connected in series to resistors $R_{saw1}$ and $R_{saw2}$, the switching power supply can pick up high-frequency components only.

Figure 21:
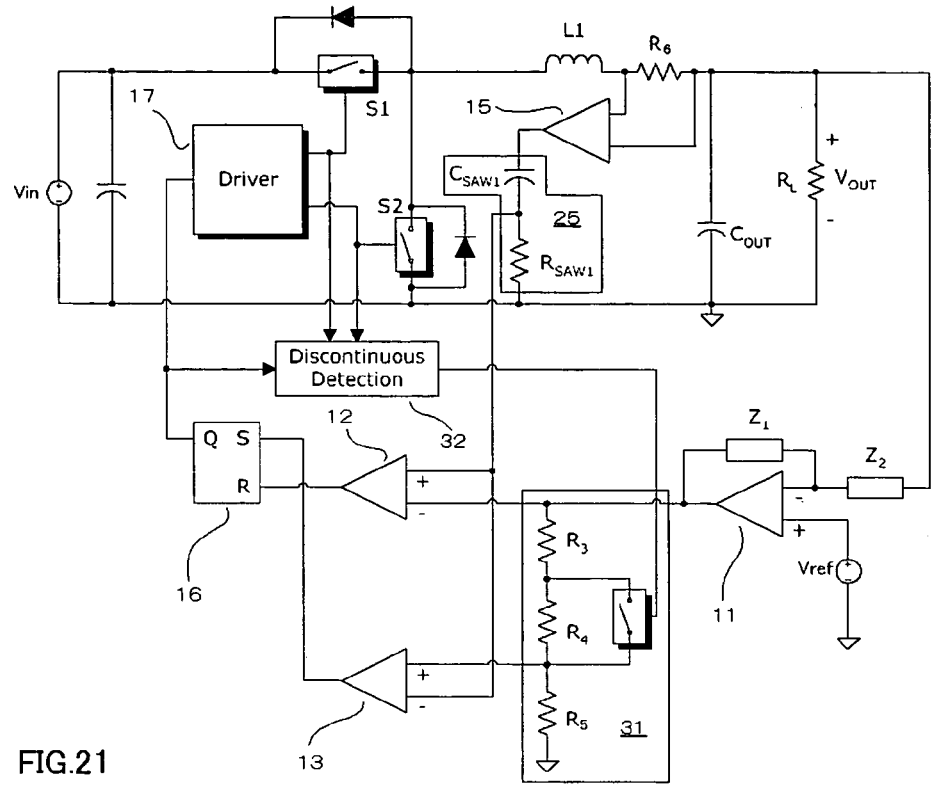
FIG. 21 shows a circuit diagram of the fifth transformation of the second embodiment.

FIG. 21 shows a switching power supply relating to the fifth transformation of this embodiment. Said switching power supply is configured with the output of the power supply circuit connected to the negative input of error amplifier 11 which amplifies the error between detected voltage and reference voltage. The output of error amplifier 11 connected to the negative input of first comparator 12 and to the positive input of second comparator 13 through voltage divider circuit 31.

In this transformation, resistor $R_5$ for current detection is connected between output inductor L1 and smoothing capacitor $C_{out}$, with its input connected to the positive input of buffer amplifier 15 and its output to the negative input of buffer amplifier 15. The output of buffer amplifier 15 is connected to filter circuit 25 comprising a series connection of capacitor $C_{saw1}$ and resistor $R_{saw1}$. The output of filter circuit 25 is connected to the positive input of first comparator 12 and the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 25 is controlled to be between an input level of first comparator 12 and an input level of second comparator 13.

The switching power supply of said configuration operates almost similarly with a transformation shown in FIG. 17, detecting the discontinuity of inductor current and matrializing stable ripple characteristics through an integrated circuit which automatically changes the amplitude of the triangular waveform.

Figure 22:
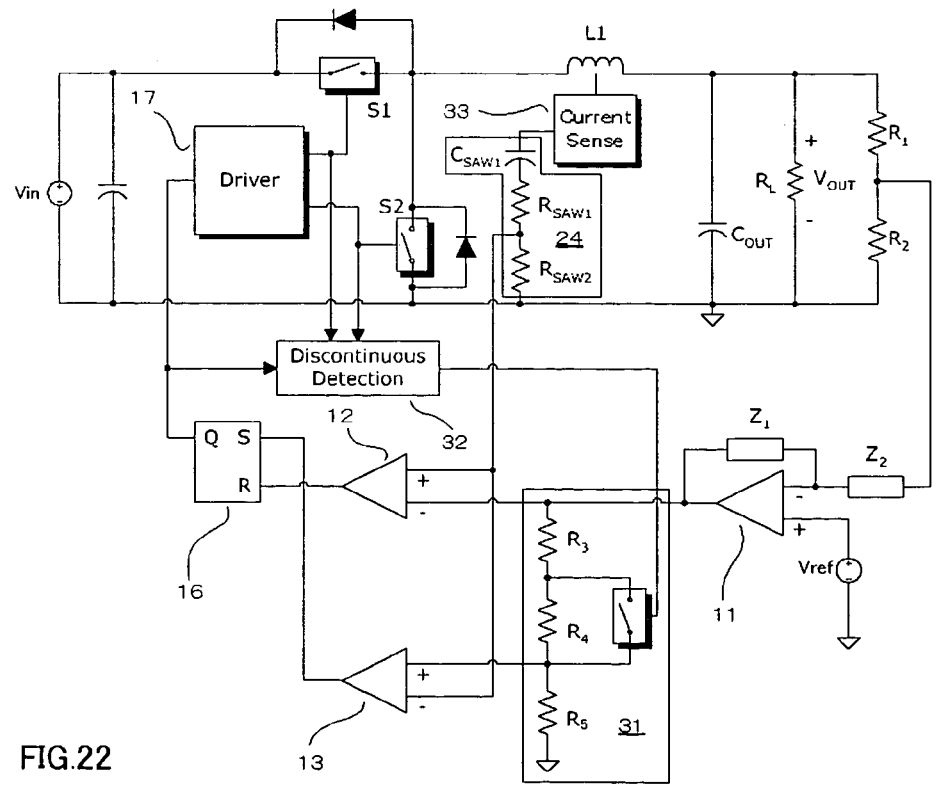
FIG. 22 shows a circuit diagram of the sixth transformation of the second embodiment.

A switching power supply of the sixth transformation shown in FIG. 22 has output inductor L1 connected to current detection circuit 33 which is connected to filter circuit 24 comprising a series connection of capacitor $C_{saw1}$ and resistors $R_{saw1}$ and $R_{saw2}$. Other configuration is almost same as the fourth transformation shown in FIG. 20. The switching power supply of the sixth transformation shown in FIG. 22 operates almost similarly with a switching power supply shown in FIG. 20.

Figure 23:
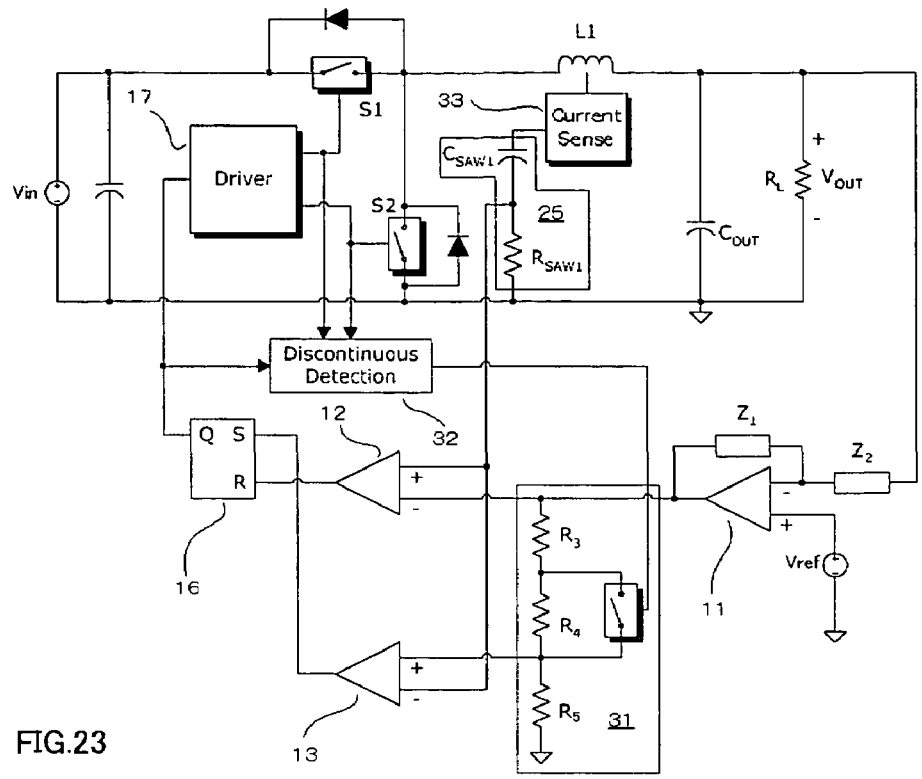
FIG. 23 shows a circuit diagram of the seventh transformation of the second embodiment.

A switching power supply of the seventh transformation shown in FIG. 23 also has output inductor L1 connected to current detection circuit 33, output of which is connected to filter circuit 25 comprising a series connection of capacitor $C_{saw1}$ and resistor $R_{saw1}$. Other configuration is almost same as the fifth transformation shown in FIG. 21. The switching power supply of the said configuration of the seventh transformation shown in FIG. 23 operates almost similarly with a switching power supply shown in FIG. 21.

Figure 24:
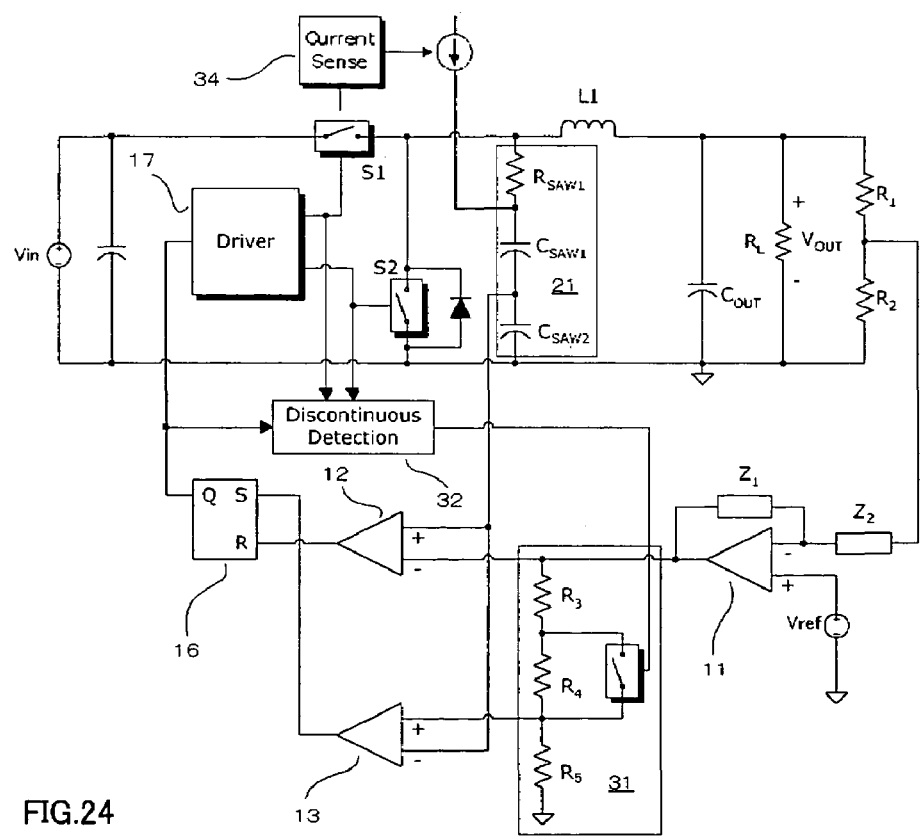
FIG. 24 shows a circuit diagram of the eighth transformation of the second embodiment.
Figure 25:
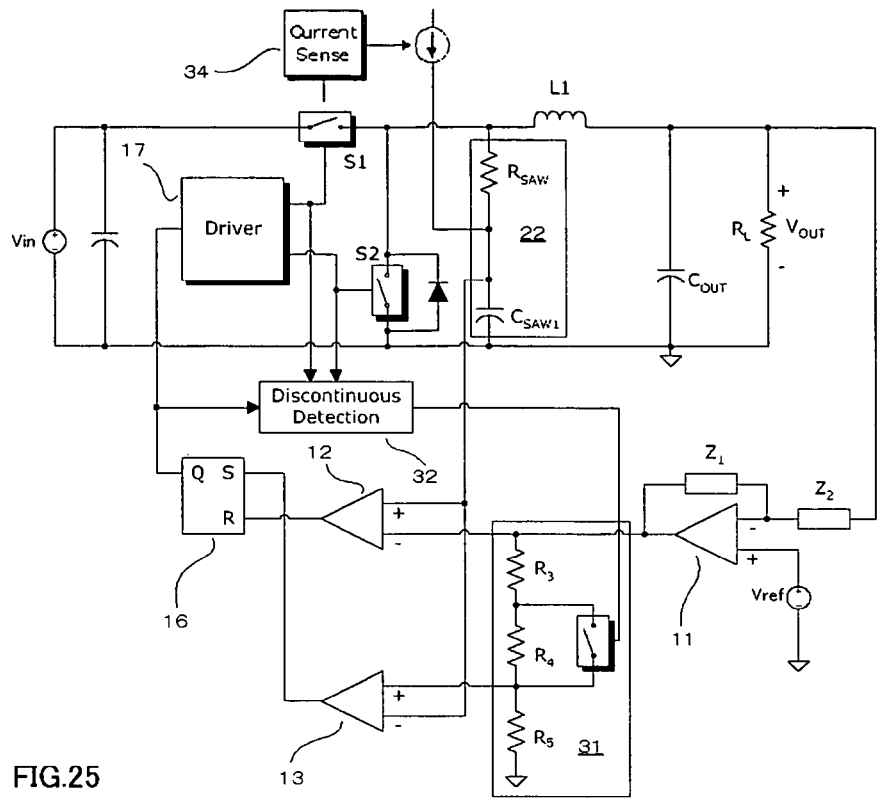
FIG. 25 shows a similar circuit diagram as the one of the eighth transformation of the second embodiment.
Figure 26:
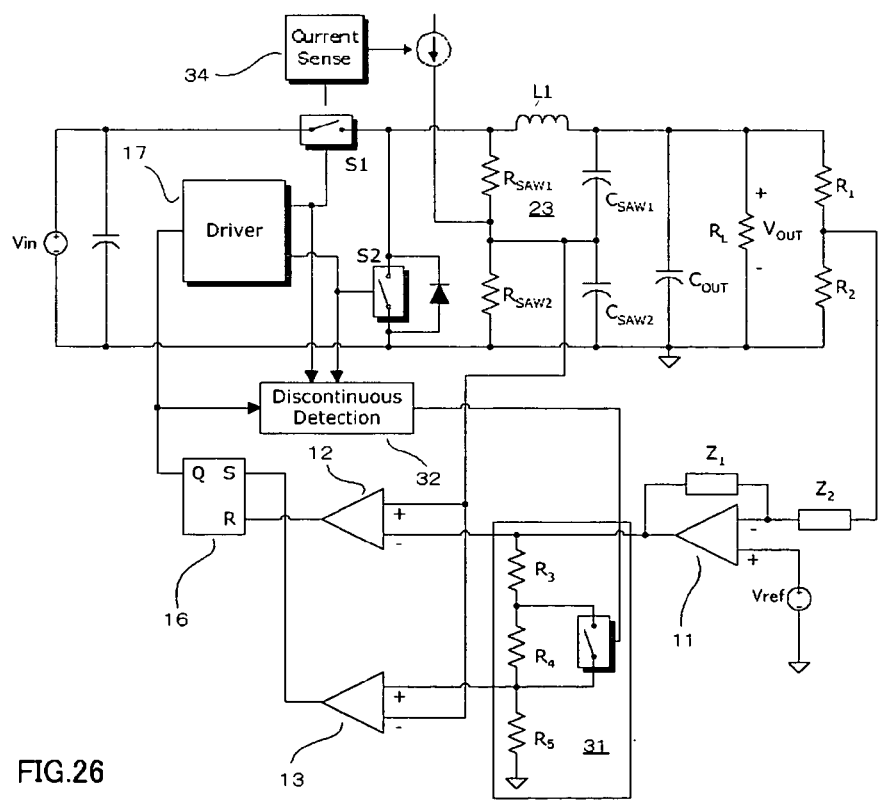
FIG. 26 shows a similar circuit diagram as the one of the eighth transformation of the second embodiment.
Figure 27:
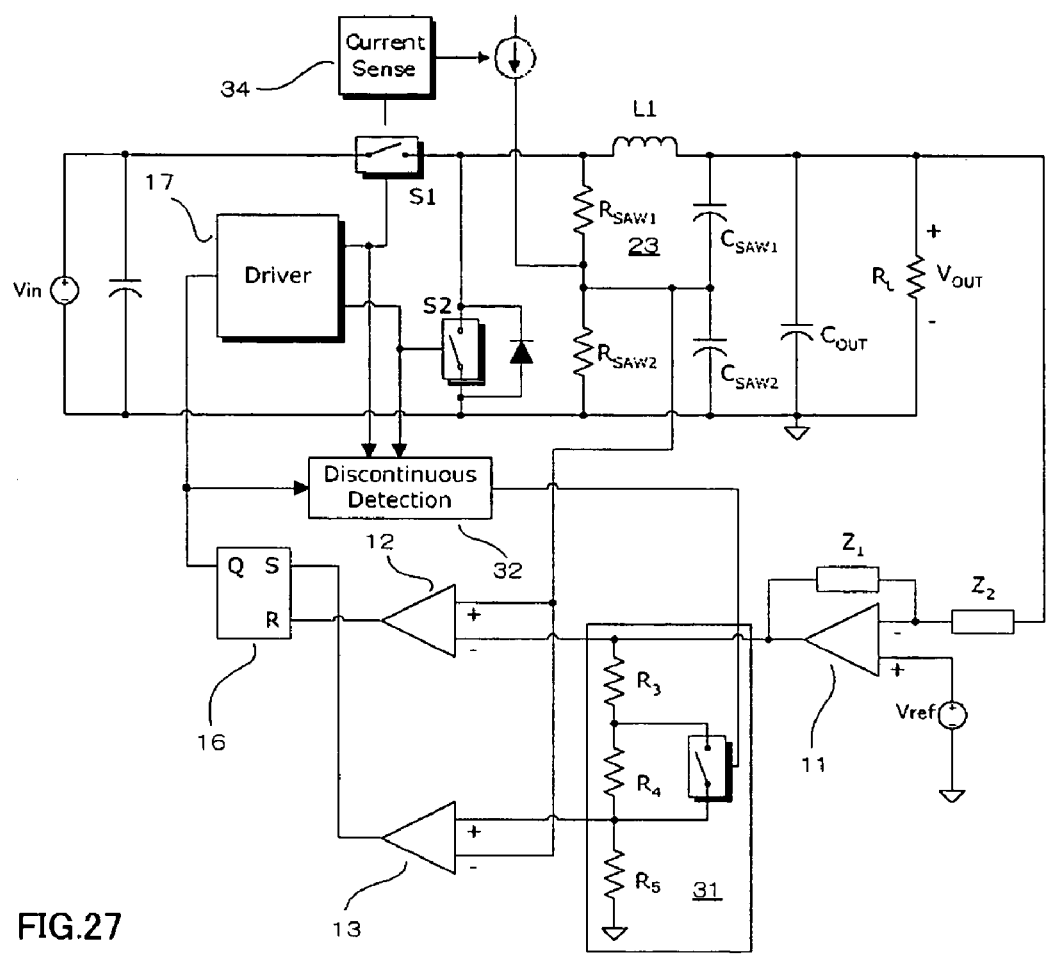
FIG. 27 shows a similar circuit diagram as the one of the eighth transformation of the second embodiment.

A transformation shown in FIG. 24 corresponds to an embodiment shown in FIG. 15. A transformation shown in FIG. 25 corresponds to a transformation shown in FIG. 17. A transformation shown in FIG. 26 corresponds to a transformation shown in FIG. 18. A transformation shown in FIG. 27 corresponds to a transformation shown in FIG. 19. In the said transformations, current detection circuit 34 is connected to control switch S1, the output of which is connected to another terminal of resistor $R_{saw1}$ connected to the output terminal of output inductor L1.

Respective switching power supplies of said configuration shown in FIG. 24 to FIG. 27 operate almost similarly with corresponding switching power supplies shown in in FIG. 15, FIG. 17, FIG. 18 and FIG. 19, but also adjust output impedance as current from current detection circuit 34 is applied through filter circuits 21, 22, 23 and 24.

Next, a switching power supply relating to the third embodiment of the invention is descirbeed.

Figure 28:
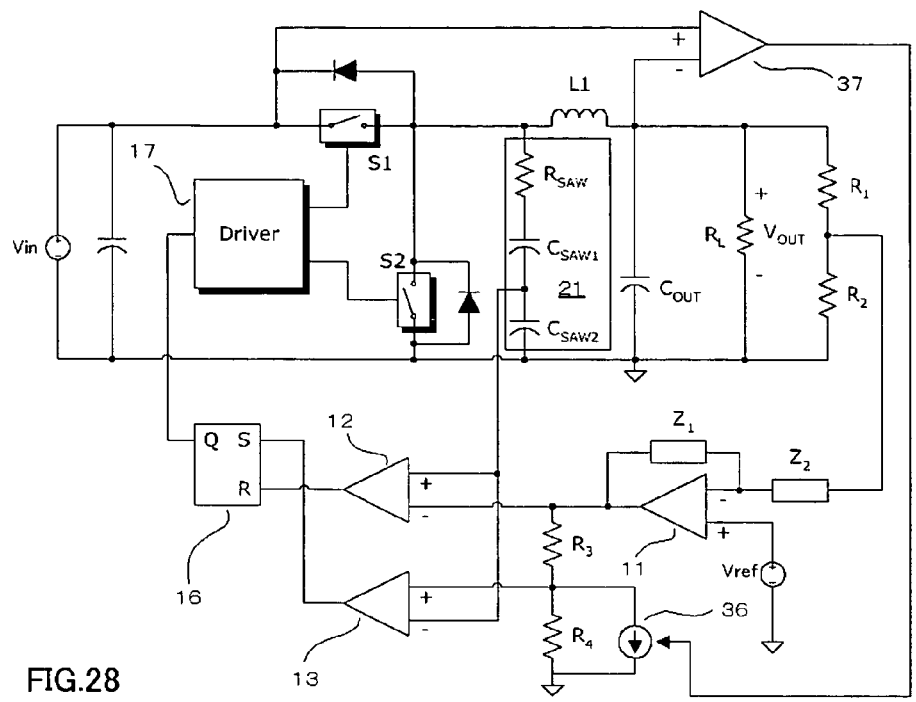
FIG. 28 shows a circuit diagram of the switching power supply relating to the third embodiment of the invention.

FIG. 28 shows a switching power supply relating to the said embodiment. C represents the capacitor, S the switching means, R the resistor, Z the impedance, 11 the error amplifier, 12 and 13 the comparators, 36 the current source, 16 the flip flop circuit, 37 the amplifier, 17 the driver, and 21 the filter circuit.

The switching power supply relating to said embodiment is provided with control switch S1, synchronous switch S2, output inductor L1, smoothing capacitor $C_{out}$, and a power supply circuit connected in series to output inductor L1 and smoothing capacitor $C_{out1}$. The output of said power supply circuit is connected to a control circuit, the output of which is connected to control switch S1 and synchronous switch S2.

The switching power supply is provided with resistors for voltage detection $R_1$ and $R_2$ at the output of the power supply circuit, and a connection between said resitors is connected to the negative input of error amplifier 11 which amplifies the error between detected voltage and reference voltage. The output of error amplifier 11 is connected to the negative input of first comparator 12 and to the positive input of second comparator 13 through split resistors $R_3$ and $R_4$.

Current source 36 is connected between a middle point of split resistors $R_3$ and $R_4$ and ground potential to receive the output signal of amplifier 37. The positive input of amplifier 37 is connected through the input of control switch S1, and the negative input of amplifier 37 is connected through the output of output inductor L1 to detect I/O potential difference.

Filter circuit 21 comprising a series connection of resistor $R_{saw1}$ and capacitors $C_{saw1}$ and $C_{saw2}$ is connected in parallel to a series circuit comprising output inductor L1 and smoothing capacitor $C_{out}$. The output of filter circuit 21 is connected to the positive input of first comparator 12 and to the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 21 is controlled to be between an input level of first comparator 12 and an input level of second comparator 13.

Figure 29:
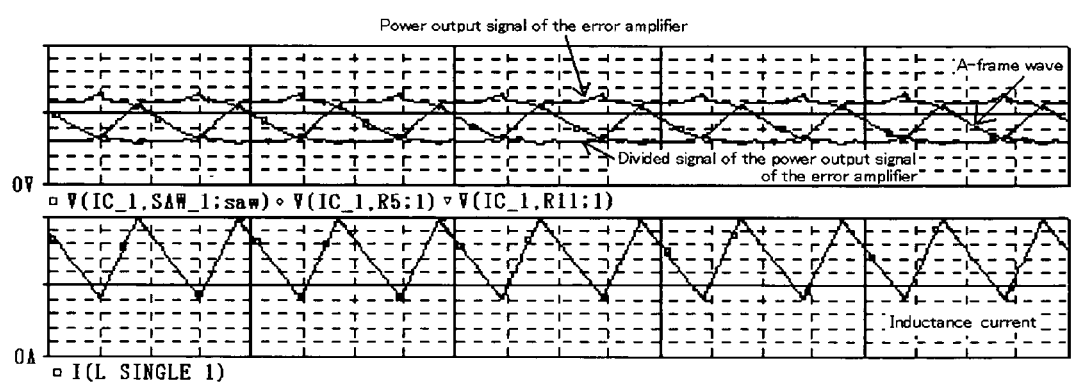
FIG. 29 shows an operational waveform diagram of the embodiment shown in FIG. 28 with high I/O potential difference.
Figure 30:
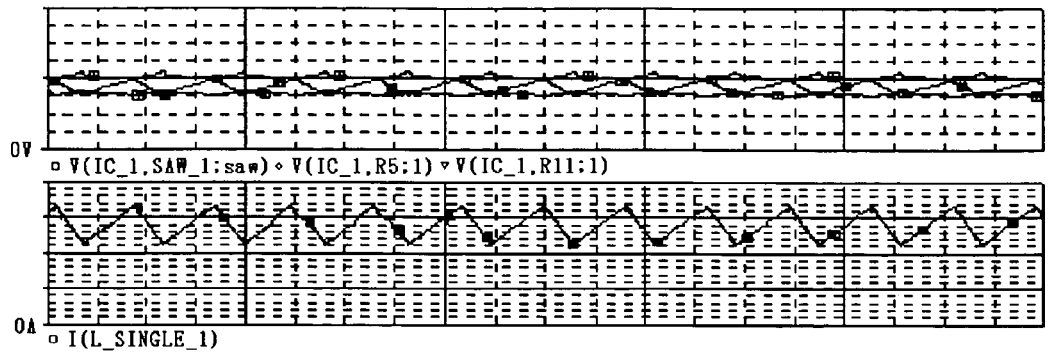
FIG. 30 shows an operational waveform diagram of the embodiment shown in FIG. 28 with low I/O potential difference.

The switching power supply of said configuration operates as follows. FIG. 29 shows an operational waveform diagram with high I/O potential, and FIG. 30 shows an operational waveform diagram with low I/O potential.

In this embodiment, the input of amplifier 37 is connected to the input of control switch S1 and the output of output inductor L1 to detect I/O potential difference. The output signal of amplifier 37 is sent to current source 36 connected between the middle point of split resistors $R_3$ and $R_4$ and ground potential. That is, current flows through current source 36 in proportion to I/O potential difference, reducing the resistance of split resistor $R_3$. As the resistance of split resistor $R_3$ is fixed, when I/O potential difference becomes high, the voltage division ratio between split resistors $R_3$ and $R_4$ increases and the amplitude of the triangular waveform also increases as shown in FIG. 29. As a result, the oscillation frequency decreases.

On the contrary, when I/O potential difference becomes lower, the output signal of amplifier 37 becomes lower and current flowing through the current source decreases and, in turn, the resistance of split resistor $R_4$ increases. Since the resistance of split resistor $R_3$ is fixed, when I/O potential difference becomes lower, the voltage division ratio between split resistors $R_3$ and $R_4$ decreases and the amplitude of the triangular waveform also decreases. As a result, the oscillation frequency increases. As the said operation controls a change of the oscillation frequency against the fluctuation of I/O voltage, the switching power supply materializes stable oscillation frequency and output ripple characteristics.

Figure 31:
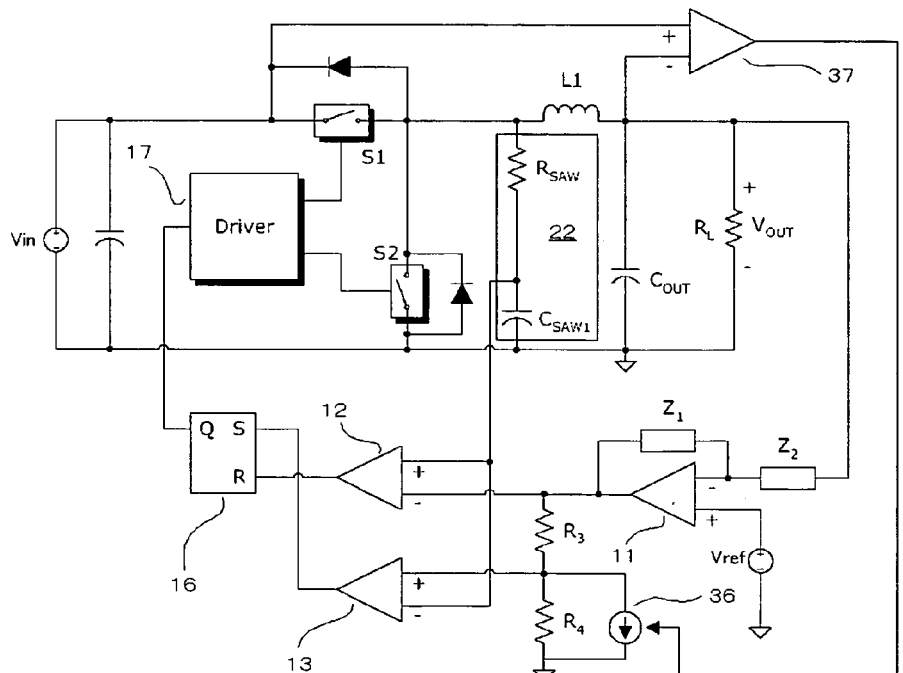
FIG. 31 shows a circuit diagram of the first transformation of the third embodiment.

FIG. 31 shows a switching power supply relating to the first transformation of this embodiment. The switching power supply is configured with the output of a power supply circuit connected to the negative input of error amplifier 11 which amplifies the error between detected voltage and reference voltage. The output of amplifier 11 is connected to the negative input of first comparator 12 and to the positive input of second comparator 13 through split resistors $R_3$ and $R_4$.

Current source 36 is connected at the middle point between split resistors $R_3$ and $R_4$ and the ground potential. Current source 36 is configured to receive the output signal of amplifier 37. The positive input of amplifier 37 is connected through the input of control switch S1, and the negative input of amplifier 37 is connected through the output of output inductor L1 to detect I/O potential difference.

Filter circuit 22 comprising a series connection of the resistor $R_{saw1}$ and capacitor $C_{saw1}$ is connected in parallel with output inductor L1 and smoothing capacitor $C_{out}$. The output of filter circuit 22 is connected to the positive input of first comparator 12 and to the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 22 is controlled to be between an input level of first comparator 12 and an input level of second comparator 13.

The switching power supply of said configuration operates almost similarly with an embodiment shown in FIG. 28, materializing stable ripple characteristics through an integrated circuit, which automatically changes the amplitude of the triangular waveform in proportion to I/O potential difference. However, the switching power supply of this embodiment is not provided with a resistor for voltage detection on the output side of the power supply circuit, and the configuration of filter circuit 22 is different from filter circuit 21 of an embodiment shown in FIG. 1.

Figure 32:
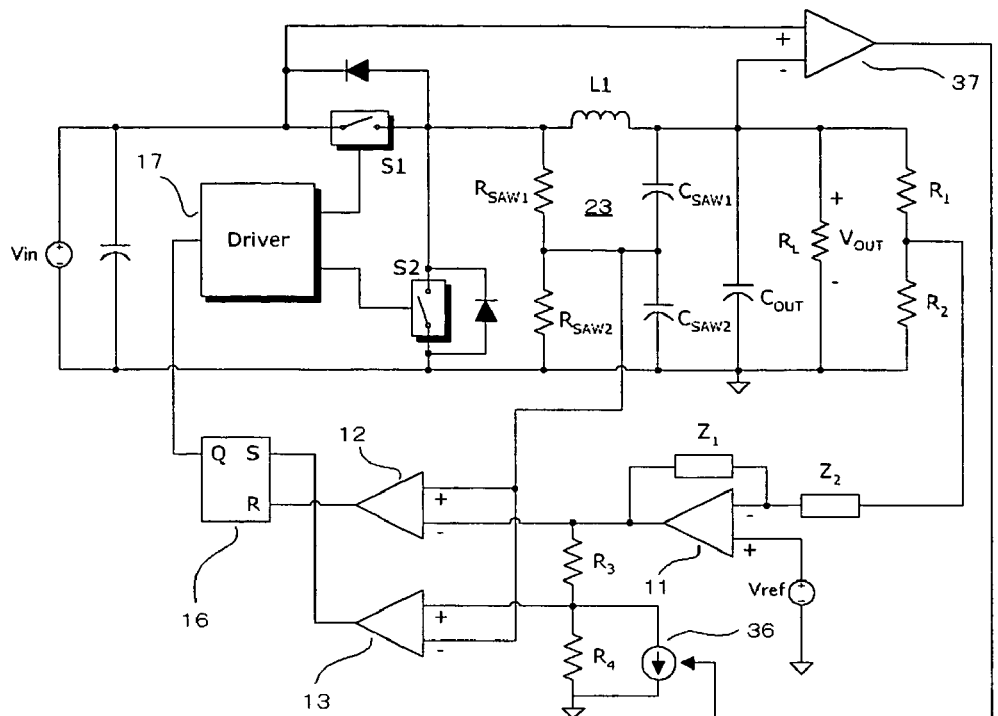
FIG. 32 shows a circuit diagram of the second transformation of the third embodiment.

FIG. 32 shows a switching power supply relating to the second transformation of this embodiment. The switching power supply is provided with resistors $R_1$ and $R_2$ for voltage detection at the output of the power supply circuit, and a connection between the said resistors is connected to the negative input of error amplifier 11 which amplifies the error between detected voltage and reference voltage. The output of amplifier 11 is connected to the negative input of first comparator 12 and to the positive input of second comparator 13 through split resistors $R_3$ and $R_4$.

In the said transformation, filter circuit 23 is provided between the input and output of output inductor L1, with the following configuration. Resistors $R_{saw1}$ and $R_{saw2}$ are connected in parallel to synchronous switch S2 and to the input of output inductor L1, and capacitors $C_{saw1}$ and $C_{saw2}$ are connected in series in parallel to synchronous switch S2 and to the output of output inductor L1. A connection is provided each between a series connection of resistors $R_{saw1}$ and $R_{saw2}$ and between a series connection of capacitors $C_{saw1}$ and $C_{saw2}$. Filter circuit 23 is formed by coupling the two connections which represent output of filter circuit 23. The output of filter circuit 23 is connected to the positive input of first comparator 12 and to the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, the amplitude of the triangular waveform obtained through filter circuit 23 is controlled to be between an input level of first comparator 12 and an input level of second comparator 13.

The switching power supply of said configuration operates almost similarly with an embodiment shown in FIG. 28, materializing stable ripple characteristics through an integrated circuit which automatically changes the amplitude of the triangular waveform in proportion to the I/O potential difference.

Figure 33:
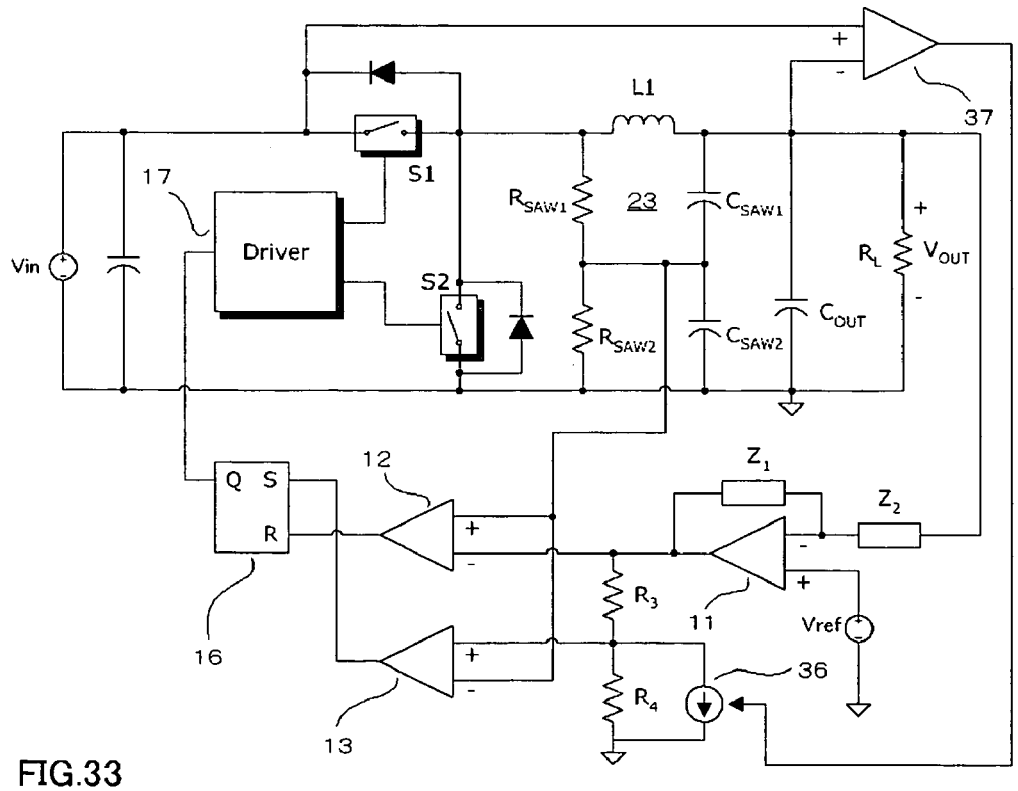
FIG. 33 shows a circuit diagram of the third transformation of the third embodiment.

FIG. 33 shows a switching power supply of the third transformation of this embodiment, which operates almost similarly with an transformation shown in FIG. 32. This switching power supply is configured with the output of the power supply circuit connected to the negative input of error amplifier 11 which amplifies the error between detected voltage and reference voltage. This switching power supply operates almost similarly with a transformation shown in FIG. 32, materializing stable ripple characteristics through an integrated circuit which automatically changes the amplitude of the triangular waveform in proportion to I/O potential difference.

Figure 34:
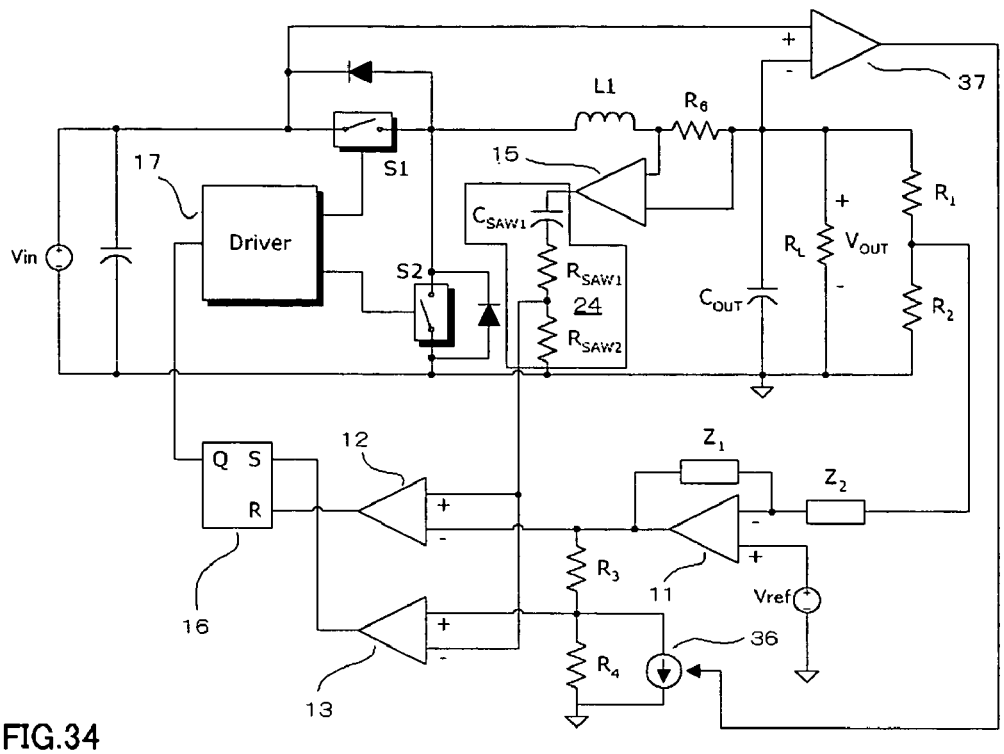
FIG. 34 shows a circuit diagram of the fourth transformation of the third embodiment.

FIG. 34 shows a switching power supply relating to the fourth transformation of this embodiment. The switching power supply is provided with resistors $R_1$ and $R_2$ for voltage detection at the output of the power supply circuit, and a connection between resistors $R_1$ and $R_2$ is connected to the negative input of error amplifier 11 which amplifies the error between detected voltage and reference voltage. The output of error amplifier 11 is connected to the negative input of first comparator 12 and to the positive input of second comparator 13 through split resistors $R_3$ and $R_4$.

In this transformation, resistor $R_6$ for current detection is connected between output inductor L1 and smoothing capacitor $C_{out}$, with its input connected to the positive input of buffer amplifier 15 and its output connected to the negative input of buffer amplifier 15. Filter circuit 24 comprising a series connection of capacitor $C_{saw1}$ and resistors $R_{saw1}$ and $R_{saw2}$ is connected to the output of buffer amplifier 15. The output of filter circuit 24 is connected to the positive input of first comparator 12 and to the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and synchronous switch S2. In this configuration, amplitude of the triangular waveform obtained through filter circuit 24 is controlled to be between an input level of first comparator 12 and an input level of second comparator 13.

The switching power supply of said configuration operates almost similarly with an embodiment of the invention shown in FIG. 28, materializing stable ripple characteristics through an integrated circuit which automatically changes the amplitude of the triangular waveform in proportion to I/O potential difference. In addition to this, as having resistors $R_1$ and $R_2$ for voltage detection and filter circuit 24 comprising a series connection of capacitor $C_{saw1}$ and resistors $R_{saw1}$ and $R_{saw2}$, the switching power supply of the said transformation can pick up high-frequency components only.

Figure 35:
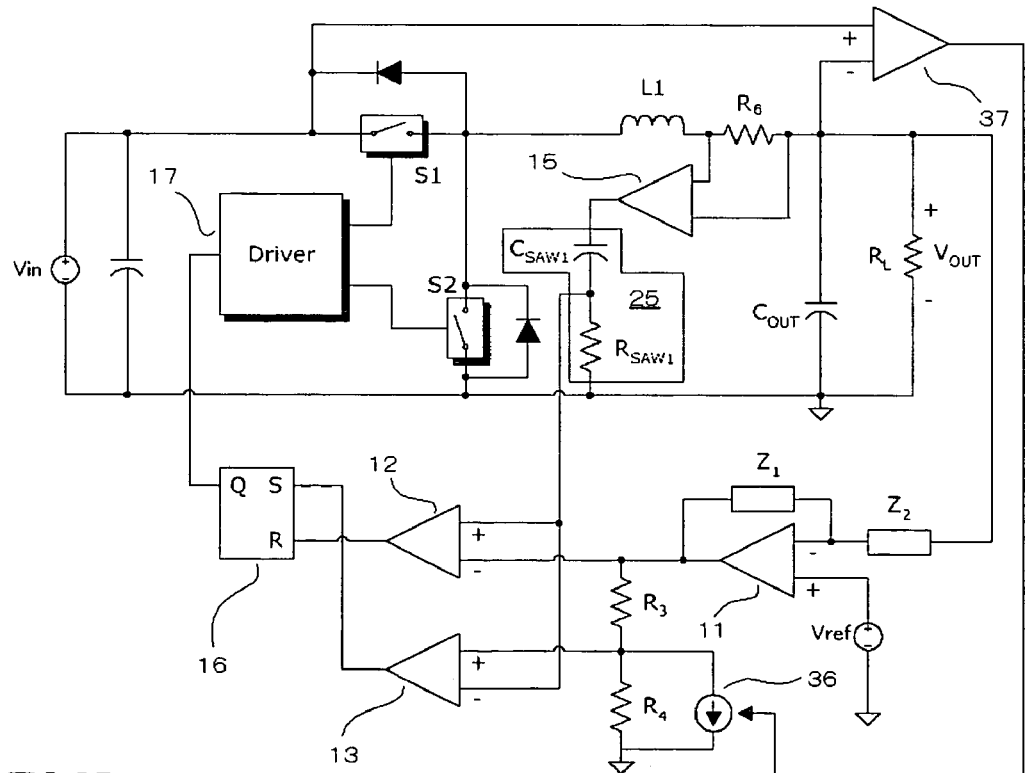
FIG. 35 shows a circuit diagram of the fifth transformation of the third embodiment.

FIG. 35 shows a switching power supply relating to the fifth transformation of this embodiment. Said switching power supply is configured with output of the power supply circuit connected to the negative input of error amplifier 11 which amplifies the error between detected voltage and reference voltage. The output of error amplifier 11 is connected to the negative input of first comparator 12 and to the positive input of second comparator 13 through split resistors $R_3$ and $R_4$.

In this transformation, resistor $R_6$ for current detection is connected between output inductor L1 and smoothing capacitor $C_{out}$, with its input connected to the positive input of buffer amplifier 15 and its output to the negative input of buffer amplifier 15. The output of buffer amplifier 15 is connected to filter circuit 25 comprising a series connection of capacitor $C_{saw1}$ and resistor $R_{saw1}$. The output of filter circuit 25 is connected to the positive input of first comparator 12 and to the negative input of second comparator 13.

The output of first comparator 12 is connected to the input on the reset side of flip flop circuit 16, and the output of second comparator 13 is connected to the input on the set side of flip flop circuit 16. The output of flip flop circuit 16 is connected to the input of driver 17, the output of which is connected to control switch S1 and to synchronous switch S2. In this configuration, the amplitude of the triangular waveform obtained through filter circuit 25 is controlled to be between an input level of first comparator 12 and an input level of second comparator 13.

The switching power supply of said configuration operates similarly with an embodiment shown in FIG. 31, materializing stable ripple characteristics through an integrated circuit which automatically changes the amplitude of the triangular waveform in proportion to I/O potential difference.

Figure 36:
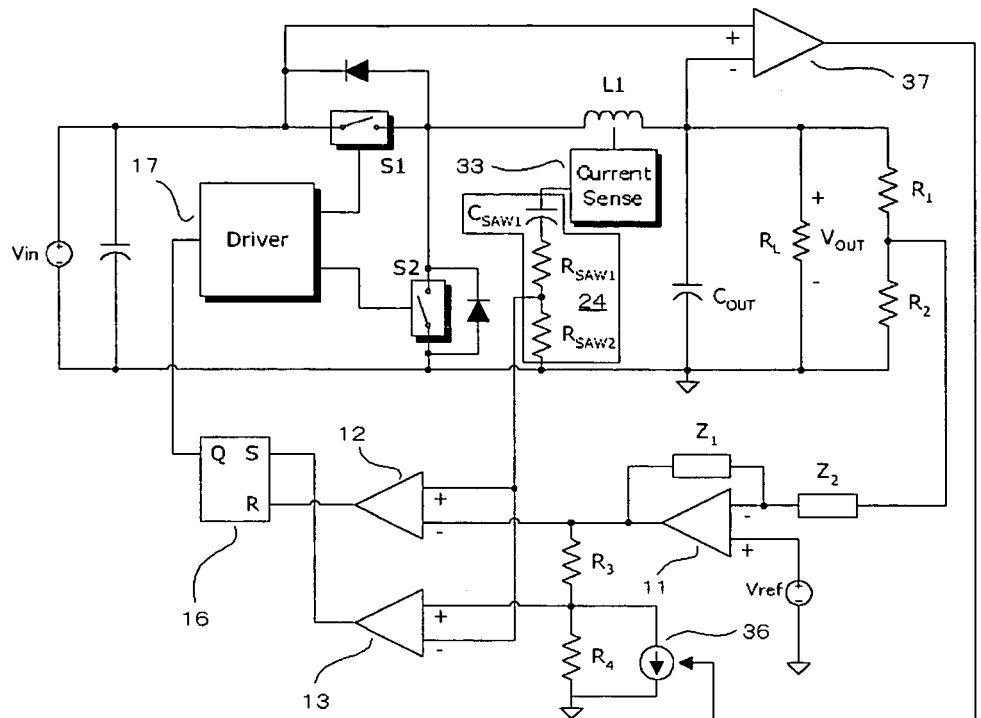
FIG. 36 shows a circuit diagram of the sixth transformation of the third embodiment.

The sixth transformation of this invention shown in FIG. 36 is provided with current detection circuit 33 connected to output inductor L1 and filter circuit 24 comprising capacitor $C_{saw1}$ connected in series to resistors $R_{saw1}$ and $R_{saw2}$. Other configuration is almost same as the seventh transformation shown in FIG. 34. The switching power supply of said configuration shown in FIG. 36 operates almost similarly with a switching power supply shown in FIG. 34.

Figure 37:
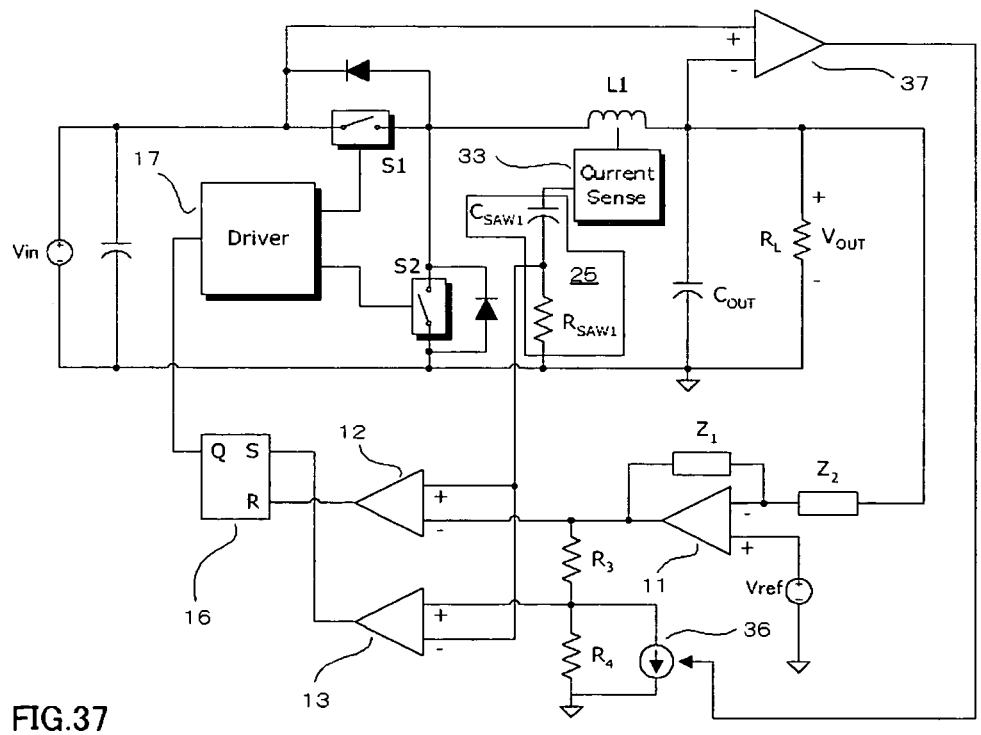
FIG. 37 shows a circuit diagram of the seventh transformation of the third embodiment.

A swithcing power supply of the seventh transformation shown in FIG. 37 is provided with output inductor L1 connected to filter detection circuit 33, the output of which is connected to filter circuit 25 comprising capacitor $C_{saw1}$ connected in series to resistor $R_{saw1}$. Other configuration is almost same as a transformation shown in FIG. 35. The switching power supply 7 of said configuration shown in FIG. 37 operates almost similarly with a switching power supply shown in FIG. 35.

Figure 38:
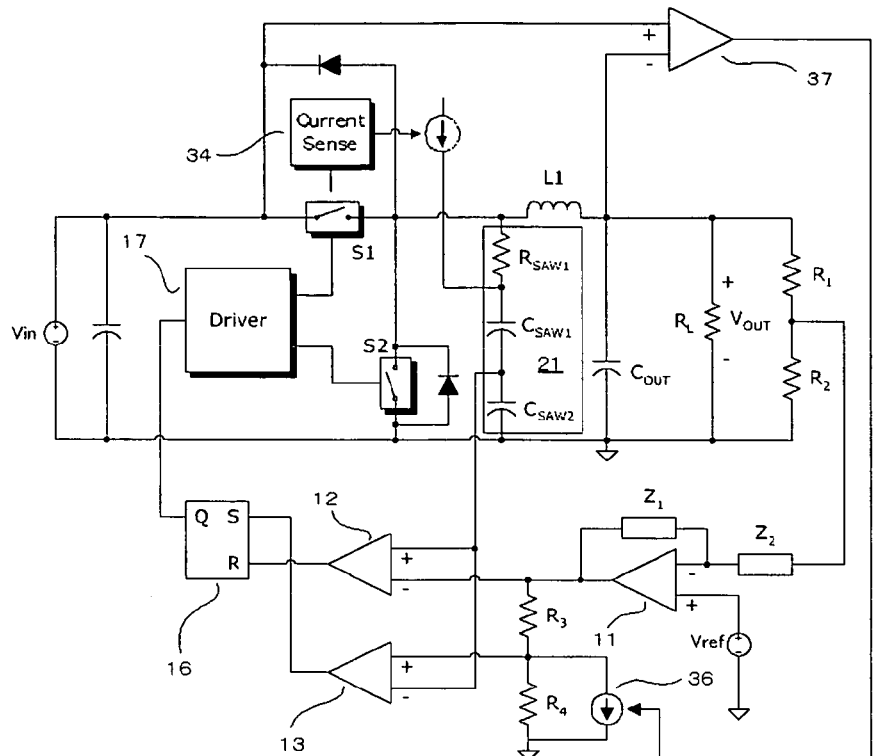
FIG. 38 shows a circuit diagram of the eighth transformation of the third embodiment.
Figure 39:
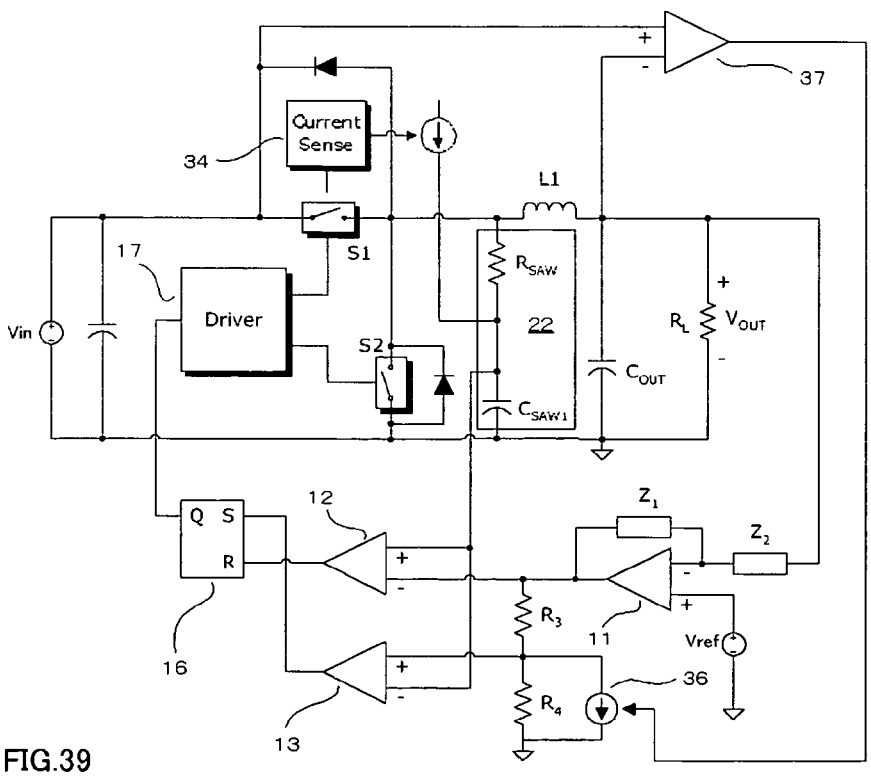
FIG. 39 shows a similar circuit diagram as the one of the eighth transformation of the third embodiment.
Figure 40:
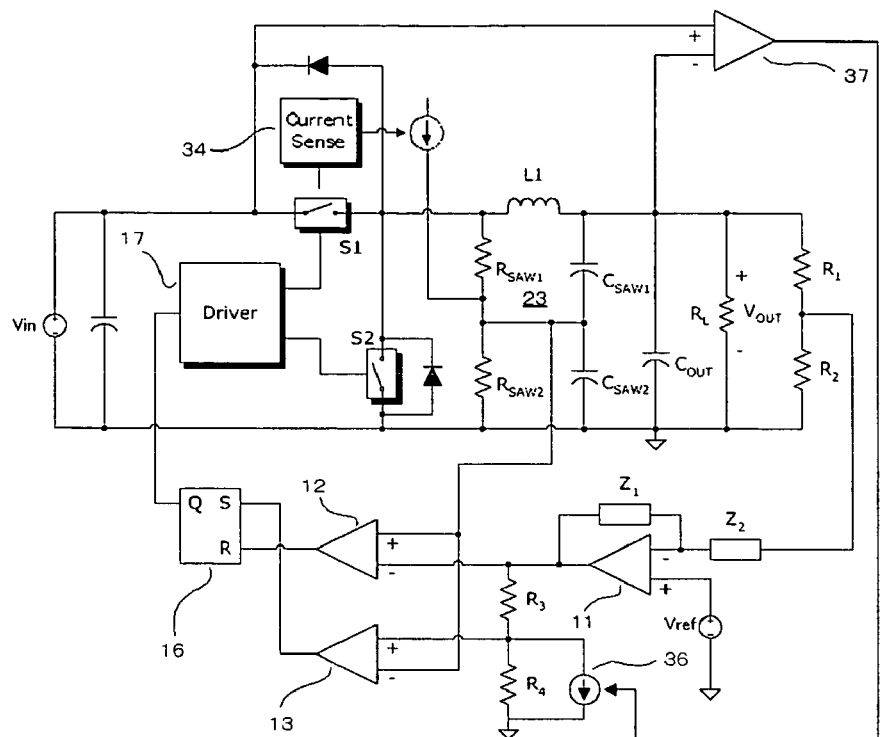
FIG. 40 shows a similar circuit diagram as the one of the eighth transformation of the third embodiment.
Figure 41:
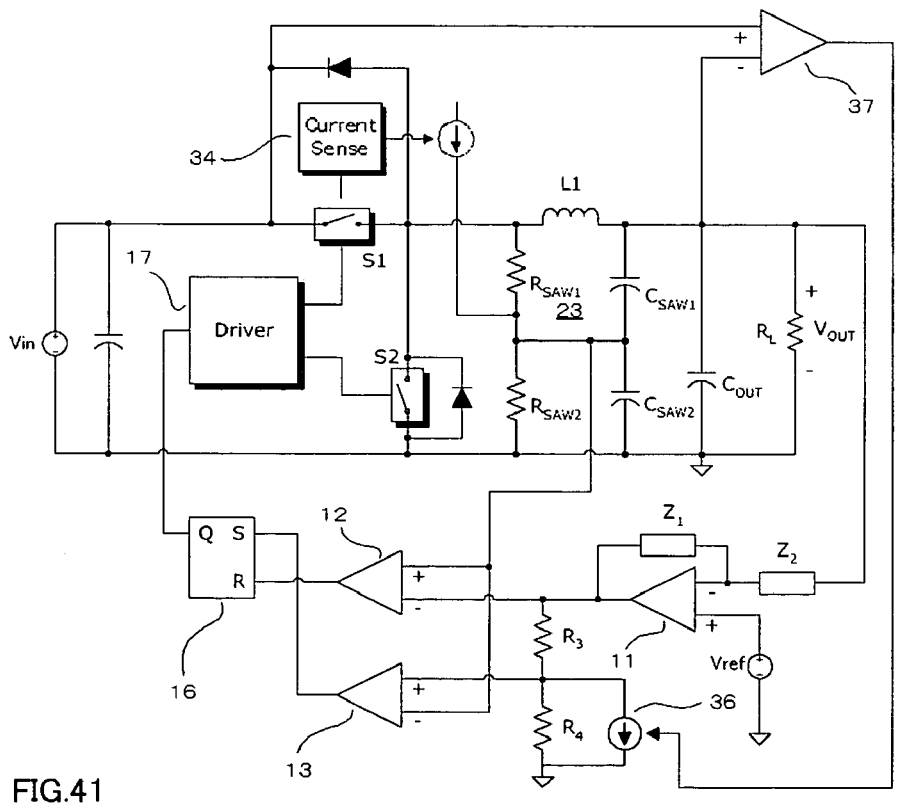
FIG. 41 shows a similar circuit diagram as the one of the eighth transformation of the third embodiment.

A transformation shown in FIG. 38 corresponds to an embodiment shown in FIG. 28. A transformation shown in FIG. 39 corresponds to a transformation shown in FIG. 31. A transformation shown in FIG. 40 corresponds to a transformation shown in FIG. 32. A transformation shown in FIG. 41 corresponds to a transformation shown in FIG. 33. In the switching power supplies of said transformations, control switch S1 is connected to current detection circuit 34, the output of which is connected to another terminal of resistor $R_{saw1}$ connected to the output of output inductor L1.

The switching power supplies of said configuration shown in FIG. 38 to FIG. 41 operates almost similarly with the switching power supplies shown in FIG. 28, FIG. 31, FIG. 32 and FIG. 33, but also adjust output impedance with current from current detection circuit 34 applied through filter circuits 21, 22 and 23.

Figure 42:
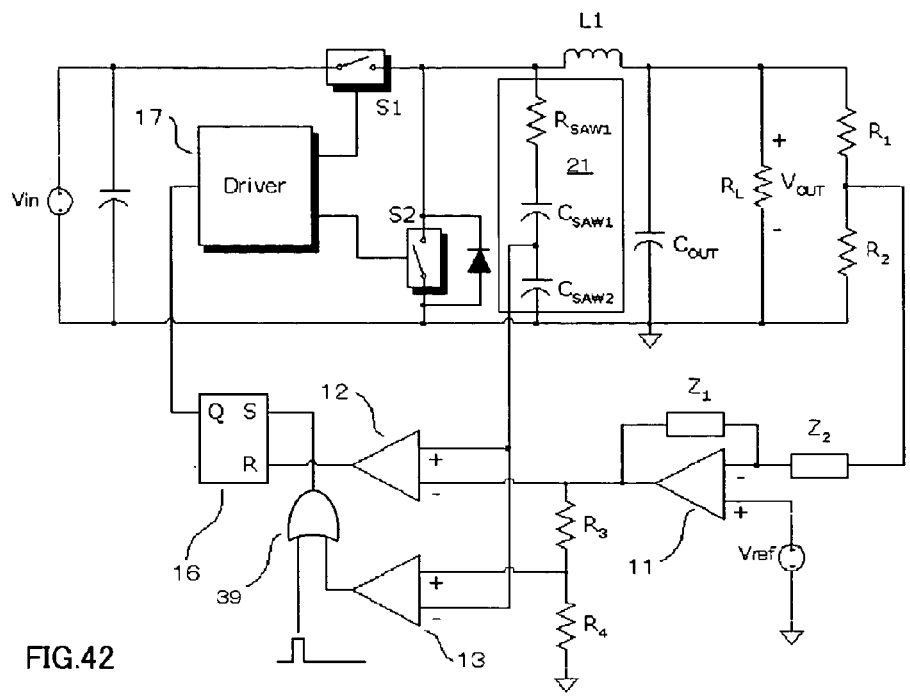
FIG. 42 shows a circuit diagram of the switching power supply relating to the fourth embodiment of the invention.

Next, a switching power supply relating to the fourth embodiment of the invention is described. FIG. 42 shows a switching power supply relating to said embodiment. C represents capacitor, S the switching device, R the resistor, Z the impedance, 11 the error amplifier, 12 and 13 the comparators, 39 the OR circuit, 16 the flip flop circuit, 17 the driver, and 21 the filter circuit.

The switching power supply relating to this embodiment is provided with control switch S1, synchronous switch S2, output inductor L1, capacitor $C_{out}$, and a power supply circuit in which output inductor L1 and smoothing capacitor $C_{out}$ are connected in series. The output of—said power supply circuit is connected to a control circuit, the output of which is connected to control switch S1 and synchronous switch S2.

Resistors $R_1$ and $R_2$ for voltage detection are provided at the output of the the power supply circuit, and a connection between said resistors is connected to the negative input of error amplifier 11 which amplifies the error between detected voltage and reference voltage and sends the amplified error signal. The output of error amplifier 11 is connected to the negative input of first comparator 12 and to the positive input of second comparator 13 through split resistors $R_3$ and $R_4$ to generate the divided signal.

Filter circuit 21 comprising a series connection of and resistor $R_{saw1}$ and capacitors $C_{saw1}$ and $C_{saw2}$ is connected in parallel with output inductor L1. The output of filter circuit 21 is connected to the positive input of first comparator 12 and to the negative input of second comparator 13.

The output of first comparator 12 is connected to the input on the reset side of flip flop circuit 16 to generate a first comparison signal. The output of second comparator 13 is connected to an input of OR circuit 39 so to generate a second comparison signal. The clock signal is sent to another input of OR circuit 39, the output of which is connected to the set side of flip flop circuit 16 to generate the clock signal in the steady state and said second comparison signal when there is a sharp change of the load. The output of flip flop circuit 16 is connected to the input of driver 17, output of which is connected to control switch S1 and to synchronous switch S2. In this configuration, the amplitude of the triangular waveform obtained through filter circuit 21 is controlled to be between said amplified error signal and said divided signal when there is a sharp change of the load, to have said clock signal the timing of control switch S1 to ON.

The switching power supply of said configuration operates as follows. In the steady state, said clock signal is sent to the set side of flip flop circuit 16 through OR circuit 39 to turn control switch S1 on and synchronous switch S2 off. With control switch S1 turned on, output voltage is generated and error amplifier 11 connected to the output side of flip flop circuit 16 generates the amplified error signal. The amplified error signal is compared with the triangular waveform generated through filter circuit 21 connected in parallel to synchronous switch S2, and when becoming bigger than the amplified error signal, the triangular waveform is sent to the reset side of flip flop circuit 16 to turn control switch S1 off and synchronous switch on. Said switching power supply operates by repeating said operations.

Next, operation of the switching power supply with a sharp decrease of the load is described. When there is a sharp current decrease, the output voltage leaps instantaneously, while the choke current decreases sharply. At this time, the triangular waveform obtained through filter circuit 21 connected in parallel to a series circuit comprising output inductor L1 and smoothing capacitor $C_{out}$ and a signal generated by amplifying the error between output voltage and reference voltage through error amplifier 11 are used to send said first comparison signal obtained through first comparator 12 to the reset side of flip flop circuit 16. At the same time, the triangular waveform obtained through filter circuit 21 connected in parallel to a series circuit comprising capacitor $C_{out}$ and output inductor L1 provided in the power supply circuit and a signal generated by resistance division through split resistors $R_3$ and $R_4$ of a signal generated by amplifying the error between output voltage and reference voltage through error amplifier 11 are used to send said second comparison signal obtained through second comparator 13 to the set side of flip flop circuit 16 in order to control the amplitude of the triangular waveform to be between said two signal levels.

As the amplitude of the triangular waveform is controlled to be between said two signal levels, the down slope of the triangular waveform represents a period when the choke current decreases, while its up slope represents a period when current flowing through output inductor L1 increases. In this method, when the amplified error signal varies, frequency and duty ratio of the triangular waveform also change according to the extent of its transformation. By controlling the triangular waveform to be between said two levels, the phase difference between waveforms of the amplied error signal and triangular waveform is fixed at maximum 90 degrees. As the triangular waveform is generated by on/off operation of control switch S1 connected short of a series circuit comprising output inductor L1 and smoothing capacitor $C_{out}$, the phase difference between the operational state of control switch S1 and the amplified error signal is also fixed. This enables to secure the stability without reducing the frequency band of amplified error signal, signficantly improving the response rate of the switching power supply.

According to the output signal of error amplifier 11, frequency and phase of the triangular waveform change instantaneously (driving status of the two switches in the power supply is shown), and, in turn, the inductor current also changes, materializing high speed response while maximizing the leap of the output voltage.

Figure 43:
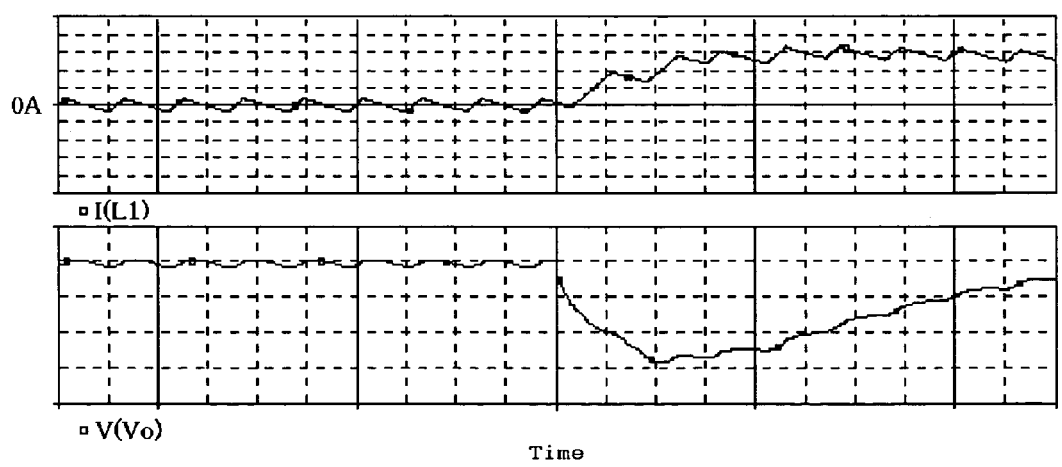
FIG. 43 shows an operational waveform diagram of the embodiment shown in FIG. 42.

Next, operation of the switching power supply with sharp increase of the load current is described. This operational waveform diagram is shown in FIG. 43. In FIG. 43, the upper part indicates the inductor current waveform, and the lower part indicates the output voltage waveform. When there is a shap increase of load current, the output voltage drop instantaneously and the inductor current increases sharply as shown in FIG. 43.

At this time, the triangular waveform obtained through filter circuit 21 connected in parallel to a series circuit comprising output inductor L1 and smoothing capacitor $C_{out}$ and a signal generated by amplifying the error between output voltage and reference voltage through error amplifier 11 are used to send said first comparison signal obtained through first comparator 12 to the reset side of flip flop circuit 16. At the same time, the triangular waveform obtained through filter circuit 21 connected in parallel to a series circuit comprising capacitor $C_{out}$ and output inductor L1 provided in the power supply circuit and a signal generated by resisitance division through split resistors $R_3$ and $R_4$ of the amplified errora signal generated by amplifying the error between output voltage and reference voltage through error amplifier 11 are used to send said second comparison signal obtained through second comparator 13 to an input of OR circuit 39 and the clock signal to another input of OR circuit 39. In the steady state, the clock signal is sent from OR circuit 39. When there is a sharp change of the load, OR circuit 39 sends said second comparison signal to the set side of flip flop circuit 16, and, in stead of the clock signal, flip flop circuit 16 sends said second comparison signal to control switch S1, whereby the amplitude of the triangular waveform obtained through filter circuit 21 is controlled to be between the amplified error signal and the division signal.

As the amplitude of the triangular waveform is controlled to be between said two signals in this method, when the amplified error signal varies, frequency and duty ratio of the triangular waveform also change according to the extent of its transformation. By controlling the triangular waveform to be between said two signal levels, the phase difference between waveforms of the amplied error signal and the triangular waveform is fixed at maximum 90 degrees. As the triangular waveform is generated by on/off operation of control switch S1 connected short of a series circuit comprising output inductor L1 and smoothing capacitor $C_{out}$, the phase difference between the operational state of control switch S1 and the amplified error signal is also fixed. This enables to secure the stability without reducing the frequency band of amplified error signal, signficantly improving the response rate of the switching power supply.

Figure 44:
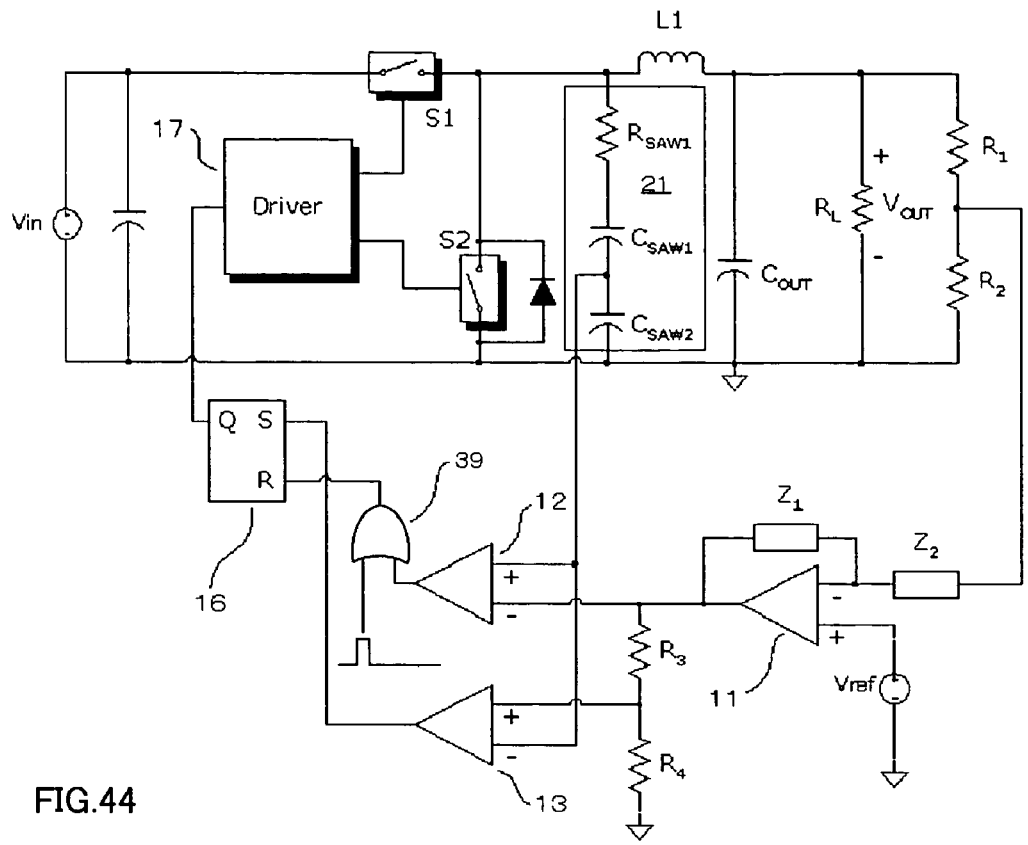
FIG. 44 shows a circuit diagram of the first transformation of the second embodiment.

According to the output signal of error amplifier 11, frequency and phase of the triangular waveform change instantaneously (driving status of the two switches in the power supply is shown), and, in turn, the inductor current also changes, materializing high speed response while maximizing the fluctuation of the output voltage FIG. 44 shows a switching power supply relating to the first transformation of said embodiment. The switching power supply relating to said transformation is provided with control switch S1, synchronous switch S2, output inductor L1, smoothing capacitor $C_{out}$, and a power supply circuit in which output inductor L1 and smoothing capacitor $C_{out}$ are connected in series. Output of said power supply circuit is connected to a control circuit, the output of which is connected to control switch S1 and synchronous switch S2.

Resistors $R_1$ and $R_2$ for voltage detection are provided at the output of the the power supply circuit, and a connection between said resistors is connected to the negative input of error amplifier 11 which amplifies the error between detected voltage and reference voltage and sends the amplified error signal. The output of error amplifier 11 is connected to the negative input of first comparator 12 and to the positive input of second comparator 13 through split resistors $R_3$ and $R_4$ to generate the divided signal.

Filter circuit 21 comprising a series connection of and resistor $R_{saw1}$ and capacitors $C_{saw1}$ and $C_{saw2}$ is connected in parallel with output inductor L1. The output of filter circuit 21 is connected to the positive input of first comparator 12 and to the negative input of second comparator 13.

The output of second comparator 13 is connected to the input on the reset side of flip flop circuit 16 to generate a second comparison signal. The output of first comparator 12 is connected to an input of OR circuit 39 to generate a first comparison signal. The clock signal is sent to another input of OR circuit 39, the output of which is connected to the set side of flip flop circuit 16 to generate the clock signal in the steady state and said first comparison signal when there is a sharp change of the load. The output of flip flop circuit 16 is connected to the input of driver 17, output of which is connected to control switch S1 and to synchronous switch S2. In this configuration, the amplitude of the triangular waveform obtained through filter circuit 21 is controlled to be between said amplified error signal and said divided signal when there is a sharp change of the load, to have said clock signal fix the timing of control switch S1 to OFF.

Figure 45:
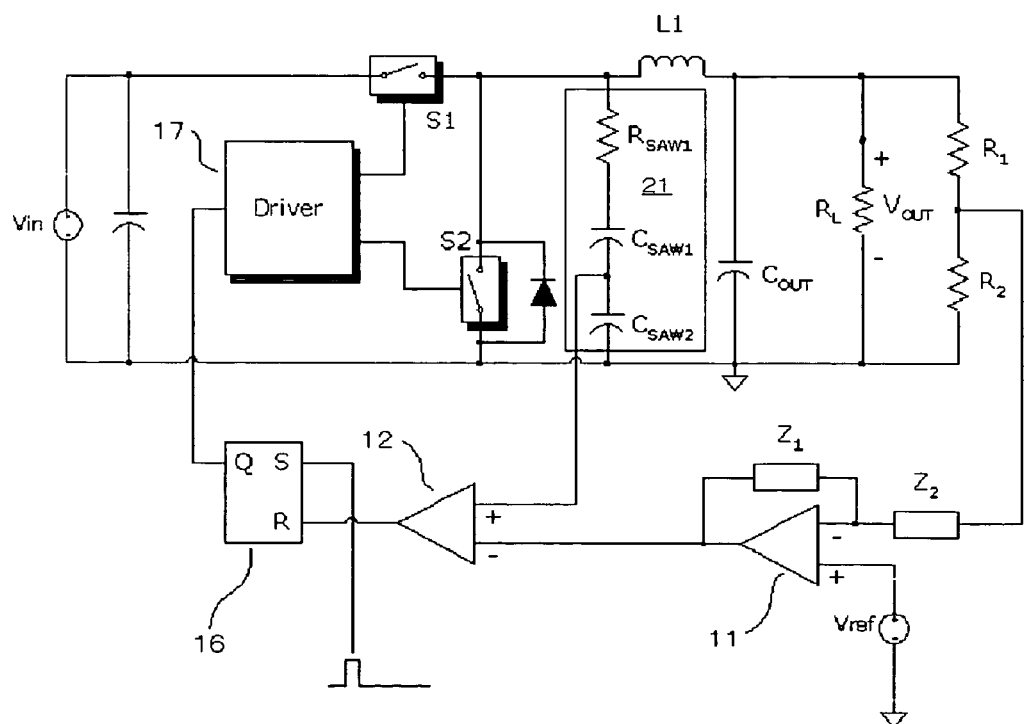
FIG. 45 shows a circuit diagram of the second transformation of the second embodiment.

The switching power supply of said configuration operates almost similarly with an embodiment shown in FIG. 42, except that said first comparison signal obtained through first comparator 12 is compared with the clock signal and then sent to control switch S, and when there is a sharp change of the load, said first comparison signal is sent to control switch S1 instead of the clock signal to control the amplitude of the triangular waveform obtained through filter 21 to be between the amplified error signal and the division signal obtained through split resistors $R_3$ and $R_4$ to have the clock signal fix the timing of control switch S1 to OFF in the steady state. Said configuration of having the clock signal fix the timing of control switch S1 to OFF is also available with switching power supplies relating to other embodiments described below FIG. 45 shows a switching power supply relating to the second transformation of said this embodiment. Similarly with an embodiment shown in FIG. 42, said switching power supply is provided with control switch S1, synchronous switch S2, output inductor L1, capacitor $C_{out}$, and a power supply circuit in which output inductor L1 and smoothing capacitor $C_{out}$ are connected in series. The output of said power supply circuit is connected to a control circuit, the output of which is connected to control switch S1 and synchronous switch S2.

Resistors $R_1$ and $R_2$ for voltage detection are provided at the output of the the power supply circuit, and a connection between said resistors is connected to the negative input of error amplifier 11 which amplifies the error between detected voltage and reference voltage and sends the amplified error signal. The output of error amplifier 11 is connected to the negative input of first comparator 12.

Filter circuit 21 comprising a series connection of and resistor $R_{saw1}$ and capacitors $C_{saw1}$ and $C_{saw2}$ is connected in parallel with output inductor L1 and smoothing capacitor $C_{out}$. The output of filter circuit 21 is connected to the positive input of first comparator 12.

The output of first comparator 12 is connected to the input on the reset side of flip flop circuit 16 to generate a first comparison signal. The clock signal is sent to the set side of flip flop circuit 16. The output of flip flop circuit 16 is connected to the input of driver 17, output of which is connected to each control terminal of control switch S1 and synchronous switch S2. In this configuration, the amplitude of the triangular waveform obtained through filter circuit 21 is compared with the amplified error signal to generate the comparison signal, to have said clock signal fix the timing of control switch S1 to ON.

Figure 46:
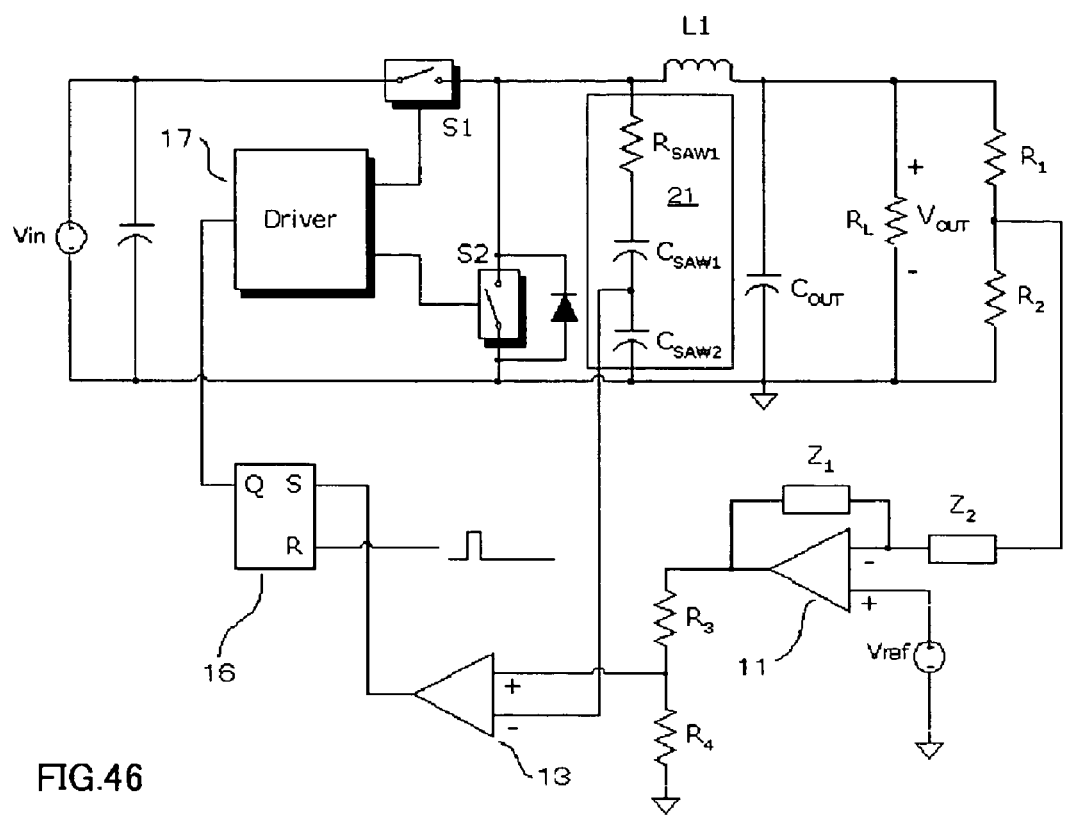
FIG. 46 shows a circuit diagram of the third transformation of the second embodiment.

The switching power supply of said configuration operates almost similarly with an embodiment shown in FIG. 42, as it comprises just essential components of said embodiment. But, unlike the embodiment shown in FIG. 42, the switching power supply of said embodiment is not provided with second comparator 13 of the embodiment shown in FIG. 42, wherefore the clock signal is not compared with said second comparison signal sent from second comparator 13 and the amplified error signal is compared with the triangular waveform obtained through filter circuit 21 and then a comparison signal is sent to control switch S1 to have the clock signal fix the timing of control switch S1 to ON. Said configuration of having the clock signal fix the timing of control switch S1 to ON is also available with switching power supplies relating to other tranformations described below FIG. 46 shows a switching power supply relating to the third transformation of said embodiment. Said switching power supply is an transformation of the first transformation shown in FIG. 44 and, therefore similarly with the first transformation shown in FIG. 44, it is provided with control switch S1, synchronous switch S2, output inductor L1, capacitor $C_{out}$, and a power supply circuit in which output inductor L1 and smoothing capacitor $C_{out}$ are connected in series. The output of said power supply circuit is connected to a control circuit, the output of which is connected to control switch S1 and synchronous switch S2.

Resistors $R_1$ and $R_2$ for voltage detection are provided at the output of the the power supply circuit, and a connection between said resistors is connected to the negative input of error amplifier 11 which amplifies the error between detected voltage and reference voltage and sends the amplified error signal. The output of error amplifier 11 is connected to the positive input of second comparator 13 through split resistors R3 and R4 to generate the divided signal.

Filter circuit 21 comprising a series connection of and resistor $R_{saw1}$ and capacitors $C_{saw1}$ and $C_{saw2}$ is connected in parallel with output inductor L1 and smoothing capacitor $C_{out}$. The output of filter circuit 21 is connected to the negative input of comparator 13.

The output of first comparator 13 is connected to the input on the set side of flip flop circuit 16 to generate a comparison signal. The clock signal is sent to the reset side of flip flop circuit 16. The output of flip flop circuit 16 is connected to the input of driver 17, the output of which is connected to each control terminal of control switch S1 and synchronous switch S2. In this configuration, the triangular waveform obtained through filter circuit 21 is compared with the amplified error signal to generate the comparison signal, to have said clock signal fix the timing of control switch S1 to OFF.

Figure 47:
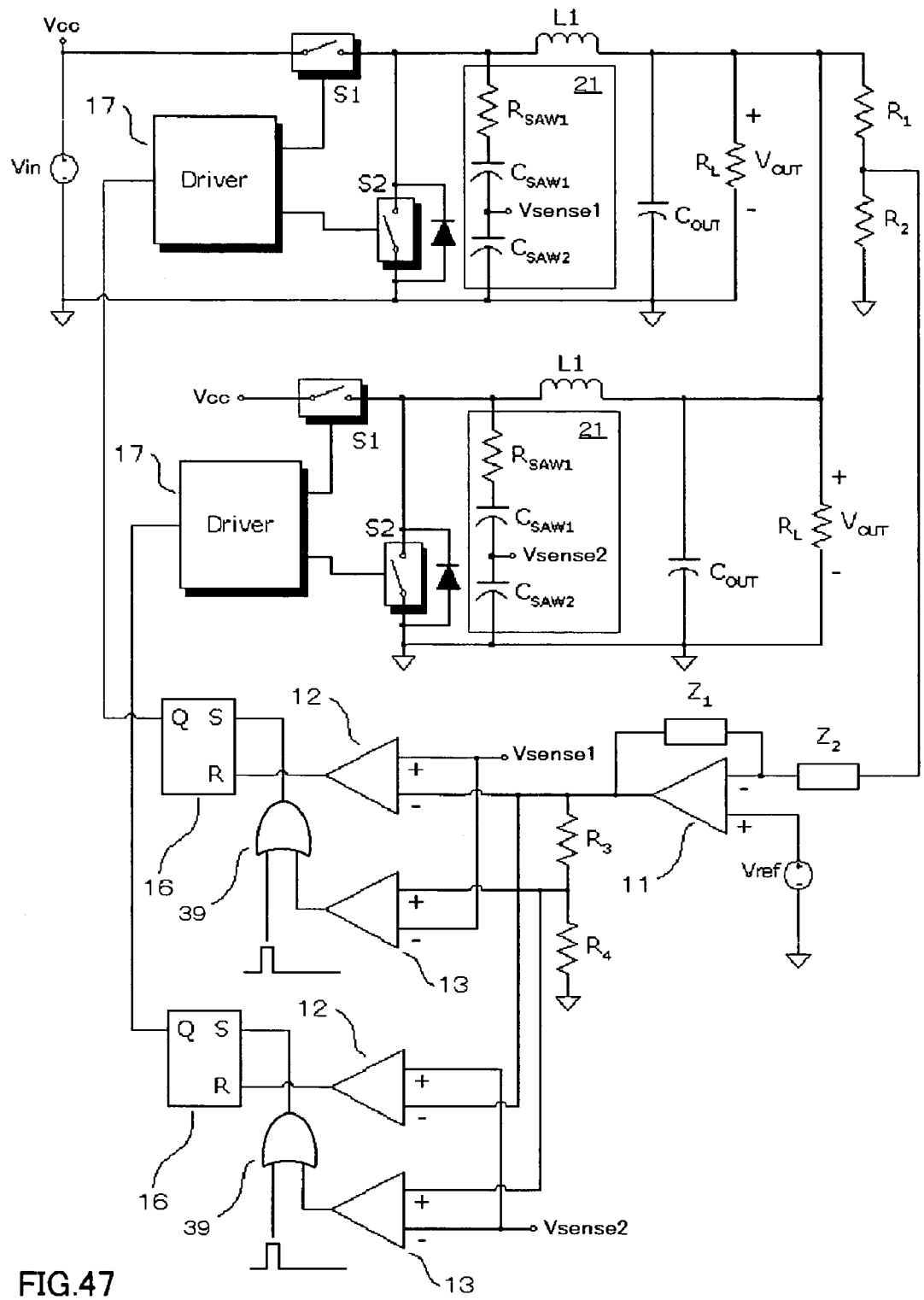
FIG. 47 shows a circuit diagram of the fourth transformation of a multi-phased version of the fourth embodiment shown in FIG. 42.

The switching power supply of said configuration operates almost similarly with an embodiment shown in FIG. 44, as it comprises just essential components of said embodiment. But, unlike the embodiment shown in FIG. 42, the switching power supply of said embodiment is not provided with first comparator 12 of the embodiment shown in FIG. 44, wherefore the clock signal is not compared with said first comparison signal sent from first comparator 12 and the amplified error signal is compared with the triangular waveform obtained through filter circuit 21 and then a comparison signal is sent to control switch S1 to have the clock signal fix the timing of control switch S1 to OFF. Said configuration of having the clock signal fix the timing of control switch S1 to OFF is also available with switching power supplies relating to other tranformations described below FIG. 47 shows a switching power supply of the fourth transformation of said embodiment, a multiphased version of the embodiment shown in FIG. 42. Said switching power supply has a common power supply Vin and two power supply circuits. Each power supply circuits is provided with control switch S1, synchronous switch S2, output inductor L1, smoothing capacitor $C_{out}$ and a power supply circuit in which output inductor L1 and smoothing capacitor $C_{out}$ are connected in series. A common output is provided for said power supply circuits, and it is connected to a control circuit through resistors $R_1$ and $R_2$ for voltage detection.

Resistors $R_1$ and $R_2$ for voltage detection is connected to the negative input of error amplifier 11, which amplifies the error between detected voltage and reference voltage and generate the amplified error signal. The output of error amplifier 12 is connected to the negative input of first comparator 12 and to positive input of second comparator 13 through split resistors $R_3$ and $R_4$.

Filter circuit 21 comprising a series connection of resistor $R_{saw1}$ and capacitors $C_{saw1}$ and $C_{saw2}$ is connected in parallel with a series circuit comprising output inductor L1 and smoothing capacitor $C_{out}$. The output of filter circuit 21 is connected to the positive input of first comparator 12 and to the negative input of second comparator 13.

The output of first comparator 12 is connected to the input on the reset side of flip flop circuit 16 to generate a first signal. The output of second comparator 13 is connected to an input of OR circuit 39 to send a second comparison from second comparator 13 to OR circuit 39. The clock signal is sent to another input of OR circuit 39, and the output of OR circuit 39 is connected to the set side of the flip flop circuit 16 to generate the clock signal in the steady state and second comparison signal when there is a sharp change of the load. The output of flip flop circuit 16 is connected to the input of driver 17, the output of which is connected to control switch S1 and a control terminal of synchronous switch S2. In this configuration, the amplitude of the triangular waveform obtained through filter circuit 21 is controlled to be between the amplified error signal and the divided signal to have the clock signal fix the timing of control switch S1 to ON.

The switching power supply of said configuration operates as follows. Description of operations in the steady state and with a sharp drop of the load is omitted as it operates almost similarly with the embodiment shown in FIG. 42.

Figure 48:
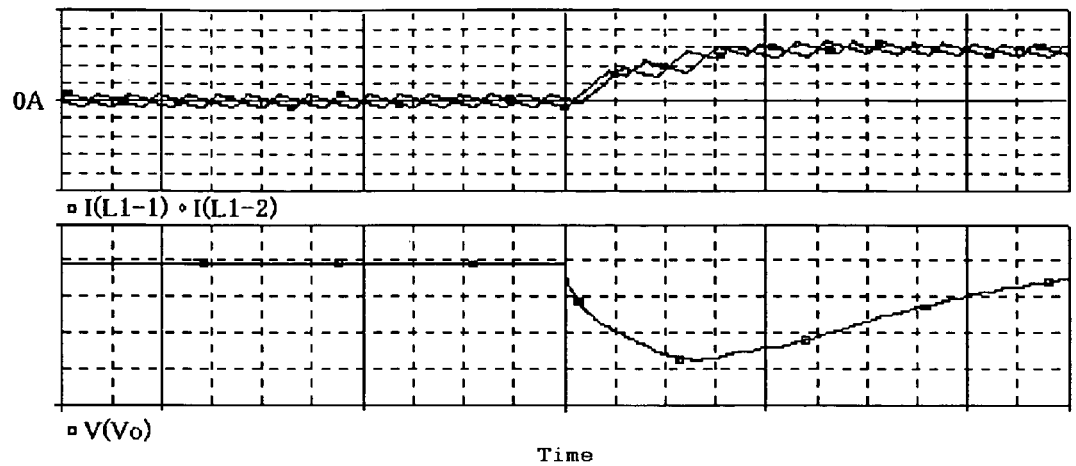
FIG. 48 shows an operational waveform diagram of the fourth transformation shown in FIG. 47.

Next, operation with a sharp increase of the load is described. This operational waveform diagram is shown in FIG. 48. In FIG. 48, the upper part represents the choke current waveform, and the lower part represents the output voltage waveform. When load current increases sharply, output voltage decreases instantaneously and respective choke current increases sharply as shown in FIG. 48.

Similarly with an embodiment shown in FIG. 42, the trinagular waveform obtained through filter circuit 21 and a signal generated by amplifying the error between output voltage and reference voltage are used to send a first signal to the reset side of flip flop circuit 16. Also, the triangular waveform obtained through filter circuit 21 and a signal generated by resistance revision through split resistors $R_3$ and $R_4$ of the amplified error signal obtained by amplifying the error between output voltage and reference voltage are used to send a second comparison signal obtained through second comparator 13 to an input of OR circuit 39 and send the clock signal to another input of OR circuit 39. The the clock signal is generated by OR circuit 39 in the steady state, while when there is a sharp change of the load, a second comparison signal is sent from OR circuit 39 to the set side of flip flop circuit 16. Instead of the clock siignal, flip flop circuit 16 sends said second comparison signal to control switch S1 to control the amplitude of the triangular waveform obtained through filter circuit 21 to be between the amplified error signal and the divided signal. Thus, a multiphased switching power supply operates similarly with a single-phase switching power supply. Said switching power supply is multi-phased using two power supply circuits, but it operates similarly even when three or more power supply circuits are provided. Multi-phasing is also available with transformations described below.

Figure 49:
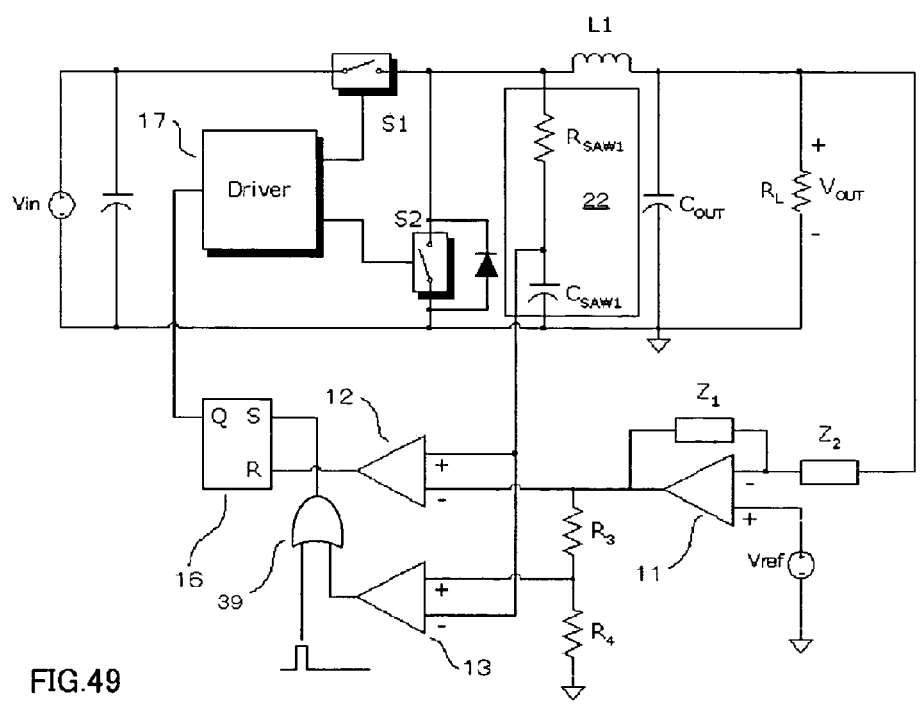
FIG. 49 shows a circuit diagram of the fifth transformation of the third embodiment.

FIG. 49 shows a switching power supply relating to the fifth transformation of said embodiment. The said switching power supply is configured with the output of the power supply circuit connected to the negative input of error amplifier 11, which amplifies the error between the detected voltage and reference voltage. The output of error amplifier 11 is connected to the negative input of first comparator 12 and to the positive input of second comparator 13 through split resistors $R_3$ and $R_4$.

Filter circuit 22 comprising a series connection of capacitor $C_{saw1}$ and resistor $R_{saw1}$. Is connected in parallel to a series circuit comprising output inductor L1 and smoothing capacitor $C_{out}$. The output of filter circuit 22 is connected to the positive input of first comparator 12 and the negative input of second comparator 13.

The output of first comparator 12 is connected to the input on the reset side of flip flop circuit 16, and the output of second comparator 13 is connected to an input to OR circuit 39. The clock signal is sent to another input of OR circuit 39, the output of which is connected to the set side of flip flop circuit 16 to generate the clock signal in the steady state and said second comparison signal when there is a sharp change of the load. The Output of flip flop circuit 16 is connected to the input of driver 17, the output of which is connected to control switch S1 and synchronous switch S2. In this configuration, the amplitude of the triangular waveform obtained through filter circuit 25 is controlled to be between the amplified error signal and the divided signal to have said clock signal fix the timing of control switch S1 to ON.

The switching power supply of said configuration operates almost similarly with a transformation in FIG. 42, fixing the oscillation frequency by having the clock signal fix the timing of control switch S1 to ON in the steady state. The switching power supply relating to said embodiment is not provided with a resistor for voltage detection at the output of the power supply circuit, and the configuration of filter circuit 22 is different from filter circuit 21 of an embodiment shown in FIG. 42.

Figure 50:
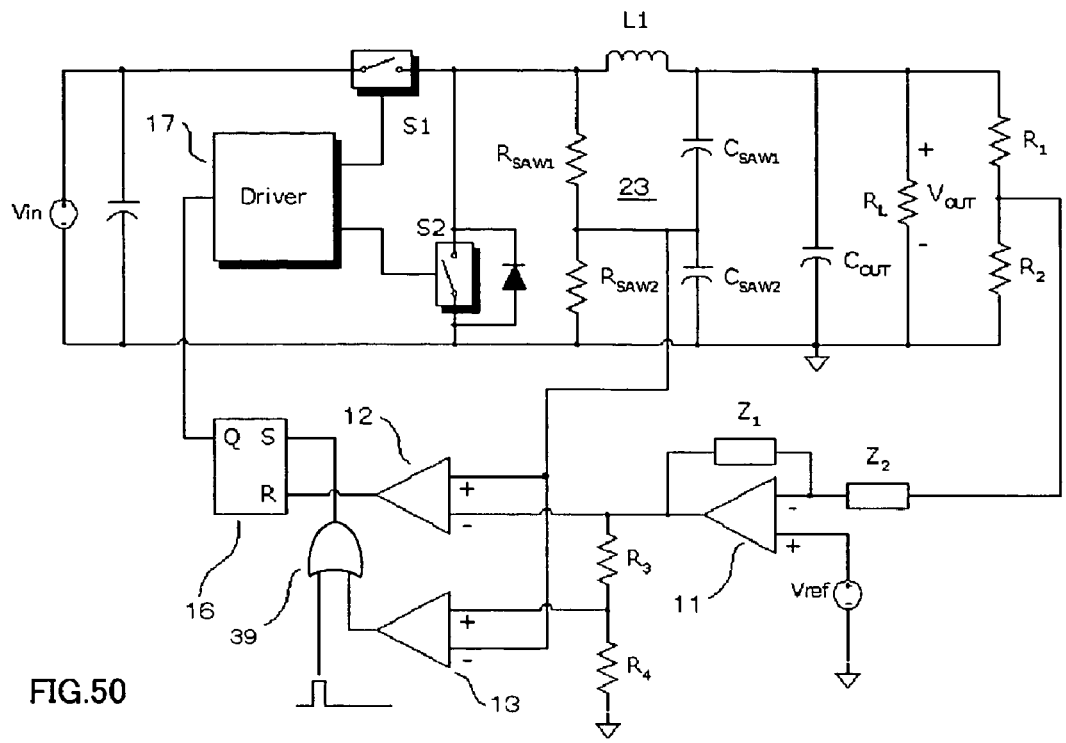
FIG. 50 shows a circuit diagram of the sixth transformation of the third embodiment.

FIG. 50 shows a switching power supply relating to the six transformation of said embodiment. Said switching power supply is provided with resistors $R_1$ and $R_2$ for voltage detection at the output of the power supply circuit, and a connection between said resistors is connected to the negative input of error amplifier 11, which amplifies the error between the detected voltage and the reference voltage. The output of error amplifier 11 is connected to the negative input of first comparator 12 and to the positive input of second comparator 13 through split resistors $R_3$ and $R_4$.

In said transformation, filter circuit 23 is provided between the input and the output of output inductor L1. Filter circuit 23 is configured by connecting resistors $R_{saw1}$ and $R_{saw2}$ in parallel with synchronous switch S2 and in series with the input terminal of output inductor L1 and connecting capacitors $C_{saw1}$ and $C_{saw2}$ in parallel with synchronous switch S2 and in series with the power output terminal of output inductor L1. A connection is provided between resistors $R_{saw1}$ and $R_{saw2}$ connected in series and between capacitors $C_{saw1}$ and $C_{saw2}$ connected in series respectively. Filter circuit 23 is formed by connecting said connections. Working as the output of filter circuit 23, said connections are connected to the positive input of first comparator 12 and to the negative input of second comparator 13 respectively.

The output of first comparator 12 is connected to the input on the reset side of flip flop circuit 16 to generate a first comparison signal, and the output of second comparator 13 is connected to an input of OR circuit 39 to generate a second comparison signal. The clock signal is sent to another input of OR circuit 39, output of which is connected to the set side of the flip flop circuit 16 to generate the clock signal in the steady state and said second comparison signal when there is a sharp change of the load. The output of flip flop circuit 16 is connected to the input of driver 17, the output of which is connected to control switch S1 and the control terminal of synchronous switch S2. In this configuration, the amplitude of the triangular waveform obtained through filter circuit 23 is controlled to be between the amplified error signal and the said divided signal to have said clock signal fix the timing of control switch S1 to ON in the steady state.

The switching power supply of said configuration operates almost similarly with an embodiment shown in FIG. 42, fixing the oscillation frequency by having the clock signal fix the timing of control switch S1 to ON in the steady state.

Figure 51:
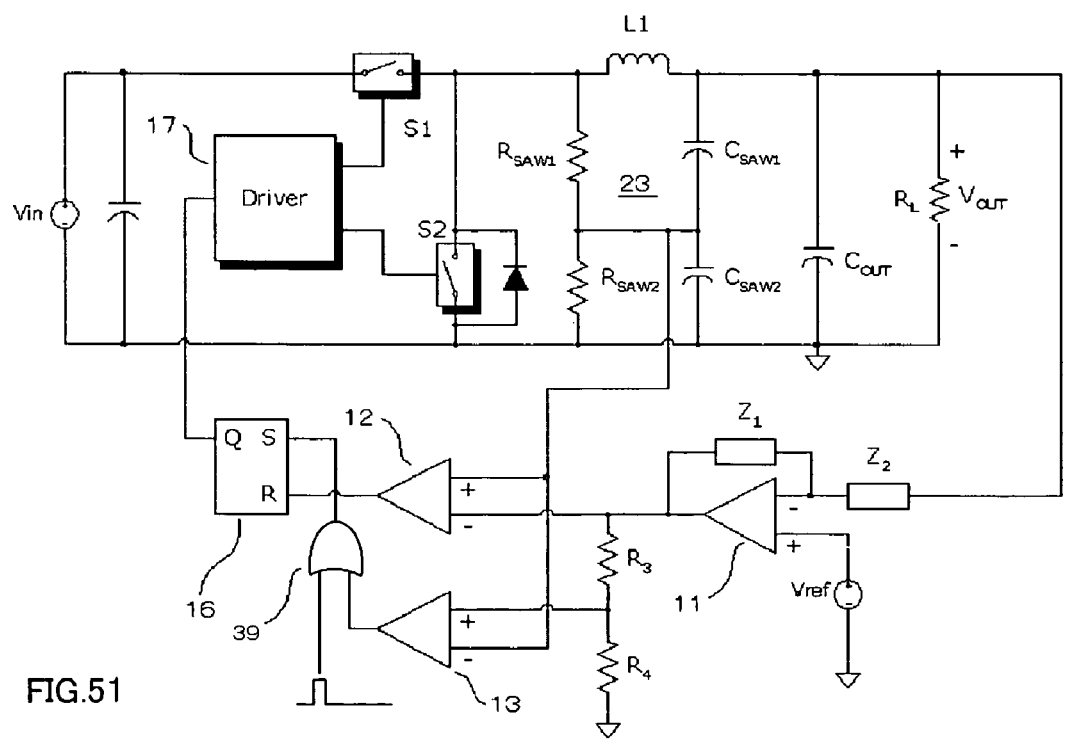
FIG. 51 shows a circuit diagram of the seventh transformation of the third embodiment.

FIG. 51 shows the seventh transformation of said embodiment, which is almost similar with a transformation shown in FIG. 50. Said switching power supply is configured with the output of the power supply circuit connected to the negative input of error amplifier 11, which amplifies the error between detected voltage and reference voltage. Said switching power supply operates almost similarly with a transformation shown in FIG. 50, fixing the oscillation frequency by having the clock signal fix the timing of control switch S1 to ON in the steady state.

Figure 52:
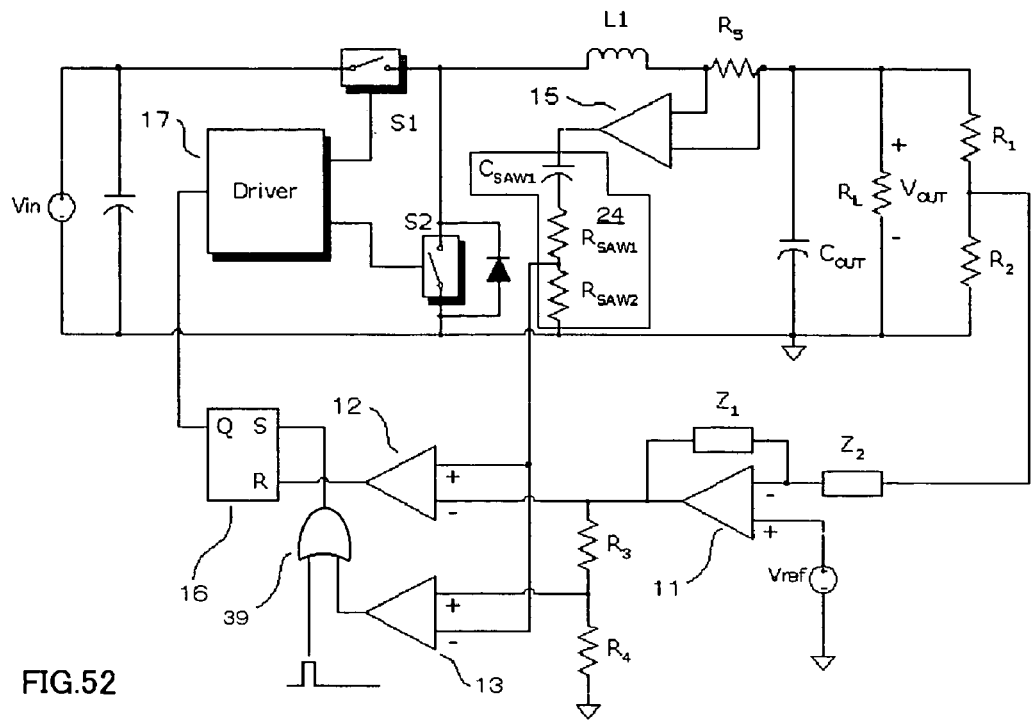
FIG. 52 shows a circuit diagram of the eighth transformation of the third embodiment.

FIG. 52 shows a switching power supply relating to the eighth transformation of said embodiment. Said switching power supply is configured with the output of the power supply circuit connected to resistors $R_1$ and $R_2$ for voltage detection, and a connection between said resistors is connected to the negative input of error amplifier 11, which amplifies the error between detected voltage and reference voltage. The output of error amplifier 11 is connected to the negative input of first comparator 12 and to the positive input of second comparator 13 through split resistors $R_3$ and $R_4$.

In said transformation, resistor $R_5$ for current detection is connected between output inductor L1 and smoothing capacitor $C_{out}$, and the input of resistor $R_5$ is connected to the negative input of buffer amplifier 15 and its output to the negative input of buffer amplifier 15. The output of buffer amplifier 15 is connected to filter circuit 24 comprising a series connection of capacitor $C_{saw1}$ and resistors $R_{saw1}$ and $R_{saw2}$. The output of filter circuit 24 is connected to the positive input of first comparator 12 and to the negative input of second comparator 13.

The output of first comparator 12 is connected to the input on the reset side of flip flop circuit 16 to generate a first comparison signal. The output of second comparator 13 is connected to an input of OR circuit 39 to generate a second comparison signal. The clock signal is sent to another input of OR circuit 39, the output of which is connected to the set side of flip flop circuit 16 to generate the clock signal in the steady state and said second comparison signal when there is a sharp change of the load. The output of flip flop circuit 16 is connected to the input of driver 17, the output of which is connected to control switch S1 and to the control terminal of synchronous switch S2. In this configuration, the amplitude of the triangular waveform obtained through filter circuit 23 is controlled to be between the amplified error signal and the divided signal, having said clock signal fix the timing of control switch S1 to ON in the steady state.

The switching power supply of said configuration operates almost similarly with an embodiment shown in FIG. 42, fixing the oscillation frequency by having the clock signal fix the timing of control switch S1 to ON in the steady state. The switching power supply of said embodiment can also pick up high frequency components only through resistors $R_1$ and $R_2$ for voltage detection and filter circuit 24 comprising a series connection of capacitor $C_{saw1}$ and resistors $R_{saw1}$ and $R_{saw2}$.

Figure 53:
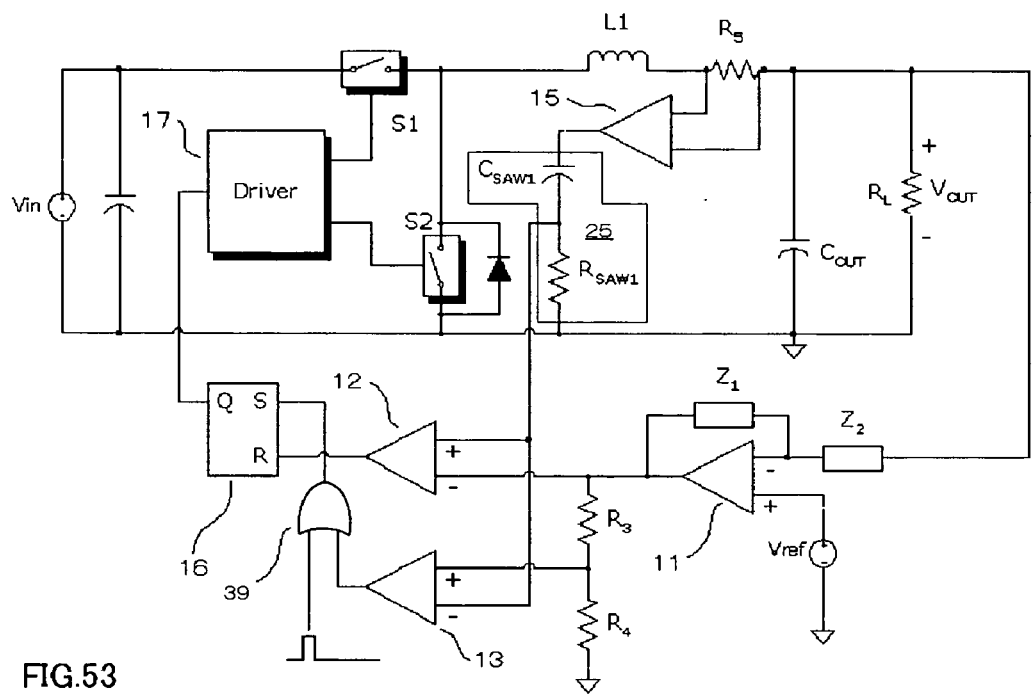
FIG. 53 shows a circuit diagram of the ninth transformation of the third embodiment.

FIG. 53 shows a switching power supply relating to the ninth transformation of said embodiment. Said switching power supply is configured with the output of the power supply circuit connected to the negative input of error amplifier 11, which amplifies the error between detected voltage and reference voltage. The output of error amplifier 11 is connected to the negative input of first comparator 12 and to the positive input of second comparator 13 through split resistors $R_3$ and $R_4$.

In said transformation, resistor $R_5$ for current detection is connected between output inductor L1 and smoothing capacitor $C_{out}$. The input of resistor $R_5$ is connected to the positive input of buffer amplifier 15, and its output is connected to the negative input of buffer amplifier 15. The output of buffer 15 is connected to filter circuit 25 comprising a series connection of capacitor $C_{saw1}$ and resistor $R_{saw1}$. The output of filter circuit 25 is connected to the positive input of first comparator 12 and to the negative input of second comparator 13.

The output of first comparator 12 is connected to the input on the reset side of flip flop to generate a first comparison signal. The output of second comparator 13 is connected to an input of OR circuit 39 to generate a second comparison signal. The clock signal is sent to another input of OR circuit 39, the output of which is connected to the set side of flip flop circuit 16 to generate the clock signal in the steady state and the second comparison signal when there is a sharp change of the load. The output of flip flop circuit 16 is connected to the input of driver 17, the output of which is connected to control switch S1 and to the control terminal of synchronous switch S2. In this configuration, the amplitude of the triangular waveform obtained through filter circuit 25 is controlled to be between the amplified error signal and the divided signal when there is a sharp change of the load, to havei the clock signal fix the timing of control switch S1 to ON in the steady state.

The switching power supply of said configuration operates almost similarly with a transformation shown in FIG. 49, fixing the oscillation frequency by having the clock signal fix the timing of control switch S1 to ON in the steady state.

Figure 54:
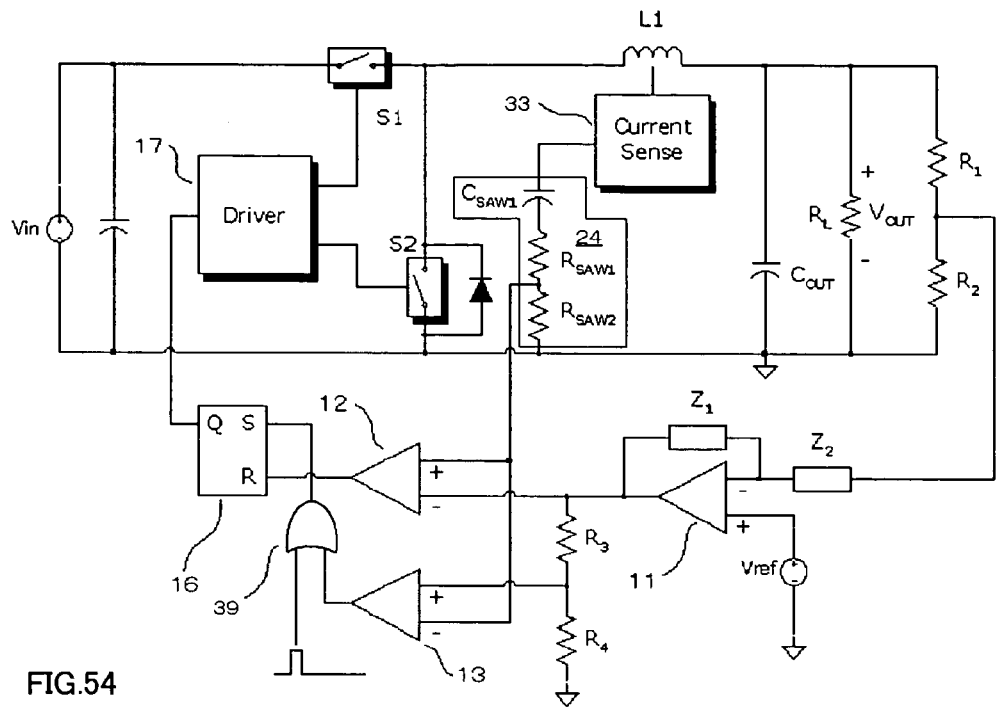
FIG. 54 shows a circuit diagram of the tenth transformation of the third embodiment.
Figure 55:
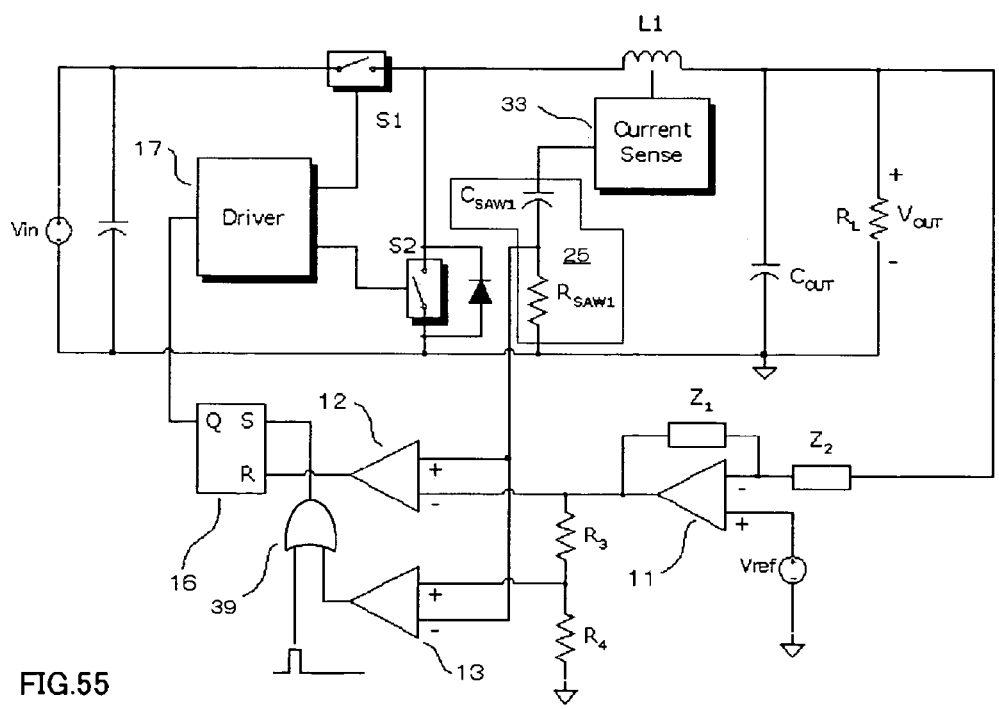
FIG. 55 shows a circuit diagram of the eleventh transformation of the third embodiment.

In the tenth transformation shown in FIG. 54, output inductor L1 is corrected to current detection circuit 33, the output of which is connected to filter circuit 24 comprising a series connection of capacitor $C_{saw1}$ and resistors $R_{saw1}$ and $R_{saw2}$. Other configuration is almost same as a transformation shown in FIG. 52. The switching power supply of said configuration shown in FIG. 54 operates almost similarly with a swithcing power supply shown in FIG. 52. A In the eleventh transformation shown in FIG. 55, output inductor L1 is also corrected to current detection circuit 33, the output of which is connected to filter circuit 25 comprising a series connection of capacitor $C_{saw1}$ and resistors $R_{saw1}$, and $R_{saw2}$. Other configuration is almost same as a transformation shown in FIG. 53. The switching power supply of said configuration shown in FIG. 55 operates almost similarly with a switching power supply shown in FIG. 53.

Figure 56:
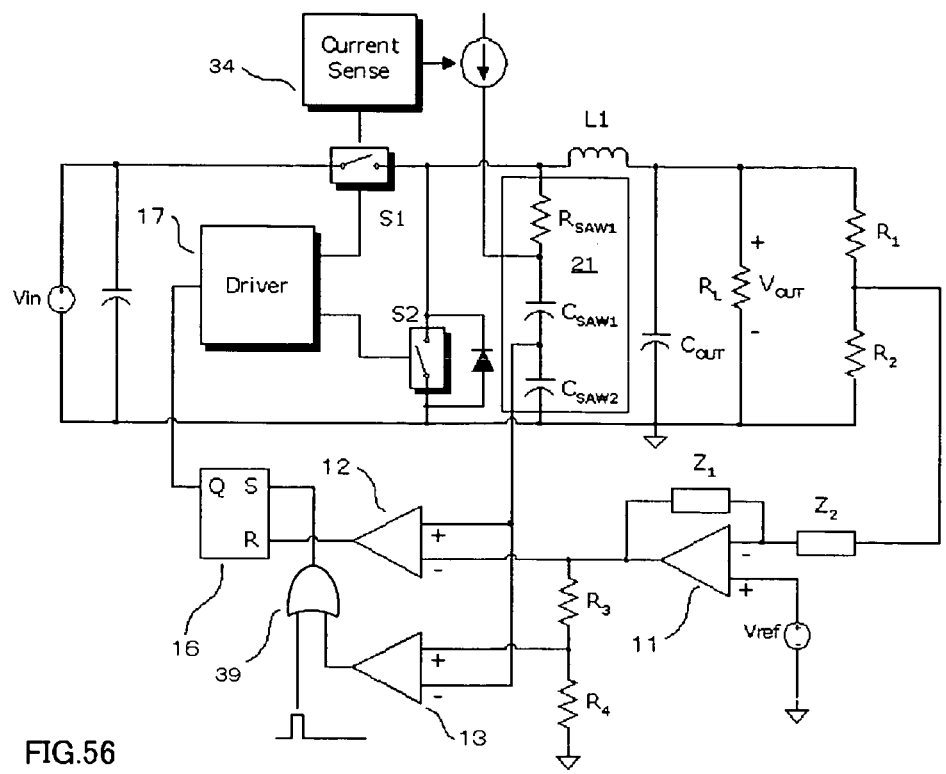
FIG. 56 shows a circuit diagram of the twelveth transformation of the third embodiment.
Figure 57:
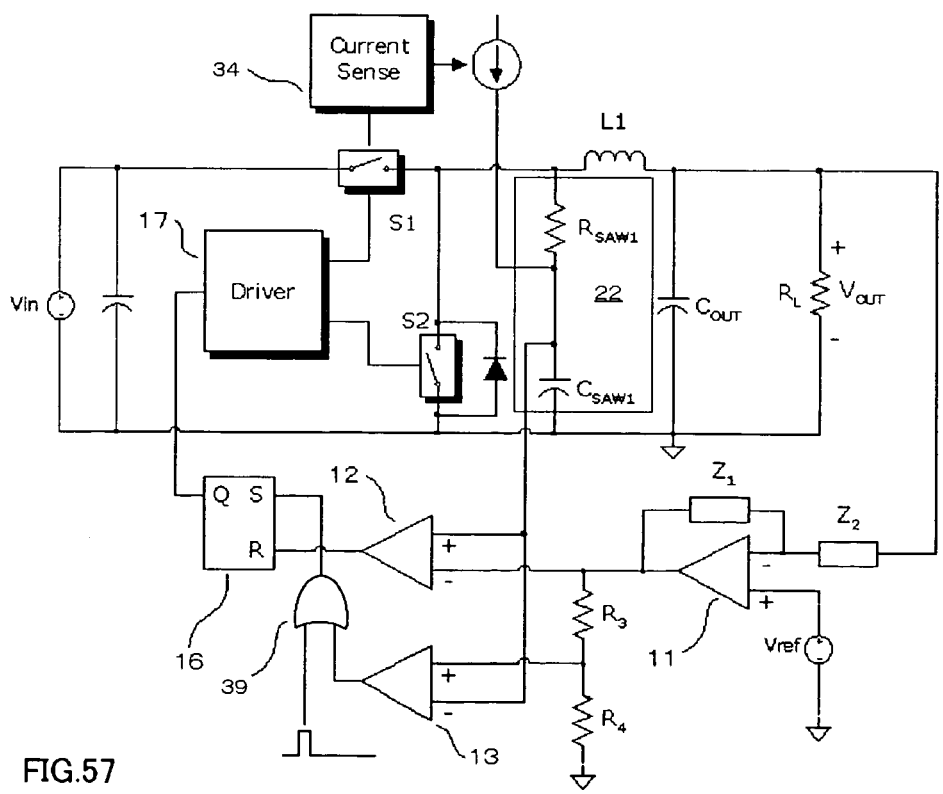
FIG. 57 shows a circuit diagram of the thirteenth transformation of the third embodiment.
Figure 58:
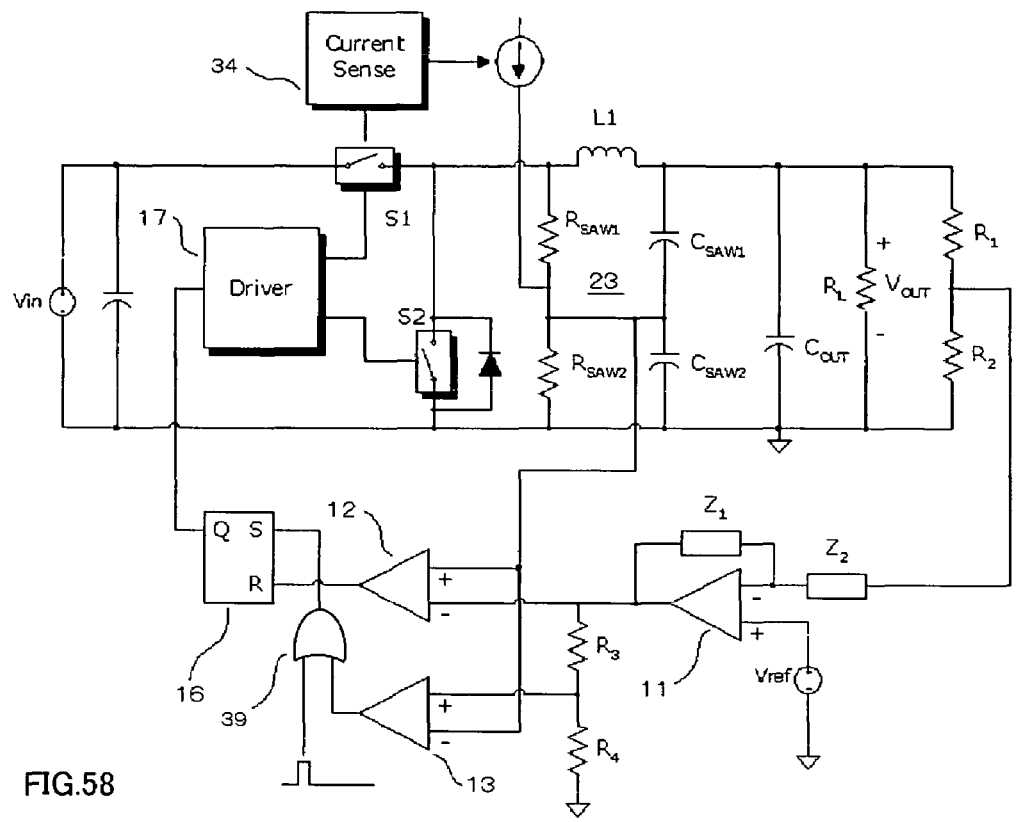
FIG. 58 shows a circuit diagram of the fourteenth transformation of the third embodiment.

The twelveth transformation shown in FIG. 56 corresponds to an embodiment shown in FIG. 42. A transformation shown in FIG. 57 corresponds to a transformation shown in FIG. 49. A transformation shown in FIG. 58 corresponds to a transformation shown in FIG. 50. A transformation shown in FIG. 59 corresponds to a transformation shown in FIG. 51. In the switching power supplies of those embodiments, control switch S1 is connected to current detection circuit, the output of which is connected to one end of resistor $R_{saw1}$, another end of which is connected to output inductor L1.

Figure 59:
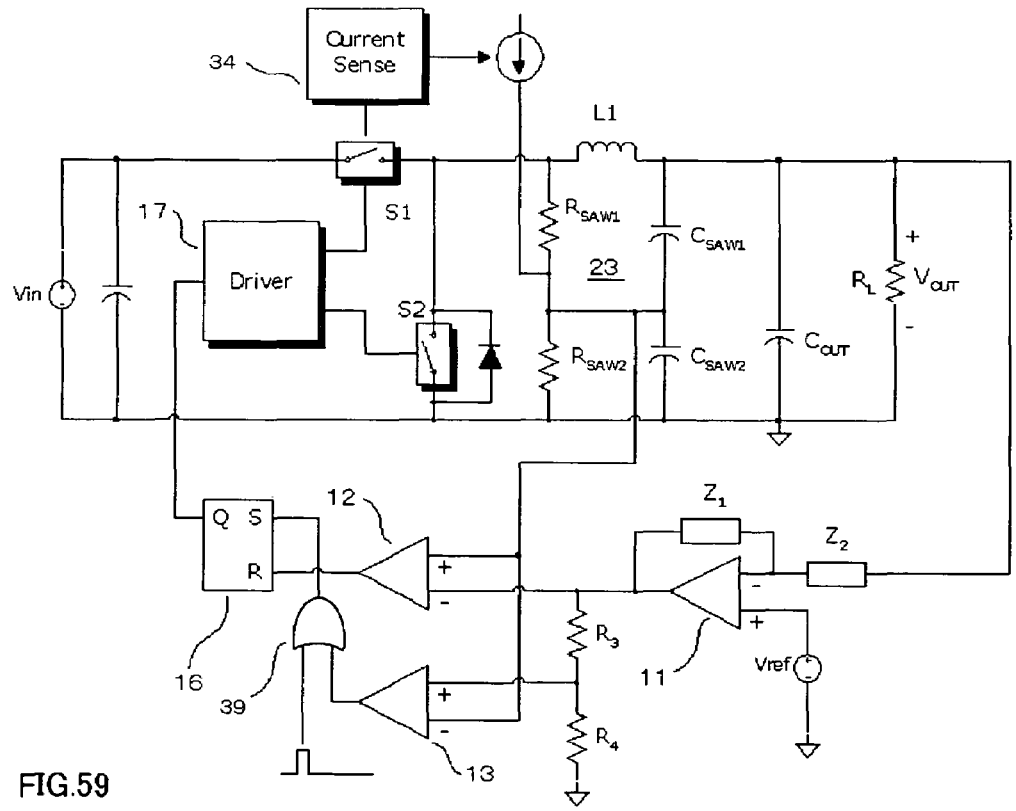
FIG. 59 shows a circuit diagram of the fifteenth transformation of the third embodiment.
Figure 60:
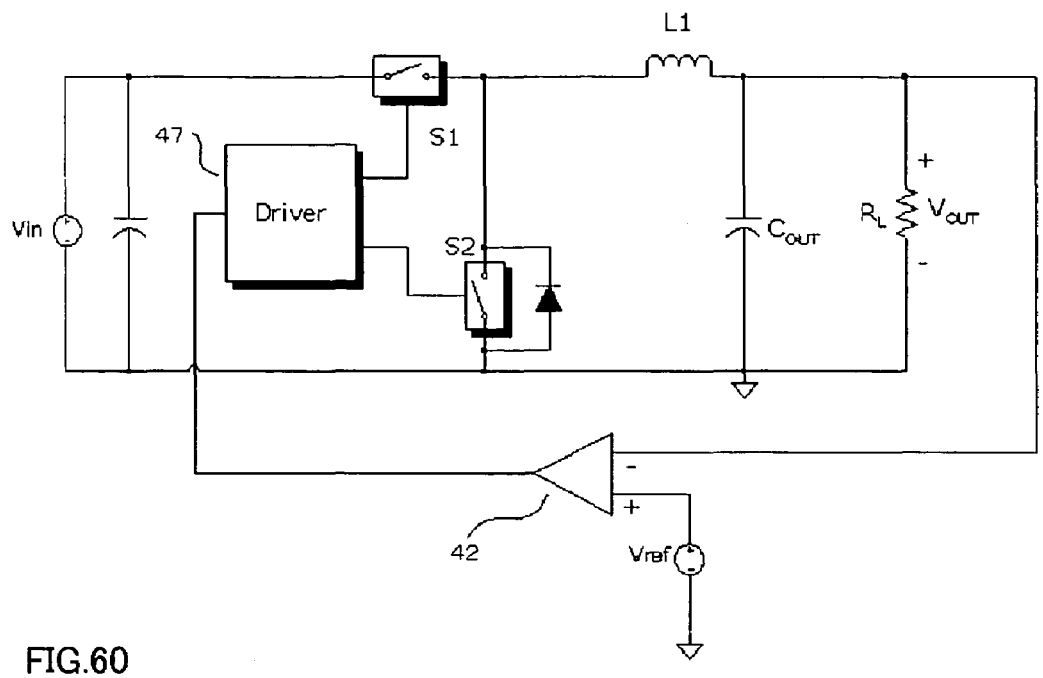
FIG. 60 shows a circuit diagram of a switching power supply of prior art.
Figure 61:
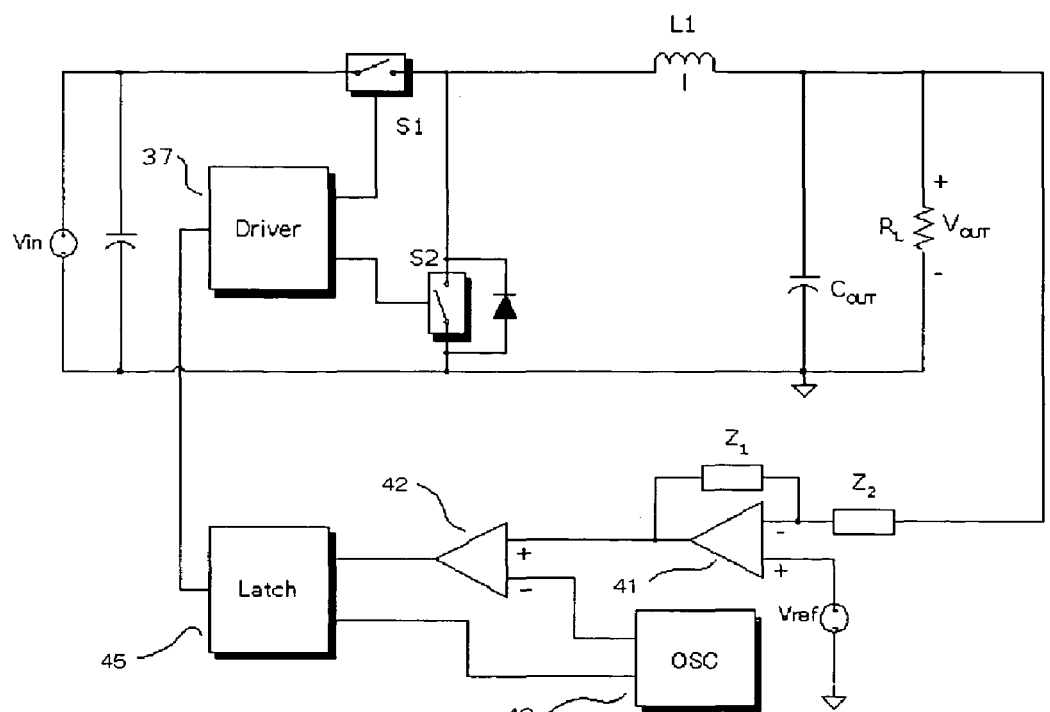
FIG. 61 shows a circuit diagram of another switching power supply of prior art different from the one shown in FIG. 60.
Figure 62:
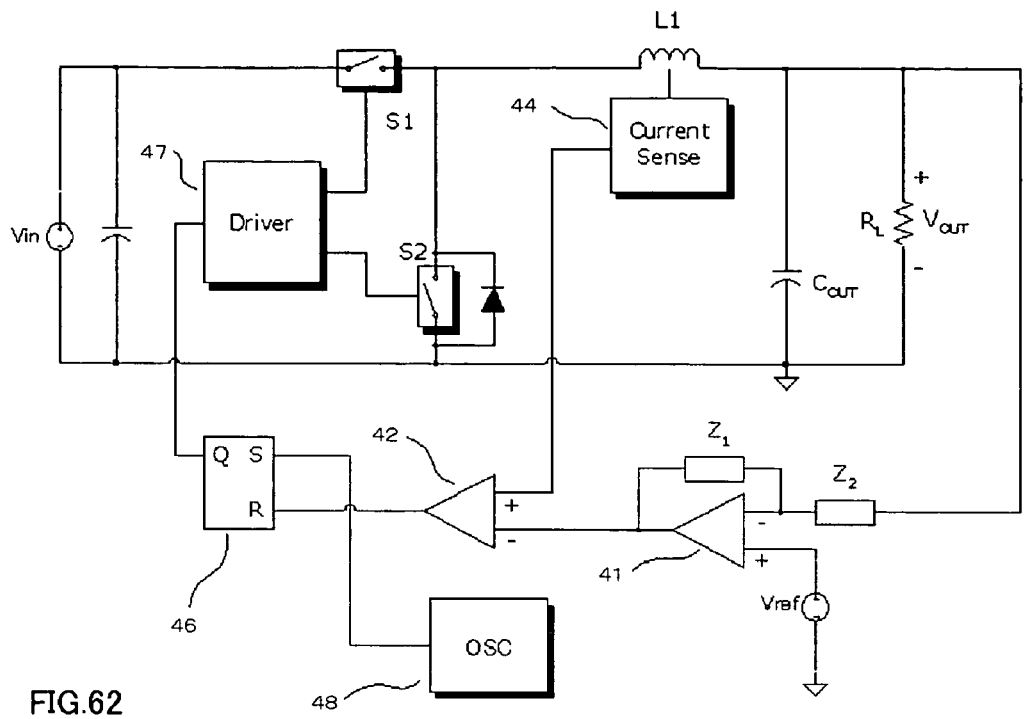
FIG. 62 also shows a circuit diagram of another switching power supply of prior art.
Figure 63:
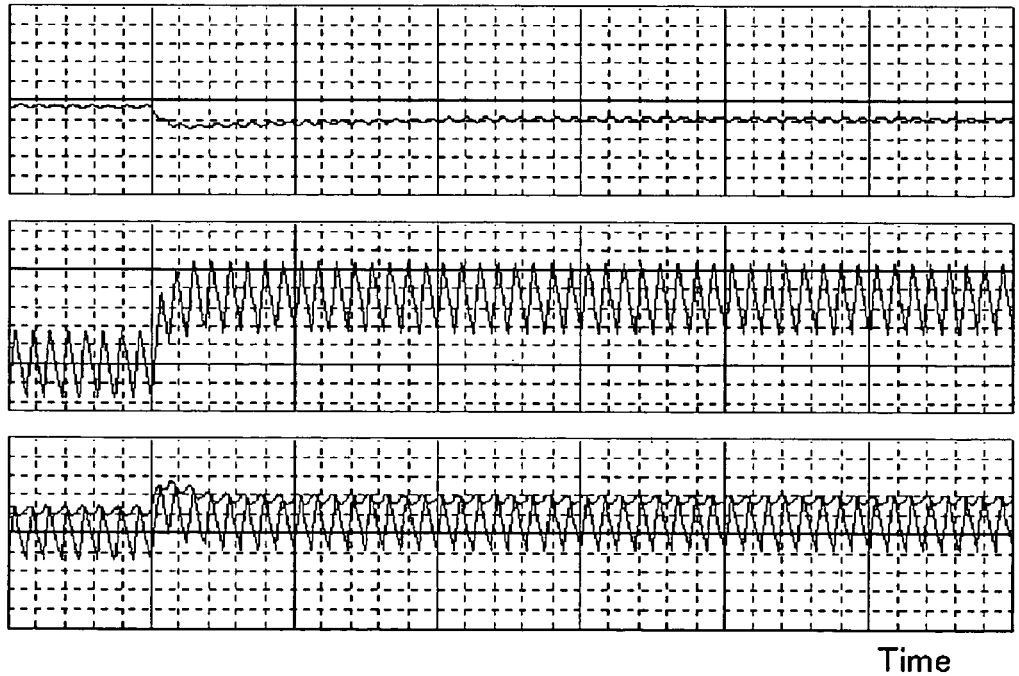
FIG. 63 shows an operational waveform diagram of the prior art shown in FIG. 62.
Figure 64:
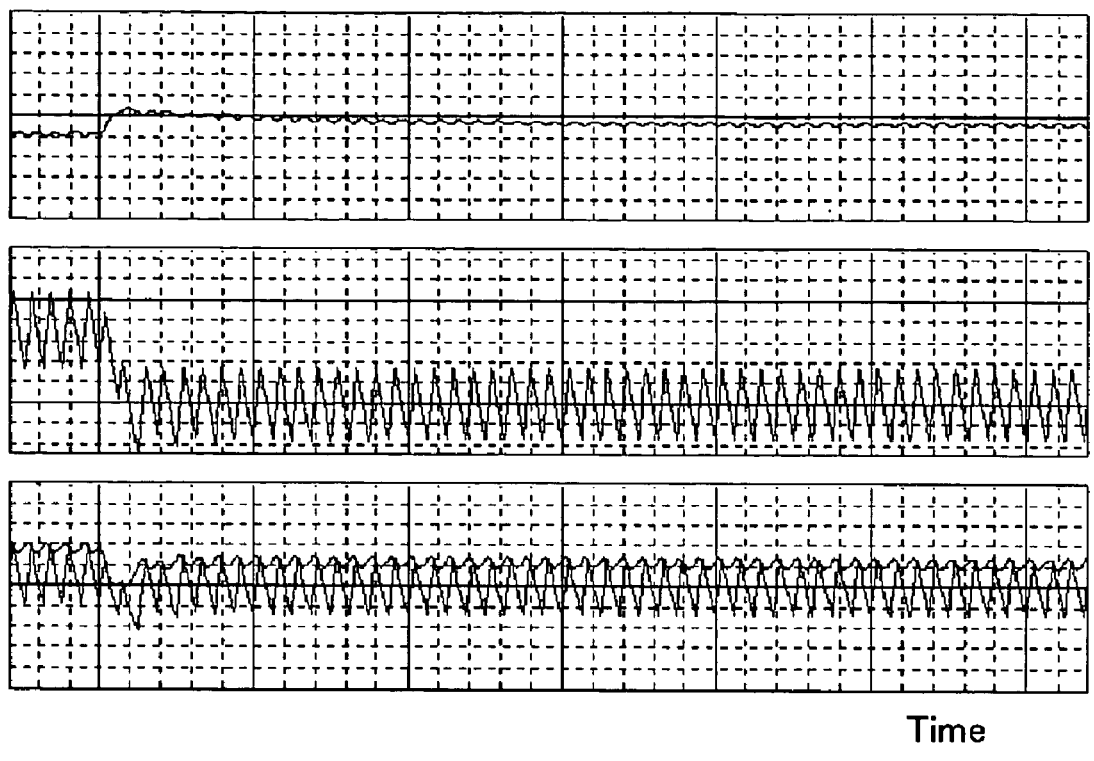
FIG. 64 also shows an operational waveform diagram of the prior art.

The switching power supply of said configurations shown in FIG. 56 and FIG. 59 operate almost similarly with associated switching power supplies shown in FIG. 42, FIG. 49, FIG. 50 and FIG. 51, but also generates output impedance as current from current detection circuit 34 is applied through filter circuits 21, 22 and 23.

INDUSTRIAL APPLICABILITY

According to a configuration of the switching power supply relating to the invention, the switching power supply is provided with a control means which control the triangular waveform obtained through a ilter circuit to be between an input level of a first comparator and an input level of a second comparator. Since the triangular waveform is generated by on/off operation of an output switch connected short of said filter circuit comprising resistors and a capacitor, phase difference between operational state of said output switch and the amplified error signal is fixed to materialize the stability of the switching power supply without lowering the frequency band of the amplified error signal.

Also, by connecting the control switch to the current detection circuit and the current detection circuit to the filter circuit, normal current and another current flowing through the current detection circuit flow through the filter circuit, enabling adjustment of the output impedance.

According to another configuration of the switching power supply relating to the invention, the switching power supply can materialize stable ripple characteristics by integrating a circuit which detects the discontinuity of inductor current and automatically changes the amplitude of the triangular waveform.

According to a different configuration of the switching power supply relating to the invention, the switching power supply materializes stable efficiency and ripple characteristics under various I/O conditions by integrating a circuit which automatically changes the amplitude of the triangular waveform in proportion with I/O voltage difference.

According to a different configuration of the switching power supply relating to the invention, the amplitude of the triangular waveform obtained through the filter circuit can be controlled to be between the amplified error signal obtained by amplifying the error between output voltage and reference voltage when there is a sharp change of the load to fix the on/off timing of the control switch in the steady state. This enables fixing of the oscillation frequency and easy generation of a signal having a phase lag for multi-phasing.

Also, even when the divided signal is not used, the oscillation frequency can be fixed and a signal having a phase lag for multi-phasing can be generated easily like when the divided signal is used.

What is claimed is:

1. A switching power supply provided with a control switch, a synchronous switch and a series connection of an output inductor and a smoothing capacitor, wherein the input of an error amplifier is connected to the output of a power supply circuit to amplify the error between detected voltage and reference voltage, the output of said amplifier is connected an input of a first comparator and an input of a second comparator through split resistors, a filter circuit comprising resistors and a capacitor is connected in parallel to said synchronous switch, and the output of said filter circuit is connected to another input of said first comparator and another input of said second comparator, wherein a control means is configured to control the amplitude of the triangular waveform obtained through said filter circuit to be between an input level of said first comparator and an input level of said second comparator.

2. A switching power supply according to claim 1, wherein said control means is configured by connecting the output of said error amplifier to another input of said second comparator through a voltage divider circuit which changes the voltage division ratio freely, to control the amplitude of the triangular waveform obtained through said filter circuit to be between an input level of said first comparator and an input level of said second comparator.

3. A switching power supply according to claim 2, wherein three or more resistors are connected in series to form a voltage divider variable part and a voltage divider fixed part, one end of said voltage divider variable part is connected between the output of said error amplifier and the input of said first comparator, the other end of said voltage divider variable part is connected to another input of said second comparator, and a switch is connected in parallel with at least one resistor provided at said voltage divider variable part, wherein the discontinuity of inductor current is detected to change the voltage division ratio freely.

4. A switching power supply according to claim 1, wherein a current source changing in proportion with the I/O potential differenceis provided, said current source being connected between the middle point of said split resistors and the ground potential to generate a second signal, wherein said amplitude of the triangular waveform is controlled to be between signals of said first comparator and said second comparator.

5. A switching power supply according to claim 4, wherein two or more said split resistors are connected in series and current source changing in proportion with I/O potential difference is connected between the resistance cutoff point and the ground potential, wherein the voltage division ratio can be changed freely.

6. A switching power supply according to claim 1, wherein the amplified error signal obtained by amplifying the error between output voltage of the power supply circuit and reference voltage is compared with the triangular waveform obtained through said filter circuit and then a first comparison signal is sent to said control switch, said amplified error signal is divided and then compared with said second triangular waveform for generation of a second comparison signal, said second comparison signal is compared with the clock signal to generate said second comparison signal where there is a sharp change of the load, to change the output signal for said control switch from said clock signal to said second comparison signal to control said amplitude of the triangular waveform to be between said aamplified error signal and said voltage division signal, wherein the timing of said control switch is fixed to ON by said clock signal.

7. A switching power supply according to claim 6, wherein the timing of said control switch is fixed to ON by said clock signal even when there is a sharp increase of the load.

8. A switching power supply according to claim 1, wherein said first comparison signal can be generated by comparing the amplified error signal obtained by amplifying the error between of output voltage of the power supply circuit and reference voltage with the triangular waveform obtained through said filter circuit, said first comparison signal is compared with the clock signal and then sent to said control switch, said amplified error signal is divided and then compared with said triangular waveform to gnerate said second comparison signal, wherein when there is a sharp change of the load, output signal for said control switch is changed from said clock signal to said first comparison signal to control the amplitude of said triangular waveform to be between said amplified error signal and said voltage division signal when there is a sharp change of the load, and the timing of said control switch is fied to OFF by said clock signal in the steady state.

9. A switching power supply according to claim 8, wherein the timing of said control switch is fixed to OFF by said clock signal even when there is a sharp decrease of the load.

* * * * *